United States Patent Office 3,472,881
Patented Oct. 14, 1969

3,472,881
3 - HYDROXY - 13 - LOWER ALKYL - 15 - CAR-
BOXYL - 1,3,5(10),8,14 - GONAPENTAEN - 17-
ONES AND INTERMEDIATES IN THE PRO-
DUCTION THEREOF
Chan Hwa Kuo, South Plainfield, David Taub, Metuchen,
and Norman L. Wendler, Summit, N.J., assignors to
Merck & Co., Inc., Rahway, N.J., a corporation of New
Jersey
No Drawing. Continuation-in-part of application Ser. No.
455,992, May 14, 1965. This application Oct. 22, 1965,
Ser. No. 502,501
Int. Cl. C07c 169/12, 167/02
U.S. Cl. 260—397.1                           32 Claims

ABSTRACT OF THE DISCLOSURE

Estrane series steroids having estrogenic and progestational activity are prepared by a novel synthesis starting from 3-hydroxy or substituted oxy-8,14-seco-13-lower alkyl or alkenyl-15-carboxamido, carbalkoxy, carbaralkoxy or carboxy-1,3,5(10),9(11)-gonatetraene - 14,17 - diones, which involves decarboxylation of the C–15 functional group to obtain the active estrane series compounds.

---

This application is a continuation-in-part of United States patent application Ser. No. 455,992, filed May 14, 1965.

This invention is concerned generally with the novel synthesis of novel intermediate compounds useful in the synthesis of known steroids of the estrane series which have utility in the pharmaceutical field as estrogenic and progestational agents. More particularly, this invention relates to the synthesis of 3-hydroxy or substituted oxy-13-lower alkyl or alkenyl-15-carboxamido, carbalkoxy, carbaralkoxy or carboxy-1,3,5(10),8,14-gonapentaen-17-ones (Compound II), 3-hydroxy or substituted oxy-13-lower alkyl-15-carboxamido, carbalkoxy, carbaralkoxy or carboxy-1,3,5(10),8-gonatetraen-17-ones (Compound III), 3-hydroxy or substituted oxy-13-lower alkyl-15-carboxamido, carbalkoxy, carbaralkoxy or carboxy-1,3,5(10)-gonatrien-17β-ols (Compound IV), 3-hydroxy or substituted oxy-13-lower alkyl - 15 - carboxamido, carbalkoxy, carbaralkoxy or carboxy - 1,3,5(10) - gonatrien-17-ones (Compound V), and 3-hydroxy or substituted oxy-13-lower alkyl-15-carboxamido, carbalkoxy, carbaralkoxy or carboxy-1,3,5(10),9(11)-gonatetraen - 17 - ones (Compound VI), starting with 3-hydroxy or substituted oxy-8,14-seco-13-lower alkyl or alkenyl-15-carboxamido, carbalkoxy, carbaralkoxy or carboxy-1,3,5(10),9(11)-gonatetraene-14,17-diones (Compound I). The novel synthesis of this invention may be schematically represented as follows:

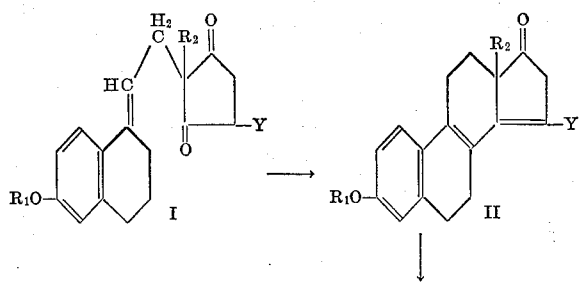

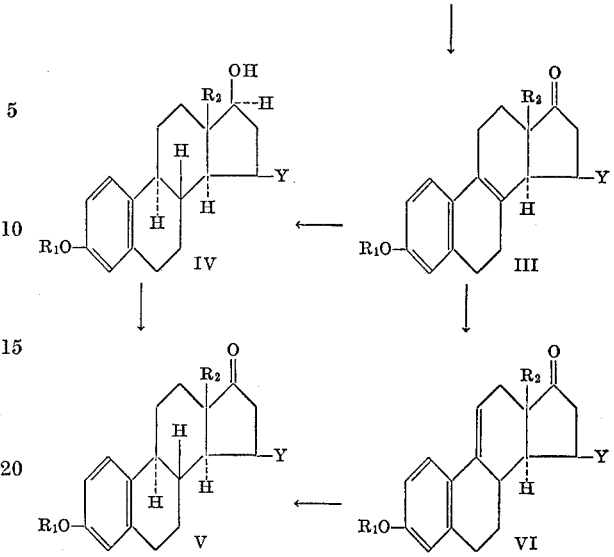

wherein $R_1$ is hydrogen, a lower alkyl or cycloaliphatic substituent, preferably having not more than five carbon atoms, an aryl or alkaryl or aralkyl substituent, in which the alkyl portion preferably has not more than five carbon atoms; or a heterocyclic substituent, such as tetrahydropyranyl; $R_2$ is a lower alkyl substituent, such as methyl, ethyl, propyl, isopropyl, butyl or a pentyl radical, preferably having not more than five carbon atoms, and in Compounds I and II $R_2$ may also be a lower alkenyl substituent having at least three and preferably not more than five carbon atoms and in which the ethylenic linkage is not between the first and second carbon atoms of the carbon chain, such as an allyl, 2-butenyl, 3-butenyl, 2-pentenyl, 3-pentenyl or 4-pentenyl radical; and Y is a carboxy or carboxamido substituent, or a carbalkoxy or carbaralkoxy substituent of the formula:

$$-\overset{O}{\underset{\|}{C}}-R_3$$

in which $R_3$ is a lower alkoxy substituent, preferably having not more than five carbon atoms, or an aralkoxy substituent, in which the alkoxy portion preferably has not more than five carbon atoms.

The starting material (Compound I), may be prepared by the condensation of a 1-vinyl-1-hydroxy-6-hydroxy or substituted oxy-1,2,3,4-tetrahydronaphthalene compound or a sulfonium salt thereof, more particularly, a 6-hydroxy or substituted oxy-1,2,3,4-tetrahydronaphthylidene ethyl isothiouronium salt or a 6-hydroxy or substituted oxy-1,2,3,4-tetrahydronaphthylidene ethyl dialkyl sulfonium salt, with a 2-lower alkyl or alkenyl-4-carboxamido, carbalkoxy or carbaralkoxy-cyclopentane-1,3-dione compound. A carboxamido, carbalkoxy or carbaralkoxy substituent of Compound I may be converted to a carboxy group by saponification with a weak base.

The 2-lower alkyl or alkenyl-4-carbalkoxy or carbaralkoxy-cyclopentane-1,3-dione compounds may be prepared by adding a basic condensation agent to a solution of a 2-lower alkyl or alkenyl-3-keto-adipic acid diester in an organic solvent, such as benzene, toluene, xylene, dimethylsulfoxide, cyclohexane or tetrahydrofuran, and allowing the reaction mixture to stand at room temperature, or by refluxing the solution. The basic condensation agent is an alkali metal hydride or alkoxide, more particularly, sodium hydride or potassium hydride, or a sodium or potassium alkoxide of a lower aliphatic alcohol, such as ethanol, propanol, isopropanol, or tertiary-butanol, sodium or potassium tertiary-butoxide being the preferred alkoxide because ester interchange is reduced to a minimum by the use of this alkoxide. The condensation agent may be in the form of a solution in a lower aliphatic alcohol and if the condensation agent is sodium or potassium alkoxide, preferably in solution in the corresponding aliphatic alcohol. The reaction is conducted at a temperature within the range of from about room temperature to the boiling point of the organic solvent present in the reaction mixture. It is preferred that the reaction mixture be refluxed for about two hours. The reaction product may be conveniently isolated by cooling the reaction mixture to room temperature, concentrating to near dryness by distillation of the solvents under reduced pressure, adding sufficient water to the residue to decompose any condensation agent present, extracting the mixture with ether, separating and acidifying the aqueous phase with 1 N hydrochloric acid, and extracting the aqueous phase with ether. The latter ether extract may be washed with saturated sodium chloride solution, dried over magnesium sulfate, and concentrated to dryness under reduced pressure. The residue comprises the 2-lower alkyl or alkenyl - 4 - carbalkoxy or carbaralkoxy-cyclopentane-1,3-dione and may be crystallized from a suitable solvent or solvent mixture, such as an ether-hexane mixture.

A 2-lower alkyl or alkenyl-4-carbalkoxy or carbaralkoxycyclopentane - 1,3 - dione compound may be converted to a 2-lower alkyl or alkenyl-4-carboxamidocyclopentane-1,3-dione compound by treatment of a solution of the compound in an organic solvent with ammonia, for example, a solution of the 2-lower alkyl or alkenyl-4-carbalkoxy or carbaralkoxycyclopentane-1,3-dione compound in a lower aliphatic alcohol, such as ethanol, is treated with ammonia at an elevated temperature. This is conveniently accomplished by saturating an alcohol solution of the 2-lower alkyl or alkenyl-4-carbalkoxy or carbaralkoxycyclopentane-1,3-dione compound in a lower aliphatic alcohol with gaseous ammonia and heating the resulting solution in a sealed tube for a period of about four hours, cooling the reaction mixture to room temperature, and removing the solvent and ammonia by distillation under reduced pressure. The residue is the 2-lower alkyl or alkenyl-4-carboxamidocyclopentane-1,3-dione compound and may be recrystallized from a solvent, such as an acetone-water solution.

The formation of a sulfonium salt, more particularly, a 6-hydroxy or substituted oxy-1,2,3,4-tetrahydronaphthylidene ethyl isothiouronium salt or a 6-hydroxy or substituted oxy - 1,2,3,4-tetrahydronaphthylidene ethyl dialkyl sulfonium salt, is accomplished by the reaction of a 1-vinyl-1-hydroxy-6-hydroxy or substituted oxy-1,2,3,4-tetrahydronaphthalene compound with thiourea or a dialkyl sulfide in the presence of a mineral acid, such as hydrochloric, sulfuric or phosphoric acid, an aliphatic acid, such as acetic, propionic, chloracetic or trifluoroacetic acid, or an aromatic acid, such as benzoic acid.

More particularly, the preparation of a sulfonium salt of 1-vinyl-1-hydroxy-6-hydroxy or substituted oxy-1,2,3,4-tetrahydronaphthalene may be conveniently accomplished by reacting a 1-vinyl-1-hydroxy-6-hydroxy or substituted oxy-1,2,3,4-tetrahydronaphthalene with thiourea or with a dialkyl sulfide, such as dimethyl sulfide or diethyl sulfide, in glacial acetic acid solution to provide the corresponding sulfonium acetate salt, more particularly, to provide a 6-hydroxy or substituted oxy - 1,2,3,4-tetrahydronaphthylidene ethyl isothiouronium acetate or a 6-hydroxy or substituted oxy-1,2,3,4-tetrahydronaphthylidene ethyl dialkyl sulfonium acetate. If a sulfonium salt of a mineral acid or a sulfonium salt of an organic acid other than acetic acid is to be formed, the reaction is conducted in an inert organic solvent in which all of the ingredients are soluble, such as ether, dioxane, benzene or toluene, or in an excess of the organic acid if it is a suitable liquid. If the sulfonium salt is to be isolated, it is preferred that at least a 20% excess amount of the 1-vinyl-1-hydroxy-6-hydroxy or substituted oxy - 1,2,3,4-tetrahydronaphthalene compound be present in the reaction mixture. The reaction is conducted at a temperature of from about 15° C. to about 40° C. The reaction is completed after the reaction mixture is stirred for about one to four hours. To isolate the sulfonium salt, the solvents are removed by distillation under reduced pressure and the residue is crystallized from a suitable solvent, such as ether or acetone. If the only solvent present is acetic acid and the sulfonium acetate is formed, the sulfonium acetate is precipitated upon the addition of ether to the reaction mixture and is then removed by filtration. If the sulfonium salt is the salt of an inorganic acid, the salt precipitates from the reaction mixture as it is formed and may be removed by filtration and crystallized from a suitable solvent such as acetone.

The condensation of the sulfonium salt with a 2-lower alkyl or alkenyl-4-carboxamido, carbalkoxy or carbaralkoxycyclopentane-1,3-dione compound to provide Compound I may be conveniently accomplished by the use of an organic solvent in which both reactants are soluble, more particularly, in a lower aliphatic alcohol, such as tertiary-butanol, acetonitrile, tetrahydrofuran, dimethyl sulfoxide, dimethylformamide, or dioxane, or in an organic solvent-water mixture, or in water alone. The reaction is conducted at a temperature from about room temperature to the refluxing temperature of the reaction mixture. The reaction is most advantageously conducted in solution in tertiary-butanol at reflux temperature or in a water-ether solvent mixture at room temperature. The reaction mixture is stirred, preferably under a blanket of nitrogen, and is complete after stirring from about one to five hours. To isolate the product from the reaction mixture, the reaction mixture is cooled to room temperature and water is added. The resulting mixture is extracted with ether, the ether extract is washed with potassium bicarbonate solution and then with saturated sodium chloride solution. The ether solution is dried over magnesium sulfate and the ether is removed by distillation under reduced pressure. The residue of crude condensation product is purified by crystallization from a suitable solvent such as methanol or ether. If the reaction is conducted at a temperature of from about 15° C. to the boiling point of ether, the reaction mixture is cooled to room temperature after the reaction is complete, and the ether layer is removed. The water layer is then extracted with ether, the extract is combined with the original ether layer and the ether solution is washed with aqueous sodium bicarbonate and then with saturated sodium chloride solution. The ether solution is dried over magnesium sulfate and the ether is removed by distillation under reduced pressure. The residue of crude Compound I is crystallized from a suitable solvent, such as methanol or ether or an ether-hexane mixture.

In one modification, the sulfonium salt is not isolated in pure form but the reaction mixture from the formation of the sulfonium salt is concentrated to dryness by distillation under reduced pressure and a suitable solvent, such as any of the solvents listed above as suitable for use in the condensation of a sulfonium salt with a cycloaliphatic-1,3-dione, and the 2-lower alkyl or alkenyl-4-carboxamido, carbalkoxy or carbaralkoxycyclopentane-1,3-dione compound are added to the crude residue containing the sulfonium salt. In this modification, it is preferred that equi-molar amounts of the reactants be used in the preparation of the sulfonium salt. The condensation reaction and isolation of the reaction product is carried out in the same manner as described above in connection with the condensation of an isolated sulfonium salt with a cycloaliphatic-1,3-diketone.

The condensation of a 1-vinyl-1-hydroxy-6-hydroxy or substituted oxy-1,2,3,4 - tetrahydronaphthalene compound with a 2-lower alkyl or alkenyl-4-carboxamido, carbalkoxy or carbaralkoxycyclopentane-1,3-dione compound to provide Compound I is conveniently accomplished by reacting under acidic conditions, preferably at a pH within the range of from about 3 to about 6, substantially equimolar amounts of the two reactants in a polar solvent, such as methanol, ethanol, tertiary-butanol, or a mixed solvent such as methanol, ethanol or tertiary-butanol and an aromatic hydrocarbon, such as benzene, toluene or xylene, at a temperature within the range of from about room temperature to 140° C. Acidic conditions may be obtained by adding a lower aliphatic acid, preferably acetic acid, to the reaction mixture. The appropriate acidic conditions are also obtained by using an excess of the 2-lower alkyl or alkenyl-4-carboxamido, carbalkoxy or carbaralkoxycyclopentane-1,3-dione compound. The condensation product may be conveniently isolated by cooling the reaction mixture, concentrating under vacuum, adding a non-polar organic solvent, such as ether, to precipitate unreacted cycloaliphatic-1,3-dione compound, removing the unreacted cycloaliphatic-1,3-dione compound by filtration, washing the precipitate with ether, combining the ether wash with the original filtrate, washing the combined ether solution with an aqueous solution of a weak base, such as potassium bicarbonate, drying the ether solution, and concentrating the ether solution to dryness preferably under vacuum. The residue of Compound I may be purified, if desired, by crystallization from a suitable solvent, such as methanol or ether or an ether-hexane mixture.

The C-ring of Compound I may be conveniently closed with the elimination of one molecule of water by keeping a solution of any such compound in formic acid at a temperature of from about 15° C. to about 30° C., or by heating a solution of the compound in an inert solvent, such as benzene, in the presence of para-toluenesulfonic acid at a temperature of about 80° C. To isolate the reaction product, the solution is then cooled, washed with a basic solution such as an aqueous sodium carbonate solution, and filtered. The solvent is removed by distillation. The residue of Compound II may be purified, if desired, by recrystallization from a suitable solvent, such as ethyl acetate or methanol.

Compound II may also be obtained directly without isolation of Compound I by a one-step condensation of a 1-vinyl-1-hydroxy-6-hydroxy or substituted oxy-1,2,3,4-tetrahydronaphthalene compound with a 2-lower alkyl or alkenyl-4-carboxamido, carbalkoxy or carbaralkoxycyclopentane-1,3-dione compound. The one-step condensation may be conveniently accomplished by refluxing a solution or substantially equimolar amounts of the two reactants and an organic acid such as acetic acid or propionic acid in an inert solvent such as xylene, benzene or dioxane. The reaction is preferably conducted in an inert atmosphere, such as in an atmosphere of nitrogen. The solution is cooled and filtered to remove any precipitated unreacted reactants. The precipitated unreacted reactants are washed with ether and the ether wash is combined with the filtrate. The combined solution is washed with an aqueous solution of a weak alkali, such as potassium bicarbonate, and the washed solution is dried and evaporated to dryness. The residue of Compound II may be purified, if desired, by crystallization from a suitable solvent, such as ether-petroleum ether.

Compound II may be hydrogenated at the $\Delta^{14}$ bond with hydrogenation of any alkenyl group at the 13-position, to provide Compound III having a hydrogen atom at the 14-position in the alpha-position, by shaking a solution of Compound II in a hydrocarbon solvent, such as benzene, toluene or xylene, containing a catalyst, such as 2% palladised calcium carbonate with hydrogen. Compound III may be isolated by filtration, removal of the solvent and crystallization from a solvent, such as methanol.

Compound III may be selectively reduced at the $\Delta^8$ bond by potassium or sodium in liquid ammonia with simultaneous reduction of the 17-keto group to a hydroxyl group to provide Compound IV which has hydrogen atoms on the C-14 and C-9 carbon atoms in the alpha-position and a hydrogen atom on the C-8 carbon atom in the beta-position. A solution of Compound IV in a suitable solvent, such as dioxane, or tetrahydrofuran, is added to a solution of potassium in liquid ammonia. Ammonium acetate and water are added and the mixture is extracted with ether. The ether is removed and the residue of Compound IV may be purified by crystallization from a solvent, such as a benzene-hexane solution.

The 17-hydroxy group of Compound IV may be oxidized to a 17-keto group by adding concentrated, preferably about 8-normal, aqueous chromic acid solution to a solution of Compound IV in acetone or other inert organic solvent containing anhydrous magnesium sulfate and then adding an alcohol, such as isopropanol, and sodium hydrogen carbonate. The reaction mixture is filtered and the oxidation product, Compound V, is obtained as a resdiue by removing the solvent from the filtrate. The residue is dissolved in ether and the ether solution is passed through a column of neutral alumina. The product is removed from the alumina by extraction with hot methanol and the oxidation product is obtained in crystalline form from the cooled methanol solution.

The $\Delta^8$ bond of Compound III may be shifted to the $\Delta^{9(11)}$ position to provide Compound VI by refluxing Compound III with methanolic hydrochloric acid, cooling and filtering to obtain the precipitated product which may be purified by crystallizing from a methanol-ethanol solution.

The $\Delta^{9(11)}$ bond of Compound VI may be catalytically hydrogenated to provide Compound V by shaking a solution of Compound VI in ethanol containing 10% palladised charcoal with hydrogen, filtering, removing the solvent and recrystallizing from a suitable solvent, such as methanol.

The ether linkage of the 3-substituted oxy form of Compounds I through VI may be readily split to provide the corresponding 3-hydroxy form by any suitable procedure, such as by treatment with pyridine hydrobromide at elevated temperatures.

Hydrogenation of Compound II or VI in which $R_1$ is a benzyl or substituted benzyl substituent or in which a carbaralkoxy substituent is present on the C-15 carbon atom and $R_3$ is a benzyloxy or substituted benzyloxy substituent, results in the formation of Compound III or V which has a hydroxy substituent on the C-3 carbon atom or a carboxy substituent on the C-15 carbon atom.

A carbalkoxy, carbaralkoxy or carboxamido substituent on the C-15 carbon atom of Compounds I, II, III, IV, V or VI may be saponified to a carboxy substituent by refluxing under nitrogen a solution of the compound in a lower aliphatic alcohol, preferably methanol or ethanol, which contains a weak base, such as barium hydroxide, and as much water as can be present and still permit the compound to be saponified to be in solution, cooling the reaction mixture, adding an acid, such as hydrochloric acid, in an amount sufficient to react with all the base used in the reaction and extracting the reaction product with ether.

Any of Compounds II, III, IV, V and VI which have a carboxy substituent on the C-15 carbon atom, may be resolved by combining with a suitable optically active alkaloid base, such as brucine, strychnine, quinine or cinchonine, to form a steroid-alkaloid base salt, and separating the diastereomers. The separated diastereomers are then converted into optically active acid and optically active base. The optically active acid and opticaly acitve alkaloid base are finally separated and purified. Steroid-optically active base diastereomeric salts may be conveniently formed by preparing a solution in a suitable solvent, such as a lower aliphatic alcohol or acetone or a mixture thereof, of substantially equi-molar amounts of the 15-carboxy steroid and an optically active alkaloid base, adding water to precipitate the diastereomeric salts and removing the precipitated salts by filtration. The diastereomers may be separated by any suitable means, such as fractional crystallization from a suitable solvent, such as a lower aliphatic alcohol of acetone or mixtures thereof, or mixtures thereof with water. The separated diastereomers may be converted to optically active acid and optically active base by any suitable method, such as by acidifying a solution of the salt with a mineral acid or with a lower aliphatic acid and removing the precipitated optically active acid by filtration.

Resolution of Compounds II, III, IV, V and VI which have a carboxy substituent on the C–15 carbon atom, may also be accomplished by forming an ester of the carboxy compound with an optically active alcohol, such as l-menthol or l-borneol, separating the diastereomers and saponifying the diastereomers to provide the separate optically active carboxy compounds. Resolution in this manner may be accomplished by refluxing a solution of the carboxy compound to be resolved and an optically active alcohol, such as l-menthol or l-borneol, in benzene containing a small amount of para-toluenesulfonic acid, in a system containing a water separator so that the water formed during the course of the reaction is removed from the reaction mixture. After refluxing until no more water is produced by the reaction, the reaction mixture is cooled to room temperature and washed with cold aqueous sodium bicarbonate solution and then with water. The benzene is removed by distillation under reduced pressure and any excess optically active alcohol is removed by steam distillation. The residue is a mixture of diastereomeric esters. The diastereomeric esters may be separated by fractional crystallization of the diastereomeric ester mixture from a suitable solvent, such as a chloroform-hexane or ethanol-hexane solvent mixture. The optically active isomers of the starting carboxy compound are obtained upon the saponification of the optically active diastereomeric esters. Saponification may be conveniently accomplished by heating under nitrogen the separate optically active diastereomeric esters in an ethanol solution of a strong base, such as sodium or potassium hydroxide, removing the ethanol by distillation under reduced pressure, adding water to the residue, extracting with ether, removing and acidifying the aqueous phase to Congo red with an acid, such as hydrochloric acid while the temperature is at 0° to 5° C., and filtering to obtain the precipitated optically active isomers of the 15-carboxy steroid.

Optically active Compounds I, II, III, IV, V and VI having a carboxy substituent on the C–15 carbon atom may be decarboxylated by warming a solution of any such compound, preferably under nitrogen, in a lower aliphatic acid, such as acetic acid, containing a small amount of an acid, such as hydrochloric acid. After decarboxylation is complete, water is added to the reaction mixture and the decarboxylated product may be recovered by extraction with a suitable solvent, such as ether.

If a tetrahydropyranyloxy or benzyloxy group is present at the 3-position, treatment of Compound III with methanolic hydrochloric acid to shift the $\Delta^8$ bond to the $\Delta^{9,11}$ position to provide Compound VI removes the tetrahydropyranyl or benzyloxy group and the Compound VI which results has a hydroxy group at the 3-position.

The following examples illustrate methods of carrying out the present invention, but it is to be understood that these examples are given for purposes of illustration and not of limitation.

Example 1.—3-methoxy-13 methyl-15-carbomethoxy-gona, 1,3,5(10),8,14-pentaen-17-one A mixture obtained by adding 15.10 ml. of 1 N potassium tertiary-butoxide in tertiary-butanol to 3.05 g. of dimethyl 2-methyl-3-oxo-adipate in solution in 20 ml. of xylene is refluxed for two hours. The reaction mixture is cooled to room temperature and the solvents are substantially removed by distillation under reduced pressure. Ice water is added to the residue and the resulting mixture is extracted with ether. The basic aqueous phase is separated from the ether phase, acidified with cold 1 N hydrochloric acid and extracted with ether. The ether extract is washed with saturated sodium chloride solution, dried over magnesium sulfate, and the ether is removed by heating on a steam bath. The residue of 2-methyl-4-carbomethoxycyclopentanedione-1,3 is crystallized from ether-hexane and has a melting point of 136–138° C.

A mixture of 1.02 g. of 1-vinyl-1-hydroxy-6-methoxy-1,2,3,4-tetrahydronaphthalene and 850 mg. of 2-methyl-4-carbomethoxycyclopentanedione-1,3, in four ml. of xylene and two ml. of tertiary-butanol is allowed to stand with stirring at 25° C. for twenty hours. 30 ml. of ether are then added and the precipitated 2-methyl-4-carbomethoxycyclopentanedione-1,3 is removed by filtration. The filtrate is washed with 5% aqueous bicarbonate solution, dried over magnesium sulfate, and concentrated to dryness under reduced pressure. The residue is 3-methoxy-8,14 - seco - 13-methyl-15-carbomethoxy-gona-1,3,5(10),9(11)-tetraene-14,17-dione.

A solution of 580 mg. of 3-methoxy-8,14-seco-13,methyl - 15-carbomethoxy-gona-1,3,5(10),9(11)-tetraene-14,17-dione in fifteen ml. of methanol and 0.8 ml. of 6 N hydrochloric acid is maintained for one hour at a temperature of 25° C. Fifteen ml. of benzene are then added and the mixture is concentrated to dryness under reduced pressure. The residue is 3-methoxy-13-methyl-15-carbomethoxy-gona-1,3,5(10),8,14-pentaen-17-one and is crystallized from a methanol-ethyl acetate solution. The crystalline material has a M.P. of 165°–170° C.

Example 2.—3-methoxy-13-methyl-15-carbethoxy-gona-1,3,5(10),8,14-pentaen-17-one

A mixture obtained by adding 4.17 ml. of 1 N potassium tertiary-butoxide in tertiary-butanol to one gram of diethyl 2-methyl-3-oxo-adipate in solution in six milliliters of xylene, is refluxed for two hours with stirring. The reaction mixture is cooled to room temperature and substantially all of the solvents are removed by distillation under reduced pressure. Ice water is added to the residue and the mixture is extracted with ether. The basic aqueous phase is separated from the ether phase and acidified with cold 1 N hydrochloric acid and extracted with ether. The ether extract is washed with saturated sodium chloride solution, dried over magnesium sulfate, and the ether is removed on a steam bath. The residue is crystallized from ether-hexane and 400 mg. of 2-methyl-4-carbethoxycyclopentanedione-1,3 are obtained. The product is recrystallized from ether-hexane and the resulting material has a melting point of 95°–97° C.

A mixture of 1.02 g. of 1-vinyl-1-hydroxy-6-methoxy-1,2,3,4-tetrahydronaphthalene and 850 mg. of 2-methyl-4-carbethoxycyclopentanedione-1,3 in four ml. of xylene and 3 ml. of tertiary-butanol is maintained at a temperature of 25° C. with stirring for twenty hours. 30 ml. of ether are then added and the precipitated 2-methyl-4-carbethoxycyclopentanedione-1,3 is removed by filtration. The filtrate is washed with 5% aqueous potassium bicarbonate solution, dried over magnesium sulfate, and concentrated to dryness under reduced pressure. The residue is 3-methoxy - 8,14 - seco - 13 - methyl - 15 - carbethoxy - gona-1,3,5(10),9(11)-tetraene-14,17-dione.

580 mg. of 3-methoxy-8,14-seco-13-methyl-15-carbethoxy-gona-1,3,5(10),9(11)-tetraene-14,17-dione in solution in fifteen ml. of methanol and 0.08 ml. of 6 N hydrochloric acid is maintained at a temperature of 25° C. for one hour. Fifteen ml. of benzene are then added and the mixture is concentrated to dryness under reduced pressure. The residue is 3-methoxy-13-methyl-15-carbethoxy-gona-1,3,5(10),8,14-pentaen-17-one and is crystallized from a solution of methanol and ethyl acetate. The crystallized material has a M.P. of 161–163° C.

Example 3.—3 - methoxy - 13 - methyl-15-carbomethoxy-gona-1,3,5(10),8,14-pentaen-17-one and 3-methoxy-13-methyl-gona-1,3,5(10),8,14-pentaen-17-one A mixture of 306 mg. of 1-vinyl-1-hydroxy-6-methoxy-1,2,3,4-tetrahydronaphthalene and 255 mg. of 2-methyl-4-carbomethoxycyclopentanedione-1,3 to two ml. of xylene and 1 ml. of acetic acid is refluxed for two hours. The reaction mixture is cooled to room temperature and 20 ml. of ether are added. The precipitated 2-methyl-4-carbomethoxycyclopentanedione-1,3 is removed by filtration. The filtrate is washed with 5% aqueous potassium bicarbonate solution, dried over magnesium sulfate, and concentrated to dryness under reduced pressure. The residue is a mixture of 3-methoxy-13-methyl-15-carbomethoxy-gona-1,3,5(10),8,14-pentaen-17-one and 3-methoxy-13-methyl-gona-1,3,5(10),8,14-pentaen-17-one. The two reaction products are separated by chromatography on florisil.

Example 4.—3-methoxy-13-methyl-15-carboxamido-gona-1,3,5(10),8,14-pentaen-17-one A solution of 1.2 grams of 2-methyl-4-carbethoxycyclopentanedione-1,3 in 18 ml. of ethanol is cooled to 0° C. and saturated with gaseous ammonia. The resulting mixture is sealed in a tube, heated to 80° C. and maintained at that temperature for four hours. The tube containing the reaction mixture is cooled to 20° C., the reaction mixture is removed from the tube, and ethanol and the unreacted gaseous ammonia are removed by distillation under reduced pressure. The residue of 1-amino-2-methyl-4-carboxamidocyclopent-2-en-3-one is dissolved in 50% aqueous acetone and the aqueous acetone solution is concentrated to dryness under reduced pressure. This residue is 2-methyl-4-carboxamidocyclopentanedione-1,3 and has a melting point of 219–223° C.

A mixture of 500 mg. of 1-vinyl-1-hydroxy-6-methoxy-1,2,3,4-tetrahydronaphthalene and 380 mg. of 2-methyl-4-carboxamidocyclopentanedione-1,3 in four ml. of tertiary-butanol is refluxed for two hours. The mixture is cooled and concentrated to dryness under reduced pressure. Twenty ml. of ether are added and the insoluble 2-methyl-4-carboxamidocyclopentanedione-1,3 is removed by filtration. The filtrate is washed with 5% aqueous sodium bicarbonate solution, dried over magnesium sulfate, and concentrated to dryness under reduced pressure. The residue is 3-methoxy-8,14-seco-13-methyl-15-carboxamido-gona-1,3,5(10),9(11)-tetraene-14,17-dione.

A solution of 200 mg. of 3-methoxy-8,14-seco-13-methyl-15-carboxamido-gona-1,3,5(10),9(11)-tetraene-14,17-dione in four ml. of benzene containing ten mg. of paratoluenesulfonic acid is refluxed for fifteen minutes. The solution is cooled and extracted with 5% aqueous potassium bicarbonate solution, dried over magnesium sulfate, and concentrated to dryness under reduced pressure. The residue is 3-methoxy-13-methyl-15-carboxamido-gona-1,3,5(10),8,14-pentaen-17-one.

Example 5.—3-methoxy-13-methyl-15-carboxamido-gona-1,3,5(10),8,14-pentaen-17-one A solution of 500 mg. of 1-vinyl-1-hydroxy-6-methoxy-1,2,3,4-tetrahydronaphthalene and 380 mg. of 2-methyl-4-carboxamidocyclopentanedione-1,3 in four ml. of xylene and two ml. of acetic acid is refluxed for 90 minutes. The reaction mixture is cooled to room temperature and 20 ml. of ether are added. The precipitated 2-methyl-4-carboxamidocyclopentanedione-1,3 is removed by filtration. The filtrate is washed with 5% aqueous potassium bicarbonate solution, dried over magnesium sulfate, and concentrated to dryness under reduced pressure. The residue is 3-methoxy-13-methyl-15-carboxamido-gona-1,3,5(10),8,14-pentaen-17-one.

Example 6.—3-methoxy-13-methyl-15-carboxy-gona-1,3,5(10),8,14-pentaen-17-one

A mixture of 400 mg. of 3-methoxy-13-methyl-15-carbomethoxy-gona-1,3,5(10),8,14-pentaen-17-one and 400 mg. of barium hydroxide in 10 ml. of 60% aqueous methanol is refluxed under nitrogen for 90 minutes. The solution is cooled and 50 ml. of 1 N hydrochloric acid is added. The mixture is extracted with ether. The ether extract is washed with saturated sodium chloride solution, dried over magnesium sulfate, and concentrated to dryness under reduced pressure. The residue is 3-methoxy-13-methyl-15-carboxy-gona-1,3,5(10),8,14-pentaen-17-one.

Example 7.—3-methoxy-13-methyl-gona-1,3,5(10),8,14-pentaen-17-one

The 3 - methoxy - 13 - methyl - 15 - carboxy - gona-1,3,5(10),8,14-pentaen-17-one, obtained by the process of Example 6, is dissolved in five ml. of acetic acid and 0.5 ml. of concentrated hydrochloric acid and warmed under nitrogen on a steam bath for forty minutes. The mixture is cooled, fifty ml. of water are added and the whole is extracted with ether. The extract is washed with 5% aqueous potassium bicarbonate solution, washed with saturated aqueous sodium chloride solution, dried over magnesium sulfate, and concentrated to dryness under reduced pressure. The residue is crystallized from methanol. The crystallized material is 3-methoxy-13-methyl-gona-1,3,5(10),8,14-pentaen-17-one.

Example 8.—3-methoxy-8,14-seco-13-methyl-15-carbomethoxy-gona-1,3,5(10),9(11)-tetraene-14,17-dione A solution of 3.06 g. of 1-vinyl-1-hydroxy-6-methoxy-1,2,3,4-tetrahydronaphthalene and 0.76 g. of thiourea in 12 ml. of acetic acid is stirred at 25° C. for four hours. The mixture is diluted with 60 ml. of ether and the precipitate of 6 - methoxy-1,2,3,4-tetrahydronaphthylidene ethyl isothiouronium acetate is collected by filtration. 1.69 grams of the product, having a melting point of 123–127° C., are obtained.

Analysis.—Calculated for $C_{16}H_{22}O_3N_2S$: C, 59.60; H, 6.88; N, 8.69. Found: C, 59.87; H, 6.28; N, 8.85. U. V. spectrum (methanol): $\lambda$max. 275 m$\mu$ ($\epsilon$ 19,500), 300 m$\mu$ ($\epsilon$ 8,650).

The filtrate is concentrated to dryness under reduced pressure and ether is added. An additional 900 mg. of product is crystallized from the ether solution. This material has a melting point of 122–126° C.

A solution of 322 mg. of 6-methoxy-1,2,3,4-tetrahydronaphthylidene ethyl isothiouronium acetate and 112 mg. of 2-methyl-4-carbomethoxy-1,3-cyclopentanedione in 5 ml. of tertiary-butanol is refluxed under nitrogen with stirring for three hours. The reaction mixture is cooled and the solvent is removed by distillation under reduced pressure. Ether is added and the ether-insoluble material is removed by filtration. The ether filtrate is washed with 5% aqueous sodium bicarbonate solution and then with aqueous saturated sodium chloride solution. The ether solution is dried over magnesium sulfate and filtered. The ether is removed by distillation under reduced pressure. The residue is crystalline 3-methoxy-8,14-seco-13-methyl-15-carbomethoxy-gona-1,3,5(10),9(11)-tetraene - 14,17-dione.

Example 9.—3-methoxy-8,14-seco-13-methyl-15-carbomethoxy-gona-1,3,5(10),9(11)-tetraene-14,17-dione A solution of 3.00 g. of 1-vinyl-1-hydroxy-6-methoxy-1,2,3,4-tetrahydronaphthalene and 0.65 g. of dimethyl sulfide in 10 ml. of acetic acid is stirred at 25° C. for 18 hours. The solvent is removed by distillation under reduced pressure. The residue is 6-methoxy-1,2,3,4-tetrahydronaphthylidene ethyl dimethyl sulfonium acetate and is purified by crystallization from ether.

A mixture of 1.00 g. of 6-methoxy-1,2,3,4-tetrahydronaphthylidene ethyl dimethyl sulfonium acetate and 600 mg. of 2-methyl-4-carbomethoxy-cyclopentane-1,3-dione and 10 ml. of tertiary-butanol is refluxed for four hours. The solvent is removed under reduced pressure and the residue is partitioned between water and ether. The ether extract is removed and washed with 5% aqueous potassium bicarbonate solution and then with saturated aqueous sodium chloride solution. The ether solution is dried over magnesium sulfate, filtered and the ether is removed by distillation under reduced pressure. Crystalline 3- methoxy - 8,14 - seco-13-methyl-15-carbomethoxy-gona-1,3,5(10),9(11) - tetraene-14,17 - dione is obtained by crystallization of the residue from methanol.

Example 10.—3-ethoxy-8,14-seco-13-methyl-15-carboxamidogona-1,3,5(10),9(11)-tetraene-14,17-dione A mixture of 226 mg. of 6-ethoxy-1,2,3,4-tetrahydronaphthylidene ethyl isothiouronium acetate, 129 mg. of 2-methyl-4-carboxamidocyclopentane-1,3-dione in 3 ml. of tertiary-butanol is refluxed for three hours. The solvent is removed by distillation under reduced pressure and the residue is triturated with ether and filtered. The filtrate is concentrated to dryness by distillation under reduced pressure. The residue is 3-ethoxy-8,14-seco-13-methyl-15-carboxamidogona-1,3,5(10),9(11) - tetraene-14,17-dione.

Example 11.—3-isopropoxy-8,14-seco-13-methyl-15-carbethoxygona-1,3,5(10),9(11)-tetraene-14,17-dione A mixture of 226 mg. of 6-isopropoxy-1,2,3,4-tetrahydronaphthylidene ethyl isothiouronium acetate, 129 mg. of 2-methyl-4-carbethoxycyclopentane-1,3-dione in 3 ml. of tertiary-butanol is refluxed for three hours. The solvent is removed by distillation under reduced pressure and the residue is triturated with ether and filtered. The filtrate is concentrated to dryness by distillation under reduced pressure. The residue is 3-isopropoxy - 8,14 - seco-13-methyl-15-carbethoxygona - 1,3,5(10),9(11) - tetraene-14,17-dione.

Example 12.—3-ethoxy-13-ethyl-15-carbomethoxy-gona-1,3,5(10),8,14-pentaen-17-one A mixture obtained by adding 15.10 ml. of 1 N potassium tertiary-butoxide in tertiary-butanol to 3.05 g. of dimethyl 2-ethyl-3-oxo-adipate in solution in 20 ml. of xylene is refluxed for two hours. The reaction mixture is cooled to room temperature and the solvents are substantially removed by distillation under reduced pressure. Ice water is added to the residue and the resulting mixture is extracted with ether. The basic aqueous phase is separated from the ether phase, acidified with cold 1 N hydrochloric acid and extracted with ether. The ether extract is washed with saturated sodium chloride solution, dried over magnesium sulfate, and the ether is removed by heating on a steam bath. The residue of 2-ethyl-4-carbomethoxycyclopentanedione-1,3 is crystallized from ether-hexane.

A mixture of 1.02 g. of 1-vinyl-1-hydroxy-6-ethoxy-1,2,3,4-tetrahydronaphthalene and 850 mg. of 2-ethyl-4-carbomethoxycyclopentanedione-1,3 in four ml. of xylene and two ml. of tertiary-butanol is allowed to stand with stirring at 25° C. for twenty hours. 30 ml. of ether are then added and the precipitated 2-ethyl-4-carbomethoxycyclopentanedione-1,3 is removed by filtration. The filtrate is washed with 5% aqueous bicarbonate solution, dried over magnesium sulfate, and concentrated to dryness under reduced pressure. The residue is 3-ethoxy-8,14-seco-13-ethyl-15-carbomethoxy-gona-1,3,5(10),9(11)-tetraene-14,17-dione.

A solution of 580 mg. of 3-ethoxy-8,14-seco-13-ethyl-15-carbomethoxy-gona-1,3,5(10),9(11)-tetraene - 14,17-dione in fifteen ml. of methanol and 0.8 ml. of 6 N hydrochloric acid is maintained for one hour at a temperature of 25° C. Fifteen ml. of benzene are then added and the mixture is concentrated to dryness under reduced pressure. The residue is 3 - ethoxy - 13-ethyl-15-carbomethoxy-gona-1,3,5(10),8,14-pentaen-17-one and is crystallized from a methanol-ethyl acetate solution.

Example 13.—3-benzyloxy-13-allyl-15-carbomethoxy-gona-1,3,5(10),8,14-pentaen-17-one A mixture obtained by adding 15.10 ml. of 1 N potassium tertiary-butoxide in tertiary-butanol to 3.05 g. of dimethyl 2-allyl-3-oxo-adipate in solution in 20 ml. of xylene is refluxed for two hours. The reaction mixture is cooled to room temperature and the solvents are substantially removed by distillation under reduced pressure. Ice water is added to the residue and the resulting mixture is extracted with ether. The basic aqueous phase is separated from the ether phase, acidified with cold 1 N hydrochloric acid and extracted with ether. The ether extract is washed with saturated sodium chloride solution, dried over magnesium sulfate, and the ether is removed by heating on a steam bath. The residue of 2-allyl-4-carbomethoxycyclopentanedione-1,3 is crystallized from ether-hexane.

A mixture of 1.02 g. of 1-vinyl-1-hydroxy-6-benzyloxy-1,2,3,4-tetrahydronaphthalene and 850 mg. of 2-allyl-4-carbomethoxycyclopentanedione-1,3 in four ml. of xylene and two ml. of tertiary-butanol is allowed to stand with stirring at 25° C. for twenty hours. 30 ml. of ether are then added and the precipitated 2-allyl-4-carbomethoxycyclopentanedione-1,3 is removed by filtration. The filtrate is washed with 5% aqueous bicarbonate solution, dried over magnesium sulfate, and concentrated to dryness under reduced pressure. The residue is 3-benzyloxy-8,14-seco-13-allyl - 15 - carbomethoxy-gona-1,3,5(10),9(11)-tetraene-14,17-dione.

A solution of 580 mg. of 3-benzyloxy-8,14-seco-13-allyl - 15 - carbomethoxy-gona-1,3,5(10),9(11)-tetraene-14,17-dione in fifteen ml. of methanol and 0.8 ml. of 6 N hydrochloric acid is maintained for one hour at a temperature of 25° C. Fifteen ml. of benzene are then added and the mixture is concentrated to dryness under reduced pressure. The residue is 3-benzyloxy-13-allyl-15-carbomethoxy-gona-1,3,5(10),8,14-pentaen-17-one and is crystallized from a methanol-ethyl acetate solution.

Example 14.—3-phenoxy-13-isopropyl-15-carbomethoxy-gona-1,3,5(10),8,14-pentaen-17-one A mixture obtained by adding 15.10 ml. of 1 N potassium tertiary-butoxide in tertiary-butanol to 3.05 g. of dimethyl 2-isopropyl-3-oxo-adipate in solution in 20 ml. of xylene is refluxed for two hours. The reaction mixture is cooled to room temperature and the solvents are substantially removed by distillation under reduced pressure. Ice water is added to the residue and the resulting mixture is extracted with ether. The basic aqueous phase is separated from the ether phase, acidified with cold 1 N hydrochloric acid and extracted with ether. The ether extract is washed with saturated sodium chloride solution, dried over magnesium sulfate, and the ether is removed by heating on a steam bath. The residue of 2-isopropyl-4-carbomethoxycyclopentanedione-1,3 is crystallized from ether-hexane.

A mixture of 1.02 g. of 1-vinyl-1-hydroxy-6-phenoxy-1,2,3,4-tetrahydronaphthalene and 850 mg. of 2-isopropyl-4 - carbomethoxycyclopentanedione - 1,3 in four ml. of xylene and two ml. tertiary-butanol is allowed to stand with stirring at 25° C. for twenty hours. 30 ml. of ether are then added and the precipitated 2-isopropyl-4-carbomethoxycyclopentanedione-1,3 is removed by filtration. The filtrate is washed with 5% aqueous bicarbonate solution, dried over magnesium sulfate, and concentrated to dryness under reduced pressure. The residue is 3-phenoxy-8,14-seco-13-isopropyl-15-carbomethoxy-gona - 1,3,5(10), 9(11)-tetraene-14,17-dione.

A solution of 580 mg. of 3-phenoxy-8,14-seco-13-isopropyl-15-carbomethoxy-gona - 1,3,5(10),9(11)-tetraene-14,17-dione in fifteen ml. of methanol and 0.8 ml. of 6 N hydrochloric acid is maintained for one hour at a temperature of 25° C. Fifteen ml. of benzene are then added and the mixture is concentrated to dryness under reduced pressure. The residue is 3-phenoxy-13-isopropyl-15-carbomethoxy-gona-1,3,5(10),8,14-pentaen - 17 - one and is crystallized from a methanol-ethyl acetate solution.

Example 15.—3-tetrahydropyranyloxy-13-(2-butenyl)-15-carbomethoxy-gona-1,3,5(10),8,14-pentaen-17-one A mixture obtained by adding 15.10 ml. of 1 N potassium tertiary-butoxide in tertiary-butanol to 3.05 g. of dimethyl 2-(2-butenyl)-3-oxo-adipate in solution in 20 ml. of xylene is refluxed for two hours. The reaction mixture is cooled to room temperature and the solvents are substantially removed by distillation under reduced pressure. Ice water is added to the residue and the resulting mixture is extracted with ether. The basic aqueous phase is separated from the ether phase, acidified with cold 1 N hydrochloric acid and extracted with ether. The ether extract is washed with saturated sodium chloride solution, dried over magnesium sulfate, and the ether is removed by heating on a steam bath. The residue of 2-(2-butenyl)-4-carbomethoxycyclopentanedione-1,3 is crystallized from ether-hexane.

A mixture of 1.02 g. of 1-vinyl-1-hydroxy-6-tetrahydropyranyloxy-1,2,3,4-tetrahydronaphthalene and 850 mg. of 2-(2-butenyl) - 4 - carbomethoxycyclopentanedione-1, in four ml. of xylene and two ml. of tertiary-butanol is allowed to stand with stirring at 25° C. for twenty hours. 30 ml. of ether are then added and the precipitated 2-(2-butenyl) - 4 - carbomethoxycyclopentanedione - 1,3 is removed by filtration. The filtrate is washed with 5% aqueous bicarbonate solution, dried over magnesium sulfate, and concentrated to dryness under reduced pressure. The residue is 3-tetrahydropyranyloxy-8,14-seco-13-(2-butenyl) - 15 - carbomethoxy-gona - 1,3,5(10),9(11) - tetraene-14,17-dione.

A solution of 580 mg. of 3-tetrahydropyranyloxy-8,14-seco-13-(2-butenyl) - 15 - carbomethoxy-gona-1,3,5(10),9(11)-tetraene-14,17-dione in fifteen ml. of methanol and 0.8 ml. of 6 N hydrochloric acid is maintained for one hour at a temperature of 25° C. Fifteen ml. of benzene are then added and the mixture is concentrated to dryness under reduced pressure. The residue is 3-tetrahydropyranyloxy-13-(2-butenyl) - 15 - carbomethoxy-gona-1,3,5(10),8,14-pentaen-17-one and is crystallized from a methanol-ethyl acetate solution.

Example 16.—3-ethoxy-13-ethyl-15-carboxamidogona-1,3,5(10),8,14-pentaen-17-one

A solution of 500 mg. of 1-vinyl-1-hydroxy-6-ethoxy-1,2,3,4-tetrahydronaphthalene and 380 mg. of 2-ethyl-4-carboxamidocyclopentanedione-1,3 in four mil. of xylene and two ml. of acetic acid is refluxed for 90 minutes. The reaction mixture is cooled to room temperature and 20 ml. of ether are added. The precipitated 2-ethyl-4-carboxamidocyclophentanedione-1,3 is removed by filtration. The filtrate is washed with 5% aqueous potassium bicarbonate solution, dried over magnesium sulfate, and concentrated to dryness under reduced pressure. The residue is 3-ethoxy-13-ethyl-15-carboxamidogona-1,3,5(10),8,14-pentaen-17-one.

Example 17.—3-benzyloxy-13-allyl-15-carboxamidogona-1,3,5(10),8,14-pentaen-17-one A solution of 500 mg. of 1-vinyl-1-hydroxy-6-benzyloxy-1,2,3,4-tetrahydronaphthalene and 380 mg. of 2-allyl-4-carboxamidocyclopentanedione-1,3 in four ml. of xylene and two ml. of acetic acid is refluxed for 90 minutes. The reaction mixture is cooled to room temperature and 20 ml. of ether are added. The precipitated 2-allyl-4-carboxamidocyclopentanedione-1,3 is removed by filtration. The filtrate is washed with 5% aqueous potassium bicarbonate solution, dried over magnesium sulfate, and concentrated to dryness under reduced pressure. The residue is 3 - benzyloxy - 13 - allyl-15-carboxamidogona-1,3,5(10),8,14-pentaen-17-one.

Example 18.—3-phenoxy-13-isopropyl-15-carboxamidogona-1,3,5(10),8,14-pentaen-17-one A solution of 500 mg. of 1-vinyl-1-hydroxy-6-phenoxy-1,2,3,4-tetrahydronaphthalene and 380 mg. of 2-isopropyl-4-carboxamidocyclopentanedione-1,3 in four ml. of xylene and two ml. of acetic acid is refluxed for 90 minutes. The reaction mixture is cooled to room temperature and 20 ml. of ether are added. The precipitated 2-isopropyl-4-carboxamidocyclopentanedione-1,3 is removed by filtration. The filtrate is washed with 5% aqueous potassium bicarbonate solution, dried over magnesium sulfate, and concentrated to dryness under reduced pressure. The residue is 3-phenoxy-13-isopropyl-15-carboxamidogona-1,3,5(10),8,14-pentaen-17-one.

Example 19.—3-tetrahydropyranyloxy-13-(2-butenyl)-15-carboxamidogona-1,3,5(10),8,14-pentaen-17-one A solution of 500 mg. of 1-vinyl-1-hydroxy-6-tetrahydropyranyloxy-1,2,3,4-tetrahydronaphthalene and 380 mg. of 2-(2-butenyl)-4-carboxamidocyclopentanedione-1,3 in four ml. of xylene and two ml. of acetic acid is refluxed for 90 minutes. The reaction mixture is cooled to room temperature and 20 ml. of ether are added. The precipitated 2 - (2-butenyl)-4-carboxamidocyclopentanedione-1,3 is removed by filtration. The filtrate is washed with 5% aqueous potassium bicarbonate solution, dried over magnesium sulfate, and concentrated to dryness under reduced pressure. The residue is 3-tetrahydropyranyloxy - 13 - (2 - butenyl) - 15 - carboxamidogona-1,3,5(10),8,14-pentaen-17-one.

Example 20.—3-isopropoxy-13-methyl-15-carbethoxy-gona-1,3,5(10),8,14-pentaen-17-one A solution of 200 mg. of 3-isopropoxy-13-methyl-15-carbethoxygona-1,3,5(10),9(11)-tetraene - 14,17 - dione in four ml. of benzene containing ten mg. of paratoluenesulfonic acid is refluxed for fifteen minutes. The solution is cooled and extracted with 5% aqueous potassium bicarbonate solution, dried over magnesium sulfate, and concentrated to dryness under reduced pressure. The residue is 3-isopropoxy - 13 - methyl - 15 - carbethoxygona-1,3,5(10),8,14-pentaen-17-one.

Example 21.—3-methoxy-13-methyl-15-carboxygona-1,3,5(10),8-tetraen-17-one 6.7 grams of 3-methoxy-13-methyl-15-carbomethoxygona-1,3,5(10),8,14-pentaen-17-one in 21.5 ml. of benzene containing 2.25 g. of 2% palladised calcium carbonate is shaken with hydrogen until an equimolar amount of hydrogen is absorbed. The reaction mixture is filtered and the solvent is removed from the filtrate by distillation under reduced pressure. The residue of 3-methoxy-13-methyl-15-carbomethoxygona - 1,3,5(10),8 - tetraen-17-one is crystallized from methanol.

A mixture of the 3-methoxy-13-methyl-15-carbomethoxygona-1,3,5(10),8-tetraen-17-one from above and 1.2 g. of barium hydroxide in 30 ml. of 60% aqueous methanol is refluxed under nitrogen for 90 minutes. The solution is cooled to room temperature and 150 ml. of 1 N hydrochloric acid is added. The mixture is extracted with ether. The ether extract is washed with saturated sodium chloride solution, dried over magnesium sulfate and concentrated to dryness under reduced pressure. The residue is 3 - methoxy-13-methyl-15-carboxygona - 1,3,5(10),8-tetraen-17-one.

Example 22.—3-methoxy-13-methyl-15-carboxygona-1,3,5(10)-trien-17β-ol

One gram of 3-methoxy-13-methyl-15-carbomethoxygona-1,3,5(10),8-tetraen-17-one in 100 ml. of tetrahydrofuran is added to a solution of 1.4 g. of potassium in 150 ml. of liquid ammonia. The reaction mixture is stirred for one hour and ammonium acetate and water are then added. The reaction mixture is extracted with ether, the ether extract is dried over magnesium sulfate and filtered. The solvent is removed from the filtrate by distillation under reduced pressure. The residue of 3-methoxy-13-methyl-15-carbomethoxygona - 1,3,5(10) - trien-17β-ol is chromatographed on alumina.

A mixture of the chromatographed 3-methoxy-13-methyl-15-carbomethoxygona - 1,3,5(10) - trien-17β-ol and 800 mg. of barium hydroxide in 20 ml. of 60% aqueous methanol is refluxed under nitrogen for 90 minutes. The solution is cooled to room temperature and 50 ml. of 1 N hydrochloric acid is added. The mixture is extracted with ether, the ether extract is washed with saturated sodium chloride solution, dried over magnesium sulfate and filtered. The filtrate is concentrated to dryness under reduced pressure. The residue is 3-methoxy-13-methyl-15-carboxygona-1,3,5(10)-trien-17β-ol.

Example 23.—3-methoxy-13-methyl-15-carboxygona-1,3,5(10)-trien-17-one 0.6 milliliters of chromic acid is added with stirring to 500 mg. of 3-methoxy-13-methyl-15-carbomethoxygona-1,3,5(10)-trien-17β-ol in solution in 20 ml. of acetone containing 0.6 g. of anhydrous magnesium sulfate. The mixture is stirred for five minutes and 2 ml. of propane-2-ol and 1 g. of sodium hydrogen carbonate are added. The solids are filtered off and washed with hot chloroform. The solvent is removed from the combined filtrate and washings by distillation under reduced pressure. The residue of 3-methoxy-13-methyl-15- carbomethoxygona-1,3,5(10)-trien-17-one is percolated in ether through a column of neutral alumina. The chromatographed product is recrystallized from methanol.

A mixture of 400 mg. of 3-methoxy-13-methyl-15-carbomethoxygona-1,3,5(10)-trien-17-one obtained from above and 400 mg. of barium hydroxide in 10 ml. of 60% aqueous methanol is refluxed under nitrogen for 90 minutes. The solution is cooled to room temperature and 50 ml. of 1 N hydrochloric acid is added. The ether extract is washed with saturated sodium chloride solution, dried over magnesium sulfate and filtered. The filtrate is concentrated to dryness under reduced pressure. The residue is 3-methoxy-13-methyl-15-carboxygona-1,3,5(10)-trien-17-one.

Example 24.—3-methoxy-13-methyl-15-carboxygona-1,3,5(10),9(11)-tetraen-17-one 0.78 grams of 3-methoxy-13-methyl-15-carbomethoxygona-1,3,5(10),8-tetraen-17-one is refluxed for 45 minutes in a solution containing 19 ml. of methanol and 3.8 ml. of concentrated hydrochloric acid. The mixture is cooled and the product is filtered off and recrystallized from a solution containing equal parts by weight of methanol and ethanol. The crystallized product is 3-methoxy-13-methyl-15-carbomethoxygona-1,3,5(10),9(11)-tetraen-17-one.

A mixture of 400 mg. of the 3-methoxy-13-methyl-15-carbomethoxygona-1,3,5(10),9(11)-tetraen-17-one obtained from above and 400 mg. of barium hydroxide in 10 ml. of 60% aqueous methanol is refluxed under nitrogen for 90 minutes. The solution is cooled to room temperature and 50 ml. of 1 N hydrochloric acid is added. The mixture is extracted with ether and the ether extract is washed with saturated sodium chloride solution, dried over magnesium sulfate and filtered. The filtrate is concentrated to dryness under reduced pressure. The residue is 3-methoxy-13-methyl-15-carboxygona-1,3,5(10),9(11)-tetraen-17-one.

Example 25.—3-methoxy-13-methyl-15-carbomethoxygona-1,3,5(10)-trien-17-one

A solution of 0.31 g. of 3-methoxy-13-methyl-15-carbomethoxygona-1,3,5(10),9(11)-tetraen-17-one in 15 ml. of ethanol containing 0.3 g. of 10% palladised charcoal is shaken with hydrogen until absorption of hydrogen ceases. The reaction mixture is filtered and the ethanol is removed by distillation under reduced pressure. The residue is 3-methoxy-13-methyl-15-carbomethoxygona-1,3,5(10)-trien-17-one and is recrystallized from methanol.

Example 26.—3-benzyloxy-13-propyl-15-carboxygona-1,3,5(10),8-tetraen-17-one 6.7 grams of 3-benzyloxy-13-allyl-15-carbomethoxygona-1,3,5(10),8,14-pentaen-17-one in solution in 21.5 ml. of benzene containing 2.25 g. of 2% palladised calcium carbonate is shaken with hydrogen until an equimolar amount of hydrogen is absorbed. The reaction mixture is filtered and the solvent is removed from the filtrate by distillation under reduced pressure. The residue of 3-benzyloxy-13-propyl-15-carbomethoxygona-1,3,5(10),8-tetraen-17-one is crystallized from methanol.

A mixture of the 3-benzyloxy-13-propyl-15-carbomethoxygona-1,3,5(10),8-tetraen-17-one from above and 1.2 g. of barium hydroxide in 30 ml. of 60% aqueous methanol is refluxed under nitrogen for 90 minutes. The solution is cooled to room temperature and 150 ml. of 1 N hydrochloric acid is added. The mixture is extracted with ether. The ether extract is washed with saturated sodium chloride solution, dried over magnesium sulfate and concentrated to dryness under reduced pressure. The residue is 3-benzyloxy-13-propyl-15-carboxygona-1,3,5(10),8-tetraen-17-one.

Example 27.—3-benzyloxy-13-propyl-15-carboxygona-1,3,5(10)-trien-17β-ol

One gram of 3-benzyloxy-13-propyl-15-carbomethoxygona-1,3,5(10),8-tetraen-17-one in 100 ml. of tetrahydrofuran is added to a solution of 1.4 g. of potassium in 150 ml. of liquid ammonia. The reaction mixture is stirred for one hour and ammonium acetate and water are then added. The reaction mixture is extracted with ether, the ether extract is dried over magnesium sulfate and filtered. The solvent is removed from the filtrate by distillation under reduced pressure. The residue of 3-benzyloxy-13-propyl-15-carbomethoxygona-1,3,5(10)-trien-17β-ol is chromatographed on alumina.

A mixture of the chromatographed 3-benzyloxy-13-propyl-15-carbomethoxygona-1,3,5(10)-trien-17β-ol and 800 mg. of barium hydroxide in 20 ml. of 60% aqueous methanol is refluxed under nitrogen for 90 minutes. The solution is cooled to room temperature and 50 ml. of 1 N hydrochloric acid is added. The mixture is extracted with ether, the ether extract is washed with saturated sodium chloride solution, dried over magnesium sulfate and filtered. The filtrate is concentrated to dryness under reduced pressure. The residue is 3-benzyloxy-13-propyl-15-carboxygona-1,3,5(10)-trien-17β-ol.

Example 28.—3-benzyloxy-13-propyl-15-carboxygona-1,3,5(10)-trien-17-one 0.6 milliliters of chromic acid is added with stirring to 500 mg. of 3-benzyloxy-13-propyl-15-carbomethoxygona-1,3,5(10)-trien-17β-ol in solution in 20 ml. of acetone containing 0.6 g. of anhydrous magnesium sulfate. The mixture is stirred for five minutes and 2 ml. of propane-2-ol and 1 g. of sodium hydrogen carbonate are added. The solids are filtered off and washed with hot chloroform. The solvent is removed from the combined filtrate and washings by distillation under reduced pressure. The residue of 3-benzyloxy-13-propyl-15-carbomethoxygona-1,3,5(10)-trien-17-one is percolated in ether through a column of neutral alumina. The chromatographed product is recrystallized from methanol.

A mixture of 400 mg. of 3-benzyloxy-13-propyl-15-carbomethoxygona-1,3,5(10)-trien-17-one obtained from above and 400 mg. of barium hydroxide in 10 ml. of 60% aqueous methanol is refluxed under nitrogen for 90 minutes. The solution is cooled to room temperature and 50 ml. of 1 N hydrochloric acid is added. The ether extract is washed with saturated sodium chloride solution, dried over magnesium sulfate and filtered. The filtrate is concentrated to dryness under reduced pressure. The residue is 3-benzyloxy-13-propyl-15-carboxygona-1,3,5(10)-trien-17-one.

Example 29.—3-hydroxy-13-propyl-15-carboxygona-1,3,5(10),9(11)-tetraen-17-one 0.78 gram of 3-benzyloxy-13-propyl-15-carbomethoxygona-1,3,5(10),8-tetraen-17-one is refluxed for 45 minutes in a solution containing 19 ml. of methanol and 3.8 ml. of concentrated hydrochloric acid. The mixture is cooled and the product is filtered off and recrystallized from a solution containing equal parts by weight of methanol and ethanol. The crystallized product is 3-hydroxy-13 - propyl - 15 - carbomethoxygona - 1,3,5(10),9(11)-tetraen-17-one.

A mixture of 400 mg. of the 3-hydroxy-13-propyl-15-carbomethoxygona - 1,3,5(10),9(11) - tetraen - 17 - one obtained from above and 400 mg. of barium hydroxide in 10 ml. of 60% aqueous methanol is refluxed under nitrogen for 90 minutes. The solution is cooled to room temperature and 50 ml. of 1 N hydrochloric acid is added. The mixture is extracted with ether and the ether extract is washed with saturated sodium chloride solution, dried over magnesium sulfate and filtered. The filtrate is concentrated to dryness under reduced pressure. The residue is 3-hydroxy-13-propyl-15-carboxygona-1,3,5(10),9(11)-tetraen-17-one.

Example 30.—3-hydroxy-13-propyl-15-carbomethoxygona-1,3,5(10)-trien-17-one

A solution of 0.31 g. of 3-hydroxy-13-propyl-15-carbomethoxygona - 1,3,5(10),9(11) - tetraen - 17 - one in 15 ml. of ethanol containing 0.3 g. of 10% palladised charcoal is shaken with hydrogen until absorption of hydrogen ceases. The reaction mixture is filtered and the ethanol is removed by distillation under reduced pressure. The residue is 3-hydroxy-13-propyl-15-carbomethoxygona-1,3,5(10)-trien-17-one and is recrystallized from methanol.

Example 31.—3-phenoxy-13-isopropyl-15-carboxygona-1,3,5(10),8-tetraen-17-one 6.7 grams of 3-phenoxy-13-isopropyl-15-carbomethoxygona-1,3,5(10),8,14-pentaen-17-one in solution in 21.5 ml. of benzene containing 2.25 g. of 2% palladised calcium carbonate is shaken with hydrogen until an equimolar amount of hydrogen is absorbed. The reaction mixture is filtered and the solvent is removed from the filtrate by distillation under reduced pressure. The residue of 3 - phenoxy - 13 - isopropyl - 15 - carbomethoxygona-1,3,5(10),8-tetraen-17-one is crystallized from methanol.

A mixture of the 3-phenoxy-13-isopropyl-15-carbomethoxygona-1,3,5(10),8-tetraen-17-one from above and 1.2 g. of barium hydroxide in 30 ml. of 60% aqueous methanol is refluxed under nitrogen for 90 minutes. The solution is cooled to room temperature and 150 ml. of 1 N hydrochloric acid is added. The mixture is extracted with ether. The ether extract is washed with saturated sodium chloride solution, dried over magnesium sulfate and concentrated to dryness under reduced pressure. The residue is 3-phenoxy-13-isopropyl-15-carboxygona-1,3,5(10),8-tetraen-17-one.

Example 32.—3-phenoxy-13-isopropyl-15-carboxygona-1,3,5(10)-trien-17β-ol

One gram of 3-phenoxy-13-isopropyl-15-carbomethoxygona-1,3,5(10),8-tetraen-17-one in 100 ml. of tetrahydrofuran is added to a solution of 1.4 g. of potassium in 150 ml. of liquid ammonia. The reaction mixture is stirred for one hour and ammonium acetate and water are then added. The reaction mixture is extracted with ether, the ether extract is dried over magnesium sulfate and filtered. The solvent is removed from the filtrate by distillation under reduced pressure. The residue of 3-phenoxy - 13 - isopropyl - 15 - carbomethoxygona - 1,3,5 (10)-trien-17β-ol is chromatographed on alumina.

A mixture of the chromatographed 3-phenoxy-13-isopropyl - 15 - carbomethoxygona - 1,3,5(10) - trien - 17β-ol and 800 mg. of barium hydroxide in 20 ml. of 60% aqueous methanol is refluxed under nitrogen for 90 minutes. The solution is cooled to room temperature and 50 ml. of 1 N hydrochloric acid is added. The mixture is extracted with ether, the ether extract is washed with saturated sodium chloride solution, dried over magnesium sulfate and filtered. The filtrate is concentrated to dryness under reduced pressure. The residue is 3-phenoxy-13-isopropyl-15-carboxygona-1,3,5(10)-trien-17β-ol.

Example 33.—3-phenoxy-13-isopropyl-15-carboxygona-1,3,5(10)-trien-17-one 0.6 milliliter of chromic acid is added with stirring to 500 mg. of 3-phenoxy - 13 - isopropyl - 15 - carbomethoxygona-1,3,5(10)-trien-17β-ol in solution in 20 ml. of acetone containing 0.6 g. of anhydrous magnesium sulfate. The mixture is stirred for five minutes and 2 ml. of propane-2-ol and 1 g. of sodium hydrogen carbonate are added. The solids are filtered off and washed with hot chloroform. The solvent is removed from the combined filtrate and washings by distillation under reduced pressure. The residue of 3-phenoxy-13-isopropyl-15-carbomethoxygona-1,3,5(10)-trien-17-one is percolated in ether through a column of neutral alumina. The chromatographed product is recrystallized from methanol.

A mixture of 400 mg. of 3-phenoxy-13-isopropyl-15-carbomethoxygona-1,3,5(10)-trien-17-one obtained from above and 400 mg. of barium hydroxide in 10 ml. of 60% aqueous methanol is refluxed under nitrogen for 90 minutes. The solution is cooled to room temperature and 50 ml. of 1 N hydrochloric acid is added. The ether extract is washed with saturated sodium chloride solution, dried over magnesium sulfate and filtered. The filtrate is concentrated to dryness under reduced pressure. The residue is 3-phenoxy-13-isopropyl-15-carboxygona-1,3, 5(10)-trien-17-one.

Example 34.—3-phenoxy-13-isopropyl - 15-carboxygona-1,3,5(10),9(11)-tetraen-17-one 0.78 gram of 3-phenoxy-13-isopropyl-15-carbomethoxygona-1,3,5(10),8-tetraen-17-one is refluxed for 45 minutes in a solution containing 19 ml. of methanol and 3.8 ml. of concentrated hydrochloric acid. The mixture is cooled and the product is filtered off and recrystallized from a solution containing equal parts by weight of methanol and ethanol. The crystallized product is 3-phenoxy-13-isopropyl-15-carbomethoxygona - 1,3,5(10), 9(11)-tetraen-17-one.

A mixture of 400 mg. of the 3-phenoxy-13-isopropyl-15-carbomethoxygona - 1,3,5(10),9(11) - tetraen-17-one obtained from above and 400 mg. of barium hydroxide in 10 ml. of 60% aqueous methanol is refluxed under nitrogen for 90 minutes. The solution is cooled to room temperature and 50 ml. of 1 N hydrochloric acid is added. The mixture is extracted with ether and the ether extract is washed with saturated sodium chloride solution, dried over magnesium sulfate and filtered. The filtrate is concentrated to dryness under reduced pressure. The residue is 3-phenoxy-13-isopropyl-15-carboxygona-1,3,5(10),9(11)-tetraen-17-one.

Example 35.—3-phenoxy-13-isopropyl-15-carbomethoxygona-1,3,5(10)-trien-17-one

A solution of 0.31 g. of 3-phenoxy-13-isopropyl-15-carbomethoxygona-1,3,5(10),9(11)-tetraen-17-one in 15 ml. of ethanol containing 0.3 g. of 10% palladised charcoal is shaken with hydrogen until absorption of hydrogen ceases. The reaction mixture is filtered and the ethanol is removed by distillation under reduced pressure. The residue is 3-phenoxy-13-isopropyl-15-carbomethoxygona-1,3,5(10)-trien-17-one and is recrystallized from ethanol.

Example 36.—3-tetrahydropyranyloxy-13-(n-butyl)-15-carboxygona-1,3,5(10),8-tetraen-17-one 6.7 grams of 3-tetrahydropyranyloxy-13-(2-butenyl)-15-carbomethoxygona - 1,3,5(10),8,14-pentaen-17-one in solution in 21.5 ml. of benzene containing 2.25 g. of 2% palladised calcium carbonate is shaken with hydrogen until an equimolar amount of hydrogen is absorbed. The reaction mixture is filtered and the solvent is removed from the filtrate by distillation under reduced pressure. The residue of 3-tetrahydropyranyloxy-13-(n-butyl)-15- carbomethoxygona-1,3,5(10),8-tetraen-17-one is crystallized from methanol.

A mixture of the 3-tetrahydropyranyloxy-13-(n-butyl)-15-carbomethoxygona - 1,3,5(10),8-tetraen-17-one from above and 1.2 g. of barium hydroxide in 30 ml. of 60% aqueous methanol is refluxed under nitrogen for 90 minutes. The solution is cooled to room temperature and 150 ml. of 1 N hydrochloric acid is added. The mixture is extracted with ether. The ether extract is washed with saturated sodium chloride solution, dried over magnesium sulfate and concentrated to dryness under reduced pressure. The residue is 3-tetrahydropyranyloxy-13-(n-butyl)-15-carboxygona-1,3,5(10),8-tetraen-17-one.

Example 37.—3-tetrahydropyranyloxy-13-(n-butyl)-15-carboxygona-1,3,5(10)-trien-17β-ol One gram of 3-tetrahydropyranyloxy-13-(n-butyl)-15-carbomethoxygona-1,3,5(10),8-tetraen-17-one in 100 ml. of tetrahydrofuran is added to a solution of 1.4 g. of potassium in 150 ml. of liquid ammonia. The reaction mixture is stirred for one hour and amonium acetate and water are then added. The reaction mixture is extracted with ether, the ether extract is dried over magnesium sulfate and filtered. The solvent is removed from the filtrate by distillation under reduced pressure. The residue of 3-tetrahydropyranyloxy-13-(n - butyl) - 15-carbomethoxygona-1,3,5(10)-trien-17β-ol is chromatographed on alumina.

A mixture of the chromatographed 3-tetrahydropyranyloxy-13-(n-butyl) - 15 - carbomethoxygona-1,3,5 (10)-trien-17β-ol and 800 mg. of barium hydroxide in 20 ml. of 60% aqueous methanol is refluxed under nitrogen for 90 minutes. The solution is cooled to room temperature and 50 ml. of 1 N hydrochloric acid is added. The mixture is extracted with ether, the ether extract is washed with saturated sodium chloride solution, dried over magnesium sulfate and filtered. The filtrate is concentrated to dryness under reduced pressure. The residue is 3-tetrahydropyranyloxy-13-(n-butyl) - 15-carboxygona-1,3,5(10)-trien-17β-ol.

Example 38.—3-tetrahydropyranyloxy-13-(n-butyl)-15-carboxygona-1,3,5(10)-trien-17-one 0.6 milliliter of chromic acid is added with stirring to 500 mg. of 3-tetrahydropyranyloxy-13-(n-butyl)-15-carbomethoxygona-1,3,5(10)-trien-17β-ol in solution in 20 ml. of acetone containing 0.6 g. of anhydrous magnesium sulfate. The mixture is stirred for five minutes and 2 ml. of propane-2-ol and 1 g. of sodium hydrogen carbonate are added. The solids are filtered off and washed with hot chloroform. The solvent is removed from the combined filtrate and washings by distillation under reduced pressure. The residue of 3-tetrahydropyranyloxy-13-(n-butyl) - 15 - carbomethoxygona - 1,3,5(10)-trien-17-one is percolated in ether through a column of neutral alumina. The chromatographed product is recrystallized from methanol.

A mixture of 400 mg. of 3-tetrahydropyranyloxy-13-(n-butyl)-15-carbomethoxygona - 1,3,5(10)-trien-17-one obtained from above and 400 mg. of barium hydroxide in 10 ml. of 60% aqueous methanol is refluxed under nitrogen for 90 minutes. The solution is cooled to room temperature and 50 ml. of 1 N hydrochloride acid is added. The ether extract is washed with saturated sodium chloride solution, dried over magnesium sulfate and filtered. The filtrate is concentrated to dryness under reduced pressure. The residue is 3-tetrahydropyranyloxy-13-(n-butyl)-15-carboxygona-1,3,5(10)-trien-17-one.

Example 39.—3 - hydroxy-13-(n-butyl)-15-carboxygona-1,3,5(10),9(11)-tetraen-17-one 0.78 gram of 3-tetrahydropyranyloxy-13-(n-butyl)-15-carbomethoxygona-1,3,5(10),8-tetraen-17-one is refluxed for 45 minutes in solution containing 19 ml. of methanol and 3.8 ml. of concentrated hydrochloric acid. The mixture is cooled and the product is filtered off and recrystallized from a solution containing equal parts by weight of methanol and ethanol. The crystallized product is 3-hydroxy-13-(n-butyl)-15-carbomethoxygona-1,3,5(10),9(11)-tetraen-17-one.

A mixture of 400 mg. of the 3-hydroxy-13-(n-butyl)-15-carbomethoxygona - 1,3,5(10),9(11) - tetraen-17-one obtained from above and 400 mg. of barium hydroxide in 10 ml. of 60% aqueous methanol is refluxed under nitrogen for 90 minutes. The solution is cooled to room temperature and 50 ml. of 1 N hydrochloric acid is added. The mixture is extracted with ether and the ether extract is washed with saturated sodium chloride solution, dried over magnesium sulfate and filtered. The filtrate is concentrated to dryness under reduced pressure. The residue is 3-hydroxy-13-(n-butyl) - 15 - carboxygona-1,3,-5(10),9(11)-tetraen-17-one.

Example 40.—3-hydroxy-13-(n-butyl)-15-carbomethoxygona-1,3,5(10)-trien-17-one

A solution of 0.31 g. of 3-hydroxy-13-(n-butyl)-15-carbomethyloxygona-1,3,5(10),9(11)-tetraen-17-one in 15 ml. of ethanol containing 0.3 g. of 10% palladised charcoal is shaken with hydrogen until absorption of hydrogen ceases. The reaction mixture is filtered and the ethanol is removed by distillation under reduced pressure. The residue is 3-hydroxy-13-(n-butyl)-15-carbomethoxygona-1,3,5(10)-trien-17-one and is recrystallized from methanol.

Example 41.—3 - ethoxy-13-ethyl-15-carboxygona-1,3,-5(10),8-tetraen-17-one 6.7 grams of 3-ethoxy-13-ethyl-15-carboxamidogona-1,3,5(10),8,14-pentaen-17-one in solution in 21.5 ml. of benzene containing 2.25 g. of 2% palladised calcium carbonate is shaken with hydrogen until an equimolar amount of hydrogen is absorbed. The reaction mixture is filtered and the solvent is removed from the filtrate by distillation under reduced pressure. The residue of 3-ethoxy-13-ethyl - 15 - carboxamidogona - 1,3,5(10),8-tetraen-17-one is crystallized from methanol.

A mixture of the 3-ethoxy-13-ethyl-15-carboxamidogona-1,3,5(10),8-tetraen-17-one from above and 1.2 g. of barium hydroxide in 30 ml. of 60% aqueous methanol is refluxed under nitrogen for 90 minutes. The solution is cooled to room temperature and 150 ml. of 1 N hydrochloric acid is added. The mixture is extracted with ether. The ether extract is washed with saturated sodium chloride solution, dried over magnesium sulfate and concentrated to dryness under reduced pressure. The residue is 3-ethoxy-13-ethyl-15-carboxygona - 1,3,5(10),8 - tetraen-17-one.

Example 42.—3 - ethoxy-13-ethyl-15-carboxygona-1,3,-5(10)-trien-17β-ol

One gram of 3-ethoxy-13-ethyl-15-carboxamidogona-1,3,5(10),8-tetraen-17-one in 100 ml. of tetrahydrofuran is added to a solution of 1.4 g. of potassium in 150 ml. of liquid ammonia. The reaction mixture is stirred for one hour and ammonium acetate and water are then added. The reaction mixture is extracted wth ether, the ether extract is dried over magnesium sulfate and filtered. The solvent is removed from the filtrate by distillation under reduced pressure. The residue of 3-ethoxy-13-ethyl-15-carboxamidogona-1,3,5(10)-trien-17β-ol is chromatographed on alumina.

A mixture of the chromatographed 3-ethoxy-13-ethyl-15-carboxamidogona-1,3,5(10)-trien-17β-ol and 800 mg. of barium hydroxide in 20 ml. of 60% aqueous methanol is refluxed under nitrogen for 90 minutes. The solution is cooled to room temperature and 50 ml. of 1 N hydrochloric acid is added. The mixture is extracted with ether, the ether extract is washed with saturated sodium chloride solution, dried over magnesium sulfate and filtered. The filtrate is concentrated to dryness under reduced pressure. The residue is 3-ethoxy-13-ethyl-15-carboxygona-1,3,5(10)-trien-17β-ol.

Example 43.—3 - ethoxy-13-ethyl-15-carboxygona-1,3,5(10)-trien-17-one 0.6 milliliter of chromic acid is added with stirring to 500 mg. of 3-ethoxy-13-ethyl-15-carboxamidogona-1,3,5-(10)-trien-17β-ol in solution in 20 ml. of acetone containing 0.6 g. of anhydrous magnesium sulfate. The mixture is stirred for five minutes and 2 ml. of propane-2-ol and 1 g. of sodium hydrogen carbonate are added. The solids are filtered off and washed with hot chloroform. The solvent is removed from the combined filtrate and washings by distillation under reduced pressure. The residue of 3 - ethoxy - 13 - ethyl-15-carboxamidogona-1,3,5(10)-trien-17-one is percolated in ether through a column of neutral alumina. The chromatographed product is recrystallized from methanol.

A mixture of 400 mg. of 3-ethoxy-13-ethyl-15-carboxamidogona-1,3,5(10)-trien-17-one obtained from above and 400 mg. of barium hydroxide in 10 ml. of 60% aqueous methanol is refluxed under nitrogen for 90 minutes. The solution is cooled to room temperature and 50 ml. of 1 N hydrochloric acid is added. The ether extract is washed with saturated sodium chloride solution, dried over magnesium sulfate and filtered. The filtrate is concentrated to dryness under reduced pressure. The residue is 3 - ethoxy-13-ethyl-15-carboxygona-1,3,5(10)-trien-17-one.

Example 44.—3-ethoxy-13-ethyl-15-carboxygona-1,3,5(10),9(11)-tetraen-17-one 0.78 gram of 3-ethoxy-13-ethyl-15-carboxamindogona-1,3,5(10),8-tetraen-17-one is refluxed for 45 minutes in a solution containing 19 ml. of methanol and 3.8 ml. of concentrated hydrochloric acid. The mixture is cooled and the product is filtered off and recrystallized from a solution containing equal parts by weight of methanol and ethanol. The crystallized product is 3 - ethoxy - 13 - ethyl-15-carboxamidogona-1,3,5(10),9(11)-tetraen-17-one.

A mixture of 400 mg. of the 3-ethoxy-13-ethyl-15-carboxamidogona - 1,3,5(10),9(11) - tetraen-17-one obtained from above and 400 mg. of barium hydroxide in 10 ml. of 60% aqueous methanol is refluxed under nitrogen for 90 minutes. The solution is cooled to room temperature and 50 ml. of 1 N hydrochloric acid is added. The mixture is extracted with ether and the ether extract is washed with saturated sodium chloride solution, dried over magnesium sulfate and filtered. The filtrate is concentrated to dryness under reduced pressure. The residue is 3-ethoxy - 13 - ethyl-15-carboxygona-1,3,5(10),9(11)-tetraen-17-one.

Example 45.—3-ethoxy-13-ethyl-15-carboxamidogona-1,3,5(10)-trien-17-one

A solution of 0.31 g. of 3 - ethoxy - 13 - ethyl-15-carboxamidogona-1,3,5(10),9(11)-tetraen-17-one in 15 ml. of ethanol containing 0.3 g. of 10% palladised charcoal is shaken with hydrogen until absorption of hydrogen ceases. The reaction mixture is filtered and the ethanol is removed by distillation under reduced pressure. The residue is 3 - ethoxy-13-ethyl-15-carboxamidogona-1,3,5(10)-trien-17-one and is recrystallized from methanol.

Example 46.—3-isopropoxy-13-methyl-15-carboxygona-1,3,5(10),8-tetraen-17-one 6.7 grams of 3 - isopropoxy - 13-methyl-15-carbethoxygona-1,3,5(10),8,14-pentaen-17-one in solution in 21.5 ml. of benzene containing 2.25 g. of 2% palladised calcium carbonate is shaken with hydrogen until an equimolar amount of hydrogen is absorbed. The reaction mixture is filtered and the solvent is removed from the filtrate by distillation under reduced pressure. The residue of 3-isopropoxy - 13-methyl-15-carbethoxygona-1,3,5(10),8-tetraen-17-one is crystallized from methanol.

A mixture of the 3-isopropoxy-13-methyl-15-carbethoxygona-1,3,5(10),8-tetraen-17-one from above and 1.2 g. of barium hydroxide in 30 ml. of 60% aqueous methanol is refluxed under nitrogen for 90 minutes. The solution is cooled to room temperature and 150 ml. of 1 N hydrochloric acid is added. The mixture is extracted with ether. The ether extract is washed with saturated sodium chloride solution, dried over magnesium sulfate and concentrated to dryness under reduced pressure. The residue is 3-isopropoxy - 13-methyl-15-carboxygona-1,3,5(10),8-tetraen-17-one.

Example 47.—3-isopropoxy-13-methyl-15-carboxygona-1,3,5(10)-trien-17β-ol

One gram of 3-isopropoxy-13-methyl-15-carbethoxygona-1,3,5(10),8-tetraen-17-one in 100 ml. of tetrahydrofuran is added to a solution of 1.4 g. of potassium in 150 ml. of liquid ammonia. The reaction mixture is stirred for one hour and ammonium acetate and water are then added. The reaction mixture is extracted with ether, the ether extract is dried over magnesium sulfate and filtered. The solvent is removed from the filtrate by distillation under reduced pressure. The residue of 3-isopropoxy-13-methyl-15-carbethoxygona-1,3,5(10)-trien-17β-ol is chromatographed on alumina.

A mixture of the chromatographed 3-isopropoxy-13-methyl-15-carbethoxygona-1,3,5(10)-trien-17β-ol and 800 mg. of barium hydroxide in 20 ml. of 60% aqueous methanol is refluxed under nitrogen for 90 minutes. The solution is cooled to room temperature and 50 ml. of 1 N hydrochloric acid is added. The mixture is extracted with ether, the ether extract is washed with saturated sodium chloride solution, dried over magnesium sulfate and filtered. The filtrate is concentrated to dryness under reduced pressure. The residue is 3-isopropoxy-13-methyl-15-carboxygona-1,3,5(10)-trien-17β-ol.

Example 48.—3-isopropoxy-13-methyl-15-carboxygona-1,3,5(10)-trien-17-one 0.6 milliliter of chromic acid is added with stirring to 500 mg. of 3-isopropoxy-13-methyl-15-carbethoxygona-1,3,5(10)-trien-17β-ol in solution in 20 ml. of acetone containing 0.6 g. of anhydrous magnesium sulfate. The mixture is stirred for five minutes and 2 ml. of propane-2-ol and 1 g. of sodium hydrogen carbonate are added. The solids are filtered off and washed with hot chloroform. The solvent is removed from the combined filtrate and washings by distillation under reduced pressure. The residue of 3-isopropoxy-13-methyl-15-carbethoxygona-1,3,5(10)-trien-17-one is percolated in ether through a column of neutral alumina. The chromatographed product is recrystallized from methanol.

A mixture of 400 mg. of 3-isopropoxy-13-methyl-15-carbethoxygona - 1,3,5(10) - trien-17-one obtained from above and 400 mg. of barium hydroxide in 10 ml. of 60% aqueous methanol is refluxed under nitrogen for 90 minutes. The solution is cooled to room temperature and 50 ml. of 1 N hydrochloric acid is added. The ether extract is washed with saturated sodium chloride solution, dried over magnesium sulfate and filtered. The filtrate is concentrated to dryness under reduced pressure. The residue is 3 - isopropoxy - 13-methyl-15-carboxygona-1,3,5(10)-trien-17-one.

Example 49.—3-isopropoxy-13-methyl-15-carboxygona-1,3,5(10),9(11)-tetraen-17-one 0.78 gram of 3 - isopropoxy-13-methyl-15-carbethoxygona-1,3,5(10),8-tetraen-17-one is refluxed for 45 minutes in a solution containing 19 ml. of methanol and 3.8 ml. of concentrated hydrochloric acid. The mixture is cooled and the product is filtered off and recrystallized from a solution containing equal parts by weight of methanol and ethanol. The crystallized product is 3-isopropoxy - 13-methyl-15-carbethoxygona-1,3,5(10),9(11)-tetraen-17-one.

A mixture of 400 mg. of the 3-isopropoxy-13-methyl-15 - carbethoxygona - 1,3,5(10),9(11) - tetraen - 17 -one obtained from above and 400 mg. of barium hydroxide in 10 ml. of 60% aqueous methanol is refluxed under nitrogen for 90 minutes. The solution is cooled to room temperature and 50 ml. of 1 N hydrochloric acid is added. The mixture is extracted with ether and the ether extract is washed with saturated sodium chloride solution, dried over magnesium sulfate and filtered. The filtrate is concentrated to dryness under reduced pressure. The residue is 3 - isopropoxy-13-methyl-15-carboxygona-1,3,5(10), 9(11)-tetraen-17-one.

Example 50.—3-isopropoxy-13-methyl-15-carbethoxy-gona-1,3,5(10)-trien-17-one

A solution of 0.31 g. of 3-isopropoxy-13-methyl-15-carbethoxygona - 1,3,5(10),9(11) - tetraen - 17 - one in 15 ml. of ethanol containing 0.3 g. of 10% palladised charcoal is shaken with hydrogen until absorption of hydrogen ceases. The reaction mixture is filtered and the ethanol is removed by distillation under reduced pressure. The residue is 3-isopropoxy-13-methyl-15-carbethoxy-gona-1,3,5(10)-trien-17-one and is recrystallized from methanol.

Example 51.—d- and l-3-methoxy-13-methyl-15-carboxy-gona-1,3,5(10),8,14-pentaen-17-ones 624 milligrams of 3-methoxy-13-methyl-15 carboxy-gona-1,3,5(10),8,14-pentaen-17-one and 790 mg. of l-brucine are dissolved in the minimum amount of warm ethanol required for all to be in solution. The solution is cooled and concentrated on a steam bath until crystals of the l-brucine salt of 3-methoxy-13-methyl-15-carboxy-gona - 1,3,5(10),8,14 - pentaen - 17 - one first appear. The solution is then allowed to stand overnight with cooling and the crystals that are formed are removed by filtration and washed with cold ethanol. The crystalline material is a mixture of the d- and l-diastereomers of the l-brucine salt of 3 - methoxy - 13 - methyl - 15 - carboxygona - 1,3,5(10),8,14 - pentaen - 17 - one. The d- and l-diastereomers of the l-brucine salt of 3-methoxy-13-methyl-15-carboxygona - 1,3,5(10),8,14 - pentaen - 17 - one are obtained in pure form by fractionally recrystallizing the mixture from a solvent composed of ethanol and ethyl acetate.

The d- and l - 3 - methoxy - 13 - methyl - 15 - carboxy-gona - 1,3,5(10),8,14 - pentaen - 17 - ones are obtained by dissolving each of the d- and l-diastereomers of the l-brucine salt of 3-methoxy-13-methyl-15-carboxygona-1,3,5(10),8,14 - pentaen - 17 - one separately in an excess amount of 1 N hydrochloric acid, extracting with chloroform, drying the chloroform solution over magnesium sulfate, filtering and removing the chloroform from the filtrate by distillation under reduced pressure. The residues are d- and l-3-methoxy-13-methyl-15-carboxygona-1,3,5(10),8,14-pentaen-17-ones and are recrystallized from an ethanol-ethyl acetate solvent.

Example 52.—d- and l-3-methoxy-13-methyl-15-carboxy-gona-1,3,5(10),8,14-pentaen-17-ones A mixture of 624 mg. of 3 - methoxy-13-methyl-15-carboxygona-1,3,5(10),8,14-pentaen-17-one, 100 mg. of paratoluenesulfonic acid and 313 mg. of l-menthol in 10 ml. of benzene is refluxed in a system which contains a Dean-Stark water separator. Refluxing is continued as long as water separates from the reflux. After refluxing is complete, the reaction mixture is cooled to room temperature, washed with ice-cold aqueous sodium bicarbonate solution and then washed with water. The benzene is removed from the reaction mixture by distillation under reduced pressure and any unreacted l-menthol is removed by steam distillation. The residue is a mixture of the d- and l-diastereomers of the l-menthyl esters of 3-methoxy-13-methyl - 15 - carboxygona - 1,3,5(10),8,14 - pentaen-17-one. The d- and l-diastereomers of the l-menthyl esters of 3-methoxy-13-methyl-15-carboxygona-1,3,5(10),8,14-pentaen-17-one are obtained in pure form by fractionally recrystallizing the mixture from a chloroform-hexane solvent.

The d- and l-3-methoxy-13-methyl-15-carboxygona-1,3,5(10),8,14-pentaen-17-ones are obtained by refluxing a solution of 200 mg. of each of the d- and l-diastereomers of the l-menthyl esters of 3-methoxy-13-methyl-15-carboxygona - 1,3,5(10),8,14 - pentaen - 17 - one in 2 ml. of ethanol containing 40 mg. of potassium hydroxide for four hours under nitrogen, removing the ethanol by distillation under reduced pressure, adding water to the residue, extracting the mixture with ether to remove non-acidic materials, separating the aqueous phase, making acid to Congo red while at 0°–5° C. with dilute hydrochloric acid and collecting the precipitated d- and l-3-methoxy - 13 - methyl - 15 - carboxygona - 1,3,5(10),8,14-pentaen-17-ones by filtration.

Example 53.—d- and l-3-methoxy-13-methylgona-1,3,5(10),8,14-pentaen-17-ones 400 milligrams of each of the d- and l-3-methoxy-13-methyl - 15 - carboxygona - 1,3,5(10),8,14 - pentaen - 17 -ones is dissolved separately in five ml. of acetic acid and 0.5 ml. of concentrated hydrochloric acid and warmed under nitrogen on a steam bath for forty minutes. The mixtures are cooled, fifty ml. of water are added and the whole is extracted with ether. The extracts are washed with 5% aqueous potassium bicarbonate solution, washed with saturated aqueous sodium chloride solution, dried over magnesium sulfate, and concentrated to dryness under reduced pressure. The residues are crystallized from methanol. The crystallized materials are d- and l-3-methoxy - 13 - methylgona - 1,3,5(10),8,14 - pentaen - 17 -ones.

Example 54.—d- and l-3-methoxy-13-methyl-15-carboxy-gona-1,3,5(10),8-tetraen-ones 628 milligrams of 3-methoxy-13-methyl-15-carboxy-gona-1,3,5(10),8-tetraen-one and 790 mg. of l-brucine are dissolved in the minimum amount of warm ethanol required for all to be in solution. The solution is cooled and concentrated on a steam bath until crystals of the l-brucine salt of 3-methoxy-13-methyl-15-carboxygona-1,3,5(10),8-tetraen-one first appear. The solution is then allowed to stand overnight with cooling and the crystals that are formed are removed by filtration and washed with cold ethanol. The crystalline material is a mixture of the d- and l-diastereomers of the l-brucine salt of 3-methoxy - 13 - methyl - 15 - carboxygona - 1,3,5(10),8-tetraen-one. The d- and l-diastereomers of the l-brucine salt of 3 - methoxy - 13 - methyl - 15 - carboxygona - 1,3,5(10),8 - tetraen-one are obtained in pure form by fractionally recrystallizing the mixture from a solvent composed of ethanol and ethyl acetate.

The d- and l - 3 - methoxy - 13 - methyl - 15 - carboxy-gona - 1,3,5(10),8 - tetraen-one are obtained by dissolving each of the d- and l-diastereomers of the l-brucine salt of 3 - methoxy - 13 - methyl - 15 - carboxygona - 1,3,5(10),8-tetraen-one separately in an excess amount of 1 N hydrochloric acid, extracting with chloroform, drying the chloroform solution over magnesium sulfate, filtering and removing the chloroform from the filtrate by distillation under reduced pressure. The residues are d- and l-3-methoxy - 13 - methyl - 15 - carboxygona - 1,3,5(10),8-tetraen-ones and are recrystallized from an ethanol-ethyl acetate solvent.

Example 55.—d- and l-3-methoxy-13-methyl-15-carboxy-gona-1,3,5(10),8-tetraen-ones A mixture of 628 mg. of 3-methoxy-13-methyl-15-carboxygona-1,3,5(10),8-tetraen-one, 100 mg. of paratoluenesulfonic acid and 313 mg. of l-menthol in 10 ml. of benzene is refluxed in a system which contains a Dean-Stark water separator. Refluxing is continued as long as water separates from the reflux. After refluxing is complete, the reaction mixture is cooled to room temperature, washed with ice-cold aqueous sodium bicarbonate solution and then washed with water. The benzene is removed from the reaction mixture by distillation under reduced pressure and any unreacted l-menthol is removed by steam distillation. The residue is a mixture of the d- and l-diastereomers of the l-menthyl esters of 3-methoxy-13-methyl - 15 - carboxygona-1,3,5(10),8-tetraen-one. The d- and l-diastereomers of the l-menthyl esters of 3-methoxy - 13 - methyl - 15 - carboxygona - 1,3,5(10),8-tetraen-one are obtained in pure form by fractionally recrystallizing the mixture from a chloroform-hexane solvent.

The d- and l-3-methoxy-13-methyl-15-carboxygona-1,3,5(10),8-tetraen-ones are obtained by refluxing a solution of 200 mg. of each of the d- and l-diastereomers of the l-menthyl esters of 3-methoxy-13-methyl-15-carboxygona-1,3,5(10),8-tetraen-one separately in 2 ml. of ethanol containing 40 mg. of potassium hydroxide for four hours under nitrogen, removing the ethanol by distillation under reduced pressure, adding water to the residue, extracting the mixture with ether to remove non-acidic materials, separating the aqueous phase, making acid to Congo red while at 0°–5° C. with dilute hydrochloric acid and collecting the precipitated d- and l-3-methoxy-13-methyl-15-carboxygona-1,3,5(10),8-tetraen-ones by filtration.

Example 56.—d- and l-3-methoxy-13-methylgona-1,3,5(10),8-tetraen-ones 400 milligrams of each of the d- and l-3-methoxy-13-methyl-15-carboxygona-1,3,5(10),8-tetraen-ones is dissolved separately in five ml. of acetic acid and 0.5 ml. of concentrated hydrochloric acid and warmed under nitrogen on a steam bath for forty minutes. The mixtures are cooled, fifty ml. of water are added and the whole is extracted with ether. The extracts are washed with 5% aqueous potassium bicarbonate solution, washed with saturated aqueous sodium chloride solution, dried over magnesium sulfate, and concentrated to dryness under reduced pressure. The residues are crystallized from methanol. The crystallized materials are d- and l-3-methoxy-13-methyl-gona-1,3,5(10),8-tetraen-ones.

Example 57.—d- and l-3-methoxy-13-methyl-15-carboxygona-1,3,5(10)-trien-17β-ol 634 milligrams of 3-methoxy-13-methyl-15-carboxygona-1,3,5(10)-trien-17β-ol and 790 mg. of l-brucine are dissolved in the minimum amount of warm ethanol required for all to be in solution. The solution is cooled and concentrated on a steam bath until crystals of the l-brucine salt of 3-methoxy-13-methyl-15-carboxygona-1,3,5(10)-trien-17β-ol first appear. The solution is then allowed to stand overnight with cooling and the crystals that are formed are removed by filtration and washed with cold ethanol. The crystalline material is a mixture of the d- and l-diastereomers of the l-brucine salt of 3 - methoxy - 13 - methyl - 15 - carboxygona-1,3,5(10)-trien-17β-ol. The d- and l-diastereomers of the l-brucine salt of 3-methoxy-13-methyl-carboxygona-1,3,5(10)-trien-17β-ol are obtained in pure form by fractionally recrystallizing the mixture from a solvent composed of ethanol and ethyl acetate.

The d- and l-3-methoxy-13-methyl-15-carboxygona-1,3,5(10)-trien-17β-ols are obtained by dissolving each of the d- and l-diastereomers of the l-brucine salt of 3-methoxy-13 - methyl - 15 - carboxygona - 1,3,5(10) - trien - 17β-ol in an excess amount of 1 N hydrochloric acid, extracting with chloroform, drying the chloroform solution over magnesium sulfate, filtering and removing the chloroform from the filtrate by distillation under reduced pressure. The residues are d- and l-3-methoxy-13-methyl-15-carboxygona-1,3,5(10)-trien-17β-ols and are recrystallized from an ethanol-ethyl acetate solvent.

Example 58.—d- and l-3-methoxy-13-methyl-15-carboxygona-1,3,5(10)-trien-17β-ols

A mixture of 634 mg. of 3-methoxy-13-methyl-15-carboxygona-1,3,5(10)-trien-17β-ol, 100 g. of paratoluenesulfonic acid and 313 mg. of l-menthol in 10 ml. of benzene is refluxed in a system which contains a Dean-Stark water separator. Refluxing is continued as long as water separates from the reflux. After refluxing is complete, the reaction mixture is cooled to room temperature, washed with ice-cold aqueous sodium bicarbonate solution and then washed with water. The benzene is removed from the reaction mixture by distillation under reduced pressure and any unreacted l-menthol is removed by steam distillation. The residue is a mixture of the d- and l-diastereomers of the l-menthyl esters of 3-methoxy-13-methyl-15-carboxygona-1,3,5(10)-trien-17β-ol. The d- and l-diastereomers of the l-menthyl esters of 3-methoxy-13-methyl - 15 - carboxygona - 1,3,5(10) - trien - 17β - ol are obtained in pure form by fractionally recrystallizing the mixture from a chloroform-hexane solvent The d- and l - 3-methoxy-13-methyl-15-carboxygona-1,3,5(10)-trien-17β-ols are obtained by refluxing a solution of 200 mg. of each of the d- and l-diastereomers of the l-menthyl esters of 3-methoxy-13-methyl-15-carboxygona-1,3,5(10)-trien-17β-ol separately in 2 ml. of ethanol containing 40 mg. of potassium hydroxide for four hours under nitrogen, removing the ethanol by distillation under reduced pressure, adding water to the residue, extracting the mixture with ether to remove non-acidic materials, separating the aqueous phase, making acid to Congo red while at 0°–5° C. with dilute hydrochloric acid and collecting the precipitated d- and l-3-methoxy-13-methyl-15-carboxygona-1,3,5(10)-trien-17β-ols by filtration.

Example 59.—d- and l-3-methoxy-13-methylgona-1,3,5(10)-trien-17β-ols 400 milligrams of each of the d- and l-3-methoxy-13-methyl - 15 - carboxygona-1,3,5(10)-trien-17β-ols is dissolved separately in five ml. of acetic acid and 0.5 ml. of concentrated hydrochloric acid and warmed under nitrogen on a steam bath for forty minutes. The mixtures are cooled, fifty ml. of water are added and the whole is extracted with ether. The extracts are washed with 5% aqueous potassium bicarbonate solution, washed with saturated aqueous sodium chloride solution, dried over magnesium sulfate, and concentrated to dryness under reduced pressure. The residues are crystallized from methanol. The crystallized materials are d- and l-3-methoxy-13-methylgona-1,3,5(10)-trien-17β-ols.

Example 60.—d- and l-3-methoxy-13-methyl-15-carboxygona-1,3,5(10)-trien-17-ones 632 milligrams of 3 - methoxy-13-methyl-15-carboxygona-1,3,5(10)-trien-17-one and 790 mg. of l-brucine are dissolved in the minimum amount of warm ethanol required for all to be in solution. The solution is cooled and concentrated on a steam bath until crystals of the l-brucine salt of 3-methoxy-13-methyl-15-carboxygona-1,3,5(10)-trien-17-one first appear. The solution is then allowed to stand overnight with cooling and the crystals that are formed are removed by filtration and washed with cold ethanol. The crystalline material is a mixture of the d- and l-diastereomers of the l-brucine salt of 3-methoxy - 13-methyl-15-carboxygona-1,3,5(10)-trien-17-one. The d- and l-diastereomers of the l-brucine salt of 3 - methoxy - 13-methyl-15-carboxygona-1,3,5(10)-trien-17-one are obtained in pure form by fractionally recrystallizing the mixture from a solvent composed of ethanol and ethyl acetate.

The d- and l-3 - methoxy-13-methyl-15-carboxygona-1,3,5(10)-trien-17-ones are obtained by dissolving each of the d- and l-diastereomers of the l-brucine salt of 3-methoxy - 13 - methyl-15-carboxygona-1,3,5(10)-trien-17-one separately in an excess amount of 1 N hydrochloric acid, extracting with chloroform, drying the chloroform solution over magnesium sulfate, filtering and removing the chloroform from the filtrate by distillation under reduced pressure. The residues are d- and l-3-methoxy-13-methyl-15-carboxygona-1,3,5(10)-trien-17-ones and are recrystallized from an ethanolethyl acetate solvent.

Example 61.—d- and l-3-methoxy-13-methyl-15-carboxygona-1,3,5(10)-trien-17-ones

A mixture of 632 mg. of 3-methoxy-13-methyl-15-carboxygona-1,3,5(10)-trien-17-one, 100 mg. of paratoluenesulfonic acid and 313 mg. of l-menthol in 10 ml. of benzene is refluxed in a system which contains a Dean-Stark water separator. Refluxing is continued as long as water separates from the reflux. After refluxing is complete, the reaction mixture is cooled to room temperature, washed with ice-cold aqueous sodium bicarbonate solution and then washed with water. The benzene is removed from the reaction mixture by distillation under reduced pressure and any unreacted l-menthol is removed by steam distillation. The residue is a mixture of the d- and l-diastereomers of the l-menthyl esters of 3-methoxy-13-methyl-15 - carboxygona-1,3,5(10)-trien-17-one. The d- and l-diastereomers of the l-menthyl esters of 3-methoxy-13-methyl - 15 - carboxygona-1,3,5(10)-trien-17-one are obtained in pure form by fractionally recrystallizing the mixture from a chloroform-hexane solvent.

The d- and l-3 - methoxy-13-methyl-15-carboxygona-1,3,5(10)-trien-17-ones are obtained by refluxing a solution of 200 mg. of each of the d- and l-diastereomers of the l-menthyl esters of 3-methoxy-13-methyl-15-carboxygona-1,3,5(10)-trien-17-one separately in 2 ml. of ethanol containing 40 mg. of potassium hydroxide for four hours under nitrogen, removing the ethanol by distillation under reduced pressure, adding water to the residue, extracting the mixture with ether to remove non-acidic materials, separating the aqueous phase, making acid to Congo red while at 0°–5° C. with dilute hydrochloric acid and collecting the precipitated d- and l-3-methoxy-13 - methyl - 15-carboxygona-1,3,5(10)-trien-17-ones by filtration.

Example 62.—d- and l-3-methoxy-13-methylgona-1,3,5(10)-trien-17-ones 400 milligrams of each of the d- and l-3-methoxy-13-methyl - 15 - carboxygona-1,3,5(10)-trien-17-ones is dissolved separately in five ml. of acetic acid and 0.5 ml. of concentrated hydrochloric acid and warmed under nitrogen on a steam bath for forty minutes. The mixtures are cooled, fifty ml. of water are added and the whole is extracted with ether. The extracts are washed with 5% aqueous potassium bicarbonate solution, washed with saturated aqueous sodium chloride solution, dried over magnesium sulfate, and concentrated to dryness under reduced pressure. The residues are crystallized from methanol. The crystallized materials are d- and l-3-methoxy-13-methyl-gona-1,3,5(10)-trien-17-ones.

Example 63.—d- and l-3-methoxy-13-methyl-15-carboxygona-1,3,5(10),9(11)-tetraen-17-ones 628 milligrams of 3-methoxy-13-methyl-15-carboxygona - 1,3,5(10),9(11) - tetraen - 17 - one and 790 mg. of l-brucine are dissolved in the minimum amount of warm ethanol required for all to be in solution. The solution is cooled and concentrated on a steam bath until crystals of the l-brucine salt of 3-methoxy-13-methyl-15 - carboxygona - 1,3,5(10),9(11) - tetraen - 17 - one first appear. The solution is then allowed to stand overnight with cooling and the crystals that are formed are removed by filtration and washed with cold ethanol. The crystalline material is a mixture of the d- and l-diastereomers of the l-brucine salt of 3-methoxy-13-methyl-15-carboxygona-1,3,5(10),9(11)-tetraen-17-one. The d- and l-diastereomers of the l-brucine salt of 3-methoxy-13-methyl - 15 - carboxygona - 1,3,5(10),9(11) - tetraen-17-one are obtained in pure form by fractionally recrystallizing the mixture from a solvent composed of ethanol and ethyl acetate.

The d- and l-3-methoxy-13-methyl-15-carboxygona-1,3,5(10),9(11)-tetraen-17-ones are obtained by dissolving each of the d- and l-diastereomers of the l-brucine salt of 3 - methoxy - 13 - methyl - 15 - carboxygona-1,3,5(10),9(11)-tetraen-17-one separately in an excess amount of 1 N hydrochloric acid, extracting with chloroform, drying the chloroform solution over magnesium sulfate, filtering and removing the chloroform from the filtrate by distillation under reduced pressure. The residues are d- and l-3-methoxy-13-methyl-15-carboxygona-1,3,5(10),9(11)-tetraen-17-ones and are recrystallized from an ethanol-ethyl acetate solvent.

Example 64.—d- and l-3-methoxy-13-methyl-15-carboxygona-1,3,5(10),9(11)-tetraen-17-ones A mixture of 628 mg. of 3-methoxy-13-methyl-15-carboxygona - 1,3,5(10),9(11) - tetraen - 17 - one, 100 mg. of paratoluenesulfonic acid and 313 mg. of l-menthol in 10 ml. of benzene is refluxed in a system which contains a Dean-Stark water separator. Refluxing is continued as long as water separates from the reflux. After refluxing is complete, the reaction mixture is cooled to room temperature, washed with ice-cold aqueous sodium bicarbonate solution and then washed with water. The benzene is removed from the reaction mixture by distillation under reduced pressure and any unreacted l-menthol is removed by steam distillation. The residue is a mixture of the d- and l-diastereomers of the l-menthyl esters of 3-methoxy - 13 - methyl - 15 - carboxygona - 1,3,5(10),9(11)-tetraen-17-one. The d- and l-diastereomers of the l - menthyl esters of 3 - methoxy - 13 - methyl - 15 - carboxyona-1,3,5(10),9(11)-tetraen-17-one are obtained in pure form by fractionally recrystallizing the mixture from a chloroform-hexane solvent.

The d- and l - 3 - methoxy - 13 - methyl - 15 - carboxygona-1,3,5(10),9(11)-tetraen-17-ones are obtained by refluxing a solution of 200 mg. of each of the d- and l-diastereomers of the l-menthyl esters of 3-methoxy-13-methyl - 15 - carboxygona - 1,3,5(10),9(11) - tetraen-17-one separately in 2 ml. of ethanol containing 40 mg. of potassium hydroxide for four hours under nitrogen, removing the ethanol by distillation under reduced pressure, adding water to the residue, extracting the mixture with ether to remove non-acidic materials, separating the aqueous phase, making acid to Congo red while at 0°–5° C. with dilute hydrochloric acid and collecting the precipitated d- and l - 3 - methoxy - 13 - methyl - 15-carboxygona - 1,3,5(10),9(11) - tetraen - 17 - ones by filtration.

Example 65.—d- and l-3-methoxy-13-methylgona-1,3,5(10),9(11)-tetraen-17-ones 400 milligrams of each of the d- and l-3-methoxy-13-methyl - 15 - carboxygona - 1,3,5(10),9(11) - tetraen-17-ones is dissolved separately in five ml. of acetic acid and 0.5 ml. of concentrated hydrochloric acid and warmed under nitrogen on a steam bath for forty minutes. The mixtures are cooled, fifty ml. of water are added and the whole is extracted with ether. The extracts are washed with 5% aqueous potassium bicarbonate solution, washed with saturated aqueous sodium chloride solution, dried over magnesium sulfate, and concentrated to dryness under reduced pressure. The residues are crystallized from methanol. The crystallized materials are d- and l - 3 - methoxy - 13 - methylgona - 1,3,5(10),9(11)-tetraen-17-ones.

Example 66.—d- and l - 3 - ethoxy - 13 - ethyl - 15 - carboxygona-1,3,5(10),8,14-pentaen-17-ones 672 milligrams of 3 - ethoxy - 13 - ethyl - 15 - carboxygona - 1,3,5(10),8,14 - pentaen - 17 - one and 790 mg. of l-brucine are dissolved in the minimum amount of warm ethanol required for all to be in solution. The solution is cooled and concentrated on a steam bath until crystals of the 1-brucine salt of 3-ethoxy-13-ethyl-15-carboxygona-1,3,5(10),8,14-pentaen-17-one first appear. The solution is then allowed to stand overnight with cooling and the crystals that are formed are removed by filtration and washed with cold ethanol. The crystalline material is a mixture of the d- and l-diastereomers of the 1-brucine salt of 3 - ethoxy - 13 - ethyl - 15 - carboxygona-1,3,5(10),8,14-pentaen-17-one. The d- and l-diastereomers of the 1-brucine salt of 3-ethoxy-13-ethyl-15-carboxygona-1,3,5(10),8,14-pentaen-17-one are obtained in pure form by fractionally recrystallizing the mixture from a solvent composed of ethanol and ethyl acetate.

The d- and l - 3 - ethoxy - 13 - ethyl - 15 - carboxygona-1,3,5(10),8,14-pentaen-17-ones are obtained by dissolving each of the d- and l-diastereomers of the 1-brucine salt of 3 - ethoxy - 13 - ethyl - 15 - carboxygona - 1,3,5(10),8,14 - pentaen - 17 - one separately in an excess amount of 1 N hydrochloric acid, extracting with chloroform, drying the chloroform solution over magnesium sulfate, filtering and removing the chloroform from the filtrate by distillation under reduced pressure. The residues are d- and l-3-ethoxy-13-ethyl-15-carboxygona-1,3,5(10),8,14-pentaen-17-ones and are recrystallized from an ethanol-ethyl acetate solvent.

Example 67.—d- and l-3-ethoxy-13-ethyl-15-carboxygona-1,3,5(10),8,14-pentaen-17-ones A mixture of 672 mg. of 3 - ethoxy-13-ethyl-15-carboxygona - 1,3,5(10),8,14 - pentaen-17-one, 100 mg. of paratoluenesulfonic acid and 313 mg. of l-menthol in 10 ml. of benzene is refluxed in a system which contains a Dean-Stark water separator. Refluxing is continued as long as water separates from the reflux. After refluxing is complete, the reaction mixture is cooled to room temperature, washed with ice-cold aqueous sodium bicarbonate solution and then washed with water. The benzene is removed from the reaction mixture by distillation under reduced pressure and any unreacted l-methol is removed by steam distillation. The residue is a mixture of the d- and l-diastereomers of the 1-menthyl esters of 3-ethoxy-13-ethyl - 15-carboxygona-1,3,5(10),8,14-pentaen-17-one. The d- and l-diastereomers of the 1-menthyl esters of 3-ethoxy - 13-ethyl-15-carboxygona-1,3,5(10),8,14-pentaen-17-one are obtained in pure form by fractionally recrystallizing the mixture from a chloroform-hexane solvent.

The d- and l-3-ethoxy-13-ethyl - 15-carboxygona-1,3,5(10),8,14-pentaen-17-ones are obtained by refluxing a solution of 200 mg. of each of the d- and l-diastereomers of the 1-menthyl esters of 3-ethoxy - 13-ethyl-15-carboxygona - 1,3,5(10),8,14 - pentaen-17-one in 2 ml. of ethanol containing 40 mg. of potassium hydroxide for four hours under nitrogen, removing the ethanol by distillation under reduced pressure, adding water to the residue, extracting the mixture with ether to remove non-acidic materials, separating the aqueous phase, making acid to Congo red while at 0°-5° C. with dilute hydrochloric acid and collecting the precipitated d- and l-3-ethoxy - 13 - ethyl - 15 - carboxygona - 1,3,5(10),8,14-pentaen-17-ones by filtration.

Example 68.—d- and l-3-ethoxy-13-ethylgona-1,3,5(10),8,14-pentaen-17-ones 400 milligrams of each of the d- and l-3-ethoxy-13-ethyl-15-carboxygona - 1,3,5(10),8,14-pentaen-17-ones is dissolved separately in five ml. of acetic acid and 0.5 ml. of concentrated hydrochloric acid and warmed under nitrogen on a steam bath for forty minutes. The mixtures are cooled, fifty ml. of water are added and the whole is extracted with ether. The extracts are washed with 5% aqueous potassium bicarbonate solution, washed with saturated aqueous sodium chloride solution, dried over magnesium sulfate, and concentrated to dryness under reduced pressure. The residues are crystallized from methanol. The crystallized materials are d- and l-3-ethoxy - 13-ethylgona - 1,3,5(10),8,14-pentaen-17-ones.

Example 69.—d- and l-3-ethoxy-13-ethyl-15-carboxygona-1,3,5(10),8-tetraen-ones 676 milligrams of 3-ethoxy-13-ethyl-15-carboxygona-1,3,5(10),8-tetraen-one and 790 mg. of 1-brucine are dissolved in the minimum amount of warm ethanol required for all to be in solution. The solution is cooled and concentrated on a steam bath until crystals of the 1-brucine salt of 3-ethoxy-13-ethyl-15-carboxygona-1,3,5(10),8-tetraen-one first appear. The solution is then allowed to stand overnight with cooling and the crystals that are formed are removed by filtration and washed with cold ethanol. The crystalline material is a mixture of the d- and l-diastereomers of the 1-brucine salt of 3-ethoxy - 13-ethyl-15-carboxygona - 1,3,5(10),8-tetraen-one. The d- and l-diastereomers of the 1-brucine salt of 3-ethoxy-13-ethyl-15-carboxygona - 1,3,5(10),8-tetraen-one are obtained in pure form by fractionally recrystallizing the mixture from a solvent composed of ethanol and ethyl acetate.

The d- and l-3-ethoxy - 13-ethyl - 15-carboxygona-1,3,5(10),8-tetraen-ones are obtained by dissolving each of the d- and l-diastereomers of the 1-brucine salt of 3-ethoxy-13-ethyl - 15-carboxygona - 1,3,5(10),8-tetraen-one separately in an excess amount of 1 N hydrochloric acid, extracting with chloroform, drying the chloroform solution over magnesium sulfate, filtering and removing the chloroform from the filtrate by distillation under reduced pressure. The residues are d- and l-3-ethoxy-13-ethyl-15-carboxygona - 1,3,5(10),8-tetraen-ones and are recrystallized from an ethanol-ethyl acetate solvent.

Example 70.—d- and l-3-ethoxy-13-ethyl-15-carboxygona-1,3,5(10),8-tetraen-ones

A mixture of 676 mg. of 3-ethoxy-13-ethyl-15-carboxygona - 1,3,5(10),8 - tetraen-one, 100 mg. of paratoluenesulfonic acid and 313 mg. of l-methol in 10 ml. of benzene is refluxed in a system which contains a Dean-Stark water separator. Refluxing is continued as long as water separates from the reflux. After refluxing is complete, the reaction mixture is cooled to room temperature, washed with ice-cold aqueous sodium bicarbonate solution and then washed with water. The benzene is removed from the reaction mixture by distillation under reduced pressure and any unreacted 1-menthol is removed by steam distillation. The residue is a mixture of the d- and l-diastereomers of the 1-menthyl esters of 3-ethoxy-13-ethyl - 15-carboxygona - 1,3,5(10),8-tetraen-one. The d- and l-diastereomers of the 1-menthyl esters of 3-ethoxy-13-ethyl-15-carboxygona-1,3,5(10),8-tetraen-one are obtained in pure form by fractionally recrystallizing the mixture from a chloroform-hexane solvent.

The d- and l-3-ethoxy-13-ethyl - 15-carboxygona-1,3,5(10),8-tetraen-ones are obtained by refluxing a solution of 200 mg. of each of the d- and l-diastereomers of the 1-menthyl esters of 3-ethoxy-13-ethyl-15-carboxygona-1,3,5(10),8-tetraen-one separately in 2 ml. of ethanol containing 40 mg. of potassium hydroxide for four hours under nitrogen, removing the ethanol by distillation under reduced pressure, adding water to the residue, extracting the mixture with ether to remove non-acedic materials, separating the aqueous phase, making acid to Congo red while at 0°-5° C. with dilute hydrochloric acid and collecting the precipitated d- and l-3-ethoxy-13-ethyl-15-carboxygona-1,3,5(10),8-tetraen-ones by filtration.

Example 71.—d- and l-3-ethoxy-13-ethylgona-1,3,5(10),8-tetraen-ones 400 milligrams of each of the d- and l-3-ethoxy-13-ethyl - 15 - carboxygona - 1,3,5(10),8 - tetraen - ones is dissolved separately in five ml. of acetic acid and 0.5 ml.

of concentrated hydrochloric acid and warmed under nitrogen on a steam bath for forty minutes. The mixtures are cooled, fifty ml. of water are added and the whole is extracted with ether. The extracts are washed with 5% aqueous potassium bicarbonate solution, washed with saturated aqueous sodium chloride solution, dried over magnesium sulfate, and concentrated to dryness under reduced pressure. The residues are crystallized from methanol. The crystallized materials are d- and l-3-ethoxy-13-ethylgona-1,3,5(10),8-tetraen-ones.

Example 72.—d- and l-3-ethoxy-13-ethyl-15-carboxygona-1,3,5(10)-trien-17β-ol 682 milligrams of 3-ethoxy-13-ethyl-15-carboxygona-1,3,5(10)-trien-17β-ol and 790 mg. of 1-brucine are dissolved in the minimum amount of warm ethanol required for all to be in solution. The solution is cooled and concentrated on a steam bath until crystals of the 1-brucine salt of 3 - ethoxy - 13 - ethyl - 15 - carboxygona-1,3,5(10)-trien-17β-ol first appear. The solution is then allowed to stand overnight with cooling and the crystals that are formed are removed by filtration and washed with cold ethanol. The crystalline material is a mixture of the d- and l-diastereomers of the 1-brucine salt of 3-ethoxy - 13 - ethyl - 15 - carboxygona - 1,3,5(10) - trien - 17β-ol. The d- and l-diastereomers of the 1-brucine salt of 3-ethoxy-13-ethyl-15-carboxygona-1,3,5(10)-trien-17β-ol are obtained in pure form by fractionally recrystallizing the mixture from a solvent composed of ethanol and ethyl acetate.

The d- and 1 - 3 - ethoxy - 13 - ethyl - 15 - carboxygona-1,3,5(10)-trien -17β-ols are obtained by dissolving each of the d- and l-diastereomers of the 1-brucine salt of 3-ethoxy - 13 - ethyl - 15 - carboxygona - 1,3,5(10) - trien-17β-ol in an excess amount of 1 N hydrochloric acid, extracting with chloroform, drying the chloroform solution over magnesium sulfate, filtering and removing the chloroform from the filtrate by distillation under reduced pressure. The residues are d- and l-3-ethoxy-13-ethyl-15-carboxygona-1,3,5(10)-trien-17β-ols and are recrystallized from an ethanol-ethyl acetate solvent.

Example 73.—d- and l-3-ethoxy-13-ethyl-15-carboxygona-1,3,5(10)-trien-17β-ols

A mixture of 682 mg. of 3-ethoxy-13-ethyl-15-carboxygona-1,3,5(10)-trien-17β-ol, 100 mg. of paratoluenesulfonic acid and 313 mg. of 1-menthol in 10 ml. of benzene is refluxed in a system which contains a Dean-Stark water separator. Refluxing is continued as long as water separates from the reflux. After refluxing is complete, the reaction mixture is cooled to room temperature, washed with ice-cold aqueous sodium bicarbonate solution and then washed with water. The benzene is removed from the reaction mixture by distillation under reduced pressure and any unreacted 1-menthol is removed by steam distillation. The residue is a mixture of the d- and l-diastereomers of the 1-menthyl esters of 3-ethoxy-13-ethyl-15-carboxygona-1,3,5(10)-trien-17β-ol. The d- and l-diastereomers of the 1-menthyl esters of 3-ethoxy-13-ethyl - 15 - carboxygona - 1,3,5(10) - trien - 17β - ol are obtained in pure form by fractionally recrystallizing the mixture from a chloroform-hexane solvent.

The d- and l - 3 - ethoxy - 13 - ethyl - 15 - carboxygona-1,3,5(10)-trien-17β-ols are obtained by refluxing a solution of 200 mg. of each of the d- and l-diastereomers of the 1-menthyl esters of 3-ethoxy-13-ethyl-15-carboxygona-1,3,5(10)-trien-17β-ol separately in 2 ml. of ethanol containing 40 mg. of potassium hydroxide for four hours under nitrogen, removing the ethanol by distillation under reduced pressure, adding water to the residue, extracting the mixture with ether to remove non-acidic materials, separating the aqueous phase, making acid to Congo red while at 0°–5° C. with dilute hydrochloric acid and collecting the precipitated d- and l-3-ethoxy-13-ethyl-15-carboxygona-1,3,5(10)-trien-17β-ols by filtration.

Example 74.—d- and l-3-ethoxy-13-ethylgona-1,3,5(10)-trien-17β-ols 400 milligrams of each of the d- and l-3-ethoxy-13-ethyl-15-carboxygona-1,3,5(10)trien-17β-ols is dissolved separately in five ml. of acetic acid and 0.5 ml. of concentrated hydrochloric acid and warmed under nitrogen on a steam bath for forty minutes. The mixtures are cooled, fifty ml. of water are added and the whole is extracted with ether. The extracts are washed with 5% aqueous potassium bicarbonate solution, washed with saturated aqueous sodium chloride solution, dried over magnesium sulfate, and concentrated to dryness under pressure. The residues are crystallized from methanol. The crystallized materials are d- and l-3-ethoxy-13-ethyl-gona-1,3,5(10)-trien-17β-ols.

Example 75.—d- and l-3-ethoxy-13-ethyl-15-carboxygona-1,3,5(10)-trien-17-ones 680 milligrams of 3-ethoxy-13-ethyl-15-carboxygona-1,3,5(10)-trien-17-one and 790 mg. of 1-brucine are dissolved in the minimum amount of warm ethanol required for all to be in solution. The solution is cooled and concentrated on a steam bath until crystals of the 1 - brucine salt of 3 - ethoxy - 13 - ethyl - 15 - carboxygona 1,3,5(10)-trien-17-one first appear. The solution is then allowed to stand overnight with cooling and the crystals that are formed are removed by filtration and washed with cold ethanol. The crystalline material is a mixture of the d- and l-diastereomers of the 1-brucine salt of 3-ethoxy-13-ethyl-15-carboxygona-1,3,5(10)-trien-17-one. The d- and l-diastereomers of the 1-brucine salt of 3-ethoxy-13-ethyl-15-carboxygona-1,3,5(10)-trien-17-one are obtained in pure form by fractionally recrystallizing the mixture from a solvent composed of ethanol and ethyl acetate.

The d- and 1 - 3 - ethoxy-13-ethyl-15-carboxygona-1,3,5(10)-trien-17-ones are obtained by dissolving each of the d- and l-diastereomers of the 1-brucine salt of 3-ethoxy-13-ethyl-15-carboxygona-1,3,5(10)-trien - 17 - one separately in an excess amout of 1 N-hydrochloric acid, extracting with chloroform, drying the chloroform solution over magnesium sulfate, filtering and removing the chloroform from the filtrate by distillation under reduced pressure. The residues are d- and l-3-ethoxy-13-ethyl-15-carboxygona-1,3,5(10)-trien-17-ones and are recrystallized from an ethanol-ethyl acetate solvent.

Example 76.—d- and l-3-ethoxy-13-ethyl-15-carboxygona-1,3,5(10)-trien-17-ones

A mixture of 680 mg. of 3-ethoxy-13-ethyl-15-carboxygona-1,3,5(10)-trien-17-one, 100 mg. of para-toluenesulfonic acid and 313 mg. of 1-manthol in 10 ml. of benzene is refluxed in a system which contains a Dean-Stark water separater. Refluxing is continued as long as water separates from the reflux. After refluxing is complete, the reaction mixture is cooled to room temperature, washed with ice-cold aqueous sodium bicarbonate solution and then washed with water. The benzene is removed from the reaction mixture by distillation under reduced pressure and any unreacted 1-methanol is removed by steam distillation. The residue is a mixture of the d- and l-diastereomers of the 1-menthyl esters of 3-ethoxy - 13-ethyl 15-carboxygona-1,3,5(10)-trien-17-one. The d- and l-diastereomers of the 1-menthyl esters of 3-ethoxy-13-ethyl-15-carboxygona-1,3,5(10)-trien-17-one are obtained in pure form by fractionally recrystallizing the mixture from a chloroform-hexane solvent.

The d- and 1 - 3 - ethoxy-13-ethyl-15-carboxygona-1,3,5(10)-trien-17-ones are obtained by refluxing a solution of 200 mg. of each of the d- and l-diastereomers of the 1-menthyl esters of 3-ethoxy-13-ethyl-15-carboxygona-1,3,5(10)-trien-17-one separately in 2 ml. of ethanol containing 40 mg. of potassium hydroxide for four hours under nitrogen, removing the ethanol by distillation under reduced pressure, adding water to the residue, extracting the mixture with ether to remove non-acidic materials, separating the aqueous phase, making acid to Congo red while at 0°–5° C. with dilute hydrochloric acid and collecting the precipitated d- and l-3-ethoxy-13-ethyl-15-carboxygona-1,3,5(10)-trien-17-ones by filtration.

Example 77.—d- and l-3-ethoxy-13-ethylgono-1,3,5(10)-trien-17-ones 400 milligrams of each of the di- and l-3-ethoxy-13-ethyl-15-carboxygona-1,3,5(10)-trien-17-ones is dissolved separately in five ml. of acetic acid and 0.5 mil. of concentrated hydrochloric acid and warmed under nitrogen on a steam bath for forty minutes. The mixtures are cooled, fifty ml. of water are added and the whole is extracted with ether. The extracts are washed with 5% aqueous potassium bicarbonate solution, washed with saturated aqueous sodium chloride solution, dried over magnesium sulfate, and concentrated to dryness under reduced pressure. The residues are crystallized from methanol. The crystallized materials are d- and l-3-ethoxy-13-ethlgona-1,3,5(10)-trien-17-ones.

Example 78.—d- and l-3-ethoxy-13-ethyl-15-carboxygona-1,3,5(10),9(11)-tetraen-17-ones 676 milligrams of 3-ethoxy-13-ethyl-15-carboxygona-1,3,5(10),9(11)-tetraen-17-one and 790 mg. of l-brucine are dissolved in the minimum amount of warm ethanol required for all to be in solution. The solution is cooled and concentrated on a steam bath until crystals of the l-brucine salt of 3-ethoxy - 13 - ethyl-15-carboxygona-1,3,5(10),9(11)-tetraen-17-one first appear. The solution is then allowed to stand overnight with cooling and the crystals that are formed are removed by filtration and washed with cold ethanol. The crystalline material is a mixture of the d- and l-diastereomers of the l-brucine salt of 3-ethoxy - 13 - ethyl-15-carboxygona-1,3,5(10),9(11)-tetraen-17-one. The d-and l-diastereomers of the l- brucine salt of 3-ethoxy-13-ethyl-15-carboxygona-1,3,5(10),9(11)-tetraen-17-one are obtained in pure form by fractionally recrystallizing the mixture from a solvent composed of ethanol and ethyl acetate.

The d- and l-3-ethoxy-13-ethyl-15-carboxygona-1,3,5(10),9(11)-tetraen-17-ones are obtained by dissolving each of the di- and l-diastereomers of the l-brucine salt of 3-ethoxy - 13 - ethyl-15-carboxygona-1,3,5(10),9(11)-tetraen-17-one separately in an excess amount of 1 N hydrochloric acid, extracting with chloroform, drying the chloroform solution over magnesium sulfate, filtering and removing the chloroform from the filtrate by distillation under reduced pressure. The residues are d- and l-3-ethoxy - 13 - ethyl - 15 - carboxygona - 1,3,5(10),9(11)-tetraein-17-ones and are recrystallized from an ethanol-ethyl acetate solvent.

Example 79.—d- and l-3-ethoxy-13-ethyl-15-carboxygona-1,3,5(10),9(11)-tetraen-17-ones A mixture of 676 mg. of 3-ethoxy-13-ethyl-15-carboxygona-1,3,5(10),9(11)-tetraen-17-one, 100 mg. of paratoluenesulfonic acid and 313 mg. of l-menthol in 10 ml. of benzene is refluxed in a system which contains a Dean-Stark water separator. Refluxing is continued as long as water separates from the reflux. After refluxing is complete, the reaction mixture is cooled to room temperature, washed with ice-cold aqueous sodium bicarbonate solution and then washed with water. The benzene is removed from the reaction mixture by distillation under reduced presure and any unreacted 1-methanol is removed by steam distillation. The residue is a mixture of the d- and l-diastereomers of the l-menthyl esters of 3-ethoxy-13-ethyl-15-carboxygona-1,3,5(10),9(11)-tetraen-17-one. The d- and l-diastereomers of the l-menthy esters of 3-ethoxy-13-ethyl-15-carboxygona-1,3,5(10),9(11)-tetraen-17-one are obtained in pure form by fractionally recrystallizing the mixture from a chloroform-hexane solvent.

The d- and l-3-ethoxy-13-ethyl - 15 - carboxygona-1,3,5(10),9(11)-tetraen-17-ones are obtained by refluxing a solution of 200 mg. of each of the d- and l-diastereomers of the 1-menthyl esters of 3-ethoxy-13-ethyl-15-carboxygona-1,3,5(10),9(11)-tetraen-17-one separately in 2 ml. of ethanol containing 40 mg. of potassium hydroxide for four hours under nitrogen, removing the ethanol by distillation under reduced pressure, adding water to the residue, extracting the mixture with ether to remove non-acidic materials, separating the aqueous phase, making acid to Congo red while at 0°–5° C. with dilute hydrochloric acid and collecting the precipitated d- and l-3-ethoxy-13-ethyl-15 carboxygona - 1,3,5(10),9(11)-tetraen-17-ones by filtration.

Example 80.—d- and l-3-ethoxy-13-ethylgona-1,3,5(10),9(11)-tetraen-17-ones 400 milligrams of each of the d- and l-3-ethoxy-13-ethyl-15-carboxygona - 1,3,5(10),9(11) - tetraen-17-ones is dissolved separately in five ml. of acetic acid and 0.5 ml. of concentrated hydrochloric acid and warmed under nitrogen on a steam bath for forty minutes. The mixtures are cooled, fifty ml. of water are added and the whole is extracted with ether. The extracts are washed with 5% aqueous potassium bicarbonate solution, washed with saturated aqueous sodium chloride solution, dried over magnesium sulfate, and concentrated to dryness under reduced pressure. The residues are crystallized from methanol. The crystallized materials are d- and l-3-ethoxy-13-ethylgona-1,3,5(10),9(11)-tetraen-17-ones.

Example 81.—d- and l-3-benzyloxy-13-allyl-15-carboxygona-1,3,5(10),8,14-pentaen-17-ones 828 milligrams of 3-benzyloxy-13-allyl-15-carboxygona-1,3,5(10),8,14-pentaen-17-one and 790 mg. of l-brucine are dissolved in the minimum amount of warm ethanol required for all to be in solution. The solution is cooled and concentrated on a steam bath until crystals of the l-brucine salt of 3-benzyloxy-13-allyl-15-carboxygona-1,3,5(10),8,14-pentaen-17-one first appear. The solution is then allowed to stand overnight with cooling and the crystals that are formed are removed by filtration and washed with cold ethanol. The crystalline material is a mixture of the d- and l-diastereomers of the l-brucine salt of 3-benzyloxy-13-allyl-15-carboxygona-1,3,5(10),8,14-pentaen-17-one. The d- and l-diastereomers of the l-brucine salt of 3-benzyloxy-13-allyl-15-carboxygona-1,3,5(10),8,14-pentaen-17-one are obtained in pure form by fractionally recrystallizing the mixture from a solvent composed of ethanol and ethyl acetate.

The d- and l-3-benzyloxy-13-allyl-15-carboxygona-1,3,5(10),8,14-pentaen-17-ones are obtained by dissolving each of the d- and l-diastereomers of the l-brucine salt of 3-benzyloxy-13-allyl-15-carboxygona - 1,3,5(10),8,14-pentaen-17-one separately in an excess amount of 1 N hydrochloric acid, extracting with chloroform, drying the chloroform solution over magnesium sulfate, filtering and removing the chloroform from the filtrate by distillation under reduced pressure. The residues are d- and l-3-benzyloxy-13-allyl-15-carboxygona - 1,3,5(10),8,14-pentaen-17-ones and are recrystallized from an ethanol-ethyl acetate solvent.

Example 82.—d- and l-3-benzyloxy-13-allyl-15-carboxygona-1,3,5(10),8,14-pentaen-17-ones A mixture of 828 mg. of 3-benzyloxy-13-allyl-15-carboxygona-1,3,5(10),8,14-pentaen - 17 - one, 100 mg. of paratoluenesulfonic acid and 313 mg. of l-menthol in 10 ml. of benzene is refluxed in a system which contains a Dean-Stark water separator. Refluxing is continued as long as water separates from the reflux. After refluxing is complete, the reaction mixture is cooled to room temperature, washed with ice-cold aqueous sodium bicarbonate solution and then washed with water. The benzene is removed from the reaction mixture by distillation under reduced pressure and any unreacted 1-menthol is removed by steam distillation. The residue is a mixture of the d- and l-diastereomers of the 1-menthyl esters of 3-benzyloxy-13-allyl-15-carboxygona-1,3,5(10),8,14-pentaen-17-one. The d- and l-diastereomers of the 1-menthyl esters of 3-benzyloxy-13-allyl-15-carboxy-1,3,5(10),14-pentaen-17-one are obtained in pure form by fractionally recrystallizing the mixture from a chloroform-hexane solvent.

The d- and l-3-benzyloxy-13-allyl-15-carboxygona-1,3,5(10),8,14-pentaen-17-ones are obtained by refluxing a solution of 200 mg. of each of the d- and l-diastereomers of the 1-menthyl esters of 3-benzyloxy-13-allyl-15-carboxygona-1,3,5(10),8,14-pentaen-17-one in 2 ml. of ethanol containing 40 mg. of potassium hydroxide for four hours under nitrogen, removing the ethanol by distillation under reduced pressure, adding water to the residue, extracting the mixture with ether to remove non-acidic materials, separating the aqueous phase, making acid to Congo red while at 0°–5° C. with dilute hydrochloric acid and collecting the precipitated d- and l-3-benzyloxy-13-allyl-15-carboxygona-1,3,5(10),8,14-pentaen-17-ones by filtration.

Example 83.—d- and l-3-benzyloxy-13-allylgona-1,3,5(10),8,14-pentaen-17-ones 400 milligrams of each of the d- and l-3-benzyloxy-13-allyl-15-carboxygona-1,3,5(10),8,14-pentaen-17-ones is dissolved separately in five ml. of acetic acid and 0.5 ml. of concentrated hydrochloric acid and warmed under nitrogen on a steam bath for forty minutes. The mixtures are cooled, fifty ml. of water are added and the whole is extracted with ether. The extracts are washed with 5% aqueous potassium bicarbonate solution, washed with saturated aqueous sodium chloride solution, dried over magnesium sulfate, and concentrated to dryness under reduced pressure. The residues are crystallized from methanol. The crystallized materials are d- and l-3-benzyloxy-13-allylgona-1,3,5(10),8,14-pentaen-17-ones.

Example 84.—d- and l-3-hydroxy-13-propyl-15-carboxygona-1,3,5(10),8-tetraen-ones 832 milligrams of 3-benzyloxy-13-propyl-15-carboxygona-1,3,5(10),8-tetraen-one and 790 mg. of l-brucine are dissolved in the minimum amount of warm ethanol required for all to be in solution. The solution is cooled and concentrated on a steam bath until crystals of the l-brucine salt of 3-benzyloxy-13-propyl-15-carboxygona-1,3,5(10)-8-tetraen-one first appear. The solution is then allowed to stand overnight with cooling and the crystals that are formed are removed by filtration and washed with cold ethanol. The crystalline material is a mixture of the d- and l-diastereomers of the l-brucine salt of 3-benzyloxy-13-propyl-15-carboxygona-1,3,5(10),8-tetraen-one. The d- and l-diastereomers of the l-brucine salt of 3-benzyloxy-13-propyl-15-carboxygona-1,3,5(10),8-tetraen-one are obtained in pure form by fractionally recrystallizing the mixture from a solvent composed of ethanol and ethyl acetate.

The d- and l-3-hydroxy-13-propyl-15-carboxygona-1,3,5(10),8-tetraen-ones are obtained by dissolving each of the d- and l-diastereomers of the l-brucine salt of 3-benzyloxy-13-propyl-15-carboxygona-1,3,5(10),8-tetraen-one separately in an excess amount of 1 N hydrochloric acid, extracting with chloroform, drying the chloroform solution over magnesium sulfate, filtering and removing the chloroform from the filtrate by distillation under reduced pressure. The residues are d- and l-3-hydroxy-13-propyl-15-carboxygona-1,3,5(10),8-tetraen-ones and are recrystallized from an ethanol-ethyl acetate solvent.

Example 85.—d- and l-3-benzyloxy-13-propyl-15-carobxygona-1,3,5(10),8-tetraen-ones A mixture of 832 mg. of 3-benzyloxy-13-propyl-15-carboxygona-1,3,5(10),8-tetraen-one, 100 mg. of para-toluenesulfonic acid and 313 mg. of 1-menthol in 10 ml. of benzene is refluxed in a system which contains a Dean-Stark water separator. Refluxing is continued as long as water separates from the reflux. After refluxing is complete, the reaction mixture is cooled to room temperature, washed with ice-cold aqueous sodium bicarbonate solution and then washed with water. The benzene is removed from the reaction mixture by distillation under reduced pressure and any unreacted 1-menthol is removed by steam distillation. The residue is a mixture of the d- and l-diastereomers of the 1-menthyl esters of 3-benzyloxy-13-propyl-15-carboxygona-1,3,5(10),8-tetraen-one. The d-l-diastereomers of the 1-menthyl esters of 3-benzyloxy-13-propyl-15-carboxygona-1,3,5(10),8-tetraen-one are obtained in pure form by fractionally recrystallizing the mixture from a chloroform-hexane solvent.

The d- and l-3-benzyloxy-13-propyl-15-carboxygona-13,5(10),8-tetraen-ones are obtained by refluxing a solution of 200 mg. of each of the d- and l-diastereomers of the 1-menthyl esters of 3-benzyloxy-13-propyl-15-carboxygona-1,3,5(10),8-tetraen-one separately in 2 ml. of ethanol containing 40 mg. of potassium hydroxide for four hours under nitrogen, removing the ethanol by distillation under reduced pressure, adding water to the residue, extracting the mixture with ether to remove non-acidic materials, separating the aqueous phase, making acid to Congo red while at 0°–5° C. with dilute hydrochloric acid and collecting the precipitated d- and l-3-benzyloxy-13-propyl-15-carboxygona-1,3,5(10),8-tetraen-ones by filtration.

Example 86.—d- and l-3-benzyloxy-13-propylgona 1,3,5(10),8-tetraen-ones 400 milligrams of each of the d- and l-3-benzyloxy-13-propyl-15-carboxygona-1,3,5(10),8-tetraen-ones is dissolved separately in five ml. of acetic acid and 0.5 ml. of concentrated hydrochloric acid and warmed under nitrogen on a steam bath for forty minutes. The mixtures are cooled, fifty ml. of water are added and the whole is extracted with ether. The extracts are washed with 5% aqueous potassium bicarbonate solution, washed with saturated aqueous sodium chloride solution, dried over magnesium sulfate, and concentrated to dryness under reduced pressure. The residues are crystallized from methanol. The crystallized materials are d- and l-3-benzyloxy-13-propyl-1,3,5(10),8-tetraen-ones.

Example 87.—d- and l-3-hydroxy-13-propyl-15-carboxygona-1,3,5(10)-trien-17β-ols 838 milligrams of 3-benzyloxy-13-propyl-15-carboxygona-1,3,5(10)-trien-17β-ol and 790 mg. of l-brucine are dissolved in the minimum amount of warm ethanol required for all to be in solution. The solution is cooled and concentrated on a steam bath until crystals of the l-brucine salt of 3-benzyloxy-13-propyl-15-carboxygona-1,3,5(10)-trien-17β-ol first appear. The solution is then allowed to stand overnight with cooling and the crystals that are formed are removed by filtration and washed with cold ethanol. The crystalline material is a mixture of the d- and l-diastereomers of the l-brucine salt of 3-benzyloxy-13-propyl-15-carboxygona-1,3,5(10)-trien-17β-ol. The d- and l-diastereomers of the l-brucine salt of 3-benzyloxy-13-propyl-15-carboxygona-1,3,5(10)-trien-17β-ol are obtained in pure form by fractionally recrystallizing the mixture from a solvent composed of ethanol and ethyl acetate.

The d- and l-3-hydroxy-13-propyl-15-carboxygona-1,3,5(10)-trien-17β-ols are obtained by dissolving each of the d- and l-diastereomers of the l-brucine salt of 3-benzyloxy-13-propyl-15-carboxygona-1,3,5(10)-trien-17β-ol in an excess amount of 1 N hydrochloric acid, extracting with chloroform, drying the chloroform solution over magnesium sulfate, filtering and removing the chloroform from the filtrate by distillation under reduced pressure. The residues are d- and l-3-hydroxy-13-propyl-15-carboxygona-1,3,5(10)-trien-17β-ols and are recrystallized from an ethanol-ethyl acetate solvent.

Example 88.—d- and l-3-benzyloxy-13-propyl-15-carboxygona-1,3,5(10)-trien-17β-ols A mixture of 838 mg. of 3-benzyloxy-13-propyl-15-carboxygona-1,3,5(10)-trien-17β-ol, 100 mg. of paratoluenesulfonic acid and 313 mg. of l-menthol in 10 ml. of benzene is refluxed in a system which contains a Dean-Stark water separator. Refluxing is continued as long as water separates from the reflux. After refluxing is complete, the reaction mixture is cooled to room temperature, washed with ice-cold aqueous sodium bicarbonate solution and then washed with water. The benzene is removed from the reaction mixture by distillation under reduced pressure and any unreacted l-menthol is removed by steam distillation. The residue is a mixture of the d- and l-diastereomers of the l-menthyl esters of 3-benzyloxy-13-propyl-15-carboxygona - 1,3,5(10) - trien-17β-ol. The d- and l-diastereomers of the l menthyl esters of 3 - benzyloxy - 13 - propyl-15-carboxygona-1,3,5(10)-trien-17β-ol are obtained in pure form by fractionally recrystallizing the mixture from a chloroform-hexane solvent.

The d- and l-3-benzyoxy-13-propyl-15-carboxygona-1,3,5(10)-trien-17β-ols are obtained by refluxing a solution of 200 mg. of each of the d- and l-diastereomers of the l-menthyl esters of 3-benzyloxy-13-propyl-15-carboxgona-1,3,5(10)-trien-17β-ol separately in 2 ml. of ethanol containing 40 mg. of potassium hydroxide for four hours under nitrogen, removing the ethanol by distillation under reduced pressure, adding water to the residue, extracting the mixture with ether to remove non-acidic materials, separating the aqueous phase, making acid to Congo red while at 0°–5° C. with dilute hydrochloric acid and collecting the precipitated d- and l-3-benzyloxy-13-propyl-15-carboxygona - 1,3,5(10) - trien-17β-ols by filtration.

Example 89.—d- and l-3-benzyloxy-13-propylgona-1,3,5(10)-trien-17β-ols 400 milligrams of each of the d- and l-3-benzyloxy-13-propyl-15-carboxygona - 1,3,5(10) - triene-17β-ols is dissolved separately in five ml. of acetic acid and 0.5 ml. f concentrated hydrochloric acid and warmed under nitrogen on a steam bath for forty minutes. The mixtures are cooled, fifty ml. of water are added and the whole is extracted with ether. The extracts are washed with 5% aqueous potassium bicarbonate solution, washed with saturated aqueous sodium chloride solution, dried over magnesium sulfate, and concentrated to dryness under reduced pressure. The residues are crystallized from methanol. The crystallized materials are d- and l-3-benzyloxy-13-propylgona-1,3,5(10)-trien-17β-ols.

Example 90.—d- and l-3-hydroxy-13-propyl-15-carboxygona-1,3,5(10)-trien-17-ones 836 milligrams of 3-benzyloxy-13-propyl-15-carboxygona-1,3,5(10)-trien-17-one and 790 mg. of l-brucine are dissolved in the minimum amount of warm ethanol required for all to be in solution. The solution is cooled and concentrated on a steam bath until crystals of the l-brucine salt of 3-benzyloxy-13-propyl-15-carboxygona-1,3,5(10)-trien-17-one first appear. The solution is then allowed to stand overnight with cooling and the crystals that are formed are removed by filtration and washed with cold ethanol. The crystalline material is a mixture of the d- and l-diastereomers of the l-brucine salt of 3-benzyloxy-13-propyl-15-carboxygona-1,3,5(10) - trien-17-one. The d- and l-diastereomers of the l-brucine salt of 3-benzyloxy-13-propyl-15-carboxygona-1,3,5(10) - trien-17-one are obtained in pure form by fractionally recrystallizing the mixture from a solvent composed of ethanol and ethyl acetate.

The d- and l-3-hydroxy-13-propyl-15-carboxygona-1,3,5(10)-trien-17-ones are obtained by dissolving each of the d- and l-diastereomers of the l-brucine salt of 3-benzyloxy-13-propyl-15-carboxygona - 1,3,5(10) - trien-17-one separately in an excess amount of 1 N hydrochloric acid, extracting with chloroform, drying the chloroform solution over magnesium sulfate, filtering and removing the chloroform from the filtrate by distillation under reduced pressure. The residues are d- and l-3-hydroxy-13-propyl-15-carboxygona - 1,3,5(10) - trien-17-ones and are recrystallized from an ethanol-ethyl acetate solvent.

Example 91.—d- and l-3-benzyloxy-13-propyl-15-carboxygona-1,3,5(10)-trien-17-ones A mixture of 836 mg. of 3-benzyloxy-13-propyl-15-carboxygona-1,3,5(10)-trien-17-one, 100 mg. of paratoluenesulfonic acid and 313 mg. of l-menthol in 10 ml. of benzene is refluxed in a system which contains a Dean-Stark water separator. Refluxing is continued as long as water separates from the reflux. After refluxing is complete, the reaction mixture is cooled to room temperature, washed with ice-cold aqueous sodium bicarbonate solution and then washed with water. The benzene is removed from the reaction mixture by distillation under reduced pressure and any unreacted l-menthol is removed by steam distillation. The residue is a mixture of the d- and l-diastereomers of the l-menthyl esters of 3 - benzyloxy - 13 - propyl-15-carboxygona-1,3,5(10)-trien-17-one. The d- and l-diastereomers of the l-menthyl esters of 3-benzyloxy-13-propyl-15-carboxygona-1,3,5(10)-trien-17-one are obtained in pure form by fractionally recrystallizing the mixture from a chloroform-hexane solvent.

The d- and l-3 - benzyloxy-13-propyl-15-carboxygona-1,3,5(10)-trien-17-ones are obtained by refluxing a solution of 200 mg. of each of the d- and l-diastereomers of the l-menthyl esters of 3-benzyloxy-13-propyl-15-carboxygona - 1,3,5(10)-trien-17-one separately in 2 ml. of ethanol containing 40 mg. of potassium hydroxide for four hours under nitrogen, removing the ethanol by distillation under reduced pressure, adding water to the residue, extracting the mixture with ether to remove non-acidic materials, separating the aqueous phase, making acid to Congo red while at 0°–5° C. with dilute hydrochloric acid and collecting the precipitated d- and l-3-benzyloxy-13-propyl-15-carboxygona - 1,3,5(10) - trien-17-ones by filtration.

Example 92.—d- and l-3-benzyloxyl-13-propylgona-1,3,5(10)-trien-17-ones 400 milligrams of each of the d- and l-3-benzyloxy-13-propyl-15-carboxygona - 1,3,5(10) - trien - 17 - ones is dissolved separately in five ml. of acetic acid and 0.5 ml. of concentrated hydrochloric acid and warmed under nitrogen on a steam bath for forty minutes. The mixtures are cooled, fifty ml. of water are added and the whole is extracted with ether. The extracts are washed with 5% aqueous potassium bicarbonate solution, washed with saturated aqueous sodium chloride solution, dried over magnesium sulfate, and concentrated to dryness under reduced pressure. The residues are crystallized from methanol. The crystallized materials are d- and l-3-benzyloxy-13-propylgona-1,3,5(10)-trien-17-ones.

Example 93.—d- and l-3-hydroxy-13-propyl-15-carboxygona-1,3,5(10),9(11)-tetraen-17-ones 832 milligrams of 3-hydroxy-13-propyl-15-carboxygona-1,3,5(10),9(11)-tetraen-17-one and 790 mg. of l-brucine are dissolved in the minimum amount of warm ethanol required for all to be in solution. The solution is cooled and concentrated on a steam bath until crystals of the l-brucine salt of 3-hydroxy-13-propyl-15-carboxygona-1,3,5(10),9(11)-tetraen-17-one first appear. The solution is then allowed to stand overnight with cooling and the crystals that are formed are removed by filtration and washed with cold ethanol. The crystalline material is a mixture of the d- and l-diastereomers of the l-brucine salt of 3 - hydroxy - 13 - propyl - 15 - carboxygona- 1,3-5(10),9(11)-tetraen-17-one. The d- and l-diastereomers of the 1-brucine salt of 3-hydroxy-13-propyl-15-corboxygona-1,3,5(10),9(11)-tetraen-17-one are obtained in pure form by fractionally recrystalizing the mixture from a solvent composed of ethanol and ethyl acetate.

The d- and l-3-hydroxy-13-propyl - 15 - carboxygona-1,3,5(10),9(11)-tetraen-17-ones are obtained by dissolving each of the d- and l-diastereomers of the 1-brusine salt of 3 - hydroxy - 13 - propyl - 15 - carboxygona-1,3,5(10),9(11)-tetraen-17-one separately in an excess amount of 1 N hydrochloric acid, extracting with chloroform, drying the chloroform solution over magnesium sulfate, filtering and removing the chloroform from the filtrate by distillation under reduced pressure. The residues are d- and l-3-hydroxy-13-propyl - 15 - carboxygona-1,3,5(10),9(11)-tetraen-17-ones and are recrystallized from an ethanolethyl acetate solvent.

Example 94.—d- and l-3-hydroxy-13-propyl-15-carboxygona-1,3,5(10),9(11)-tetraen-17-ones A mixture of 832 mg. of 3-hydroxy-13-propyl-15-carboxygona-1,3,5(10),9(11)-tetraen-17-one, 100 mg. of paratoluenesulfonic acid and 313 mg. of l-methanol in 10 ml. of benzene is refluxed in a system which contains a Dean-Stark water separator. Refluxing is continued as long as water separates from the reflux. After refluxing is complete, the reaction mixture is cooled to room temperature, washed with ice-cold aqueous sodium bicarbonate solution and then washed with water. The benzene is removed from the reaction mixture by distillation under reduced pressure and any unreacted l-methanol is removed by steam distillation. The residue is a mixture of the d- and l-diastereomers of the 1-menthyl esters of 3 - hydroxy - 13 - propyl - 15 - carboxygona-1,3,5(10),9(11)-tetraen-17-one. The d- and l-diastereomers of the 1-menthyl esters of 3-hydroxy-13-propyl-15-carboxygona-1,3,5(10),9(11)-tetraen-17-one are obtained in pure form by fractionally recrystallizing the mixture from a chloroform-hexane solvent.

The d- and l-3-hydroxy-13-propyl - 15 - carboxygona-1,3,5(10),9(11)-tetraen-17-ones are obtained by refluxing a solution of 200 mg. of each of the d- and l-diastereomers of the 1-menthyl esters of 3-hydroxy-13-propyl-15-carboxygona-1,3,5(10),9(11)-tetraen-17-one separately in 2 ml. of ethanol containing 40 mg. of potassium hydroxide for four hours under nitrogen, removing the ethanol by distillation under reduced pressure, adding water to the residue, extracting the mixture with ether to remove non-acidic materials, separating the aqueous phase, making acid to Congo red while at 0°–5° C. with dilute hydrochloric acid and collecting the precipitated d- and l-3-hydroxy-13-propyl - 15 - carboxygona - 1,3,5(10),9(11)-tetraen-17-ones by filtration.

Example 95.—d- and l-3-benzyloxy-13-propylgona-1,3,5(10),9(11)-tetraen-17-ones 400 milligrams of each of the d- and l-3-benzyloxy-13-propyl - 15 - carboxygona - 1,3,5(10),9(11) - tetraen-17-ones is dissolved separately in five ml. of acetic acid and 0.5 ml. of concentrated hydrochloric acid and warmed under nitrogen on a steam bath for forty minutes. The mixtures are cooled, fifty ml. of water are added and the whole is extracted with ether. The extracts are washed with 5% aqueous potassium bicarbonate solution, washed with saturated aqueous sodium chloride solution, dried over magnesium sulfate, and concentrated to dryness under reduced pressure. The residues are crystallized from methanol. The crystallized materials are d- and l-3-benzyloxy-13-propylgona-1,3,5(10),9(11) - tetraen - 17-ones.

Example 96.—d- and l-3-phenoxy-13-isopropyl-15-carboxygona-1,3,5(10),8,14-pentaen-17-ones 804 milligrams of 3-phenoxy-13-isopropyl-15-carboxygona-1,3,5(10),8,14-pentaen - 17 - one and 790 mg. of l-brucine are dissolved in the minimum amount of warm ethanol required for all to be in solution. The solution is cooled and concentrated on a steam bath until crystals of the 1-brucine salt of 3-phenoxy - 13 - isopropyl - 15-carboxygona-1,3,5(10),8,14-pentaen-17-one first appear. The solution is then allowed to stand overnight with cooling and the crystals that are formed are removed by filtration and washed with cold ethanol. The crystalline material is a mixture of the d- and l-diastereomers of the 1-brucine salt of 3-phenoxy-13-isopropyl-15-carboxygona-1,3,5(10),8,14-pentaen-17-one. the d- and l-diastereomers of the 1-brucine salt of 3-phenoxy-13-isopropyl-15-carboxygona-1,3,5(10),8,14-pentaen-17-one are obtained in pure form by fractionally recrystallizing the mixture from a solvent composed of ethanol and ethyl acetate.

The d- and l-3-phenoxy-13-isopropyl-15-carboxygona-1,3,5(10),8,14-pentaen-17-ones are obtained by dissolving each of the d- and l-diastereomers of the 1-brucine salt of 3-phenoxy-13-isopropyl-15-carboxygona-1,3,5(10),8,14-pentaen-17-one separately in an excess amount of 1 N hydrochloric acid, extracting with chloroform, drying the chloroform solution over magnesium sulfate, filtering and removing the chloroform from the filtrate by distillation under reduced pressure. The residues are d- and l-3-phenoxy-13-isopropyl-15 - carboxygona - 1,3,5(10),8,14-pentaen-17-ones and are recrystallized from an ethanol-ethyl acetate solvent.

Example 97.—d- and l-3-phenoxy-13-isopropyl-15-carboxygona-1,3,5(10),8,14-pentaen-17-ones A mixture of 804 mg. of 3-phenoxy-13-isopropyl-15-carboxygona-1,3,5(10),8,14-pentaen - 17 - one, 100 mg. of paratoluenesulfonic acid and 313 mg. of l-menthol in 10 ml. of benzene is refluxed in a system which contains a Dean-Stark water separator. Refluxing is continued as long as water separates from the reflux. After refluxing is complete, the reaction mixture is cooled to room temperature, washed with ice-cold aqueous sodium bicarbonate solution and then washed with water. The benzene is removed from the reaction mixture by distillation under reduced pressure and any unreacted l-menthol is removed by steam distillation. The residue is a mixture of the d- and l-diastereomers of the 1-menthyl esters of 3-phenoxy-13-isopropyl - 15 - carboxygona - 1,3,5(10),8,14 - pentaen-17-one. The d- and l-diastereomers of the 1-menthyl esters of 3-phenoxy - 13 - isopropyl - 15 - carboxygona-1,3,5(10),8,14-pentaen-17-one are obtained in pure form by fractionally recrystallizing the mixture from a chloroform-hexane solvent.

The d- and l-3-phenoxy-13-isopropyl-15-carboxygona-1,3,5(10),8,14 - pentaen - 17 - ones are obtained by refluxing a solution of 200 mg. of each of the d- and l-diastereomers of the 1-menthyl esters of 3-phenoxy-13-isopropyl-15-carboxygona - 1,3,5(10),8,14 - pentaen - 17-one in 2 ml. of ethanol containing 40 mg. of potassium hydroxide for four hours under nitrogen, removing the ethanol by distillation under reduced pressure, adding water to the residue, extracting the mixture with ether to remove non-acidic materials, separating the aqueous phase, making acid to Congo red while at 0°–5° C. with dilute hydrochloric acid and collecting the precipitated d- and l-3-phenoxy - 13 - isopropyl - 15 - carboxygona-1,3,5(10),8,14-pentaen-17-ones by filtration.

Example 98.—d- and l-3-phenoxy-13-isopropylgona-1,3,5(10),8,14-pentaen-17-ones 400 milligrams of each of the d- and l-3-phenoxy-13-isopropyl - 15 - carboxygona - 1,3,5(10),8,14 - pentaen-17-ones is dissolved separately in five ml. of acetic acid and 0.5 ml. of concentrated hydrochloric acid and warmed under nitrogen on a steam bath for forty minutes. The mixtures are cooled, fifty ml. of water are added and the whole is extracted with ether. The extracts are washed with 5% aqueous potassium bicarbonate solution, washed with saturated aqueous sodium chloride solution, dried over magnesium sulfate, and concentrated to dryness under reduced pressure. The residues are crystallized from methanol. The crystallized materials are d- and l-3-phenoxy-13-isopropylgona - 1,3,5(10),8,14 - pentaen - 17-ones.

Example 99.—d- and l-3-phenoxy-13-isopropyl-15-carboxygona-1,3,5(10),8-tetraen-ones 808 milligrams of 3-phenoxy-13-isopropyl-15-carboxygona-1,3,5(10),8-tetraen-one and 790 mg. of l-brucine are dissolved in the minimum amount of warm ethanol required for all to be in solution. The solution is cooled and concentrated on a steam bath until crystals of the l-brucine salt of 3-phenoxy-13-isopropyl-15-carboxygona-1,3,5(10),8-tetraen-one first appear. The solution is then allowed to stand overnight with cooling and the crystals that are formed are removed by filtration and washed with cold ethanol. The crystalline material is a mixture of the d- and l-diastereomers of the l-brucine salt of 3-phenoxy-13-isopropyl-15-carboxygona - 1,3,5(10),8 - tetraen - one. The d- and l-diastereomers of the l-brucine salt of 3-phenoxy - 13 - isopropyl - 15 - carboxygona - 1,3,5(10),8-tetraen-one are obtained in pure form by fractionally recrystallizing the mixture from a solvent composed of ethanol and ethyl acetate.

The d- and l-3-phenoxy - 13 - isopropyl - 15 - carboxygona-1,3,5(10),8-tetraen-ones are obtained by dissolving each of the d- and l-diastereomers of the l-brucine salt of 3-phenoxy-13-isopropyl-15-carboxygona - 1,3,5(10),8-tetraen-one separately in an excess amount of 1 N hydrochloric acid, extracting with chloroform, drying the chloroform solution over magnesium sulfate, filtering and removing the chloroform from the filtrate by distillation under reduced pressure. The residues are d- and l-3-phenoxy - 13 - isopropyl - 15 - carboxygona - 1,3,5(10),8-tetraen-ones and are recrystallized from an ethanol-ethyl acetate solvent.

Example 100.—d- and l-3-phenoxy-13-isopropyl-15-carboxygona-1,3,5(10),8-tetraen-ones A mixture of 808 mg. of 3-phenoxy-13-isopropyl-15-carboxygona-1,3,5(10),8-tetraen-one, 100 mg. of para-toluenesulfonic acid and 313 mg. of l-menthol in 10 ml. of benzene is refluxed in a system which contains a Dean-Stark water separator. Refluxing is continued as long as water separates from the reflux. After refluxing is complete, the reaction mixture is cooled to room temperature, washed with ice-cold aqueous sodium bicarbonate solution and then washed with water. The benzene is removed from the reaction mixture by distillation under reduced pressure and any unreacted l-menthol is removed by steam distillation. The residue is a mixture of the d- and l-diastereomers of the l-menthyl esters of 3-phenoxy-13-isopropyl - 15 - carboxygona - 1,3,5(10),8 - tetraen - one. The d- and l-diastereomers of the l-menthyl esters of 3-phenoxy - 13 - isopropyl - 15 - carboxygona - 1,3,5(10),8-tetraen-one are obtained in pure form by fractionally recrystallizing the mixture from a chloroform-hexane solvent.

The d- and l-3-phenoxy-13-isopropyl-15 carboxygona-1,3,5(10),8-tetraen-ones are obtained by refluxing a solution of 200 mg. of each of the d- and l-diastereomers of the l-menthyl esters of 3-phenoxy-13-isopropyl-15-carboxygona-1,3,5(10),8-tetraen-one separately in 2 ml. of ethanol containing 40 mg. of potassium hydroxide for four hours under nitrogen, removing the ethanol by distillation under reduced pressure, adding water to the residue, extracting the mixture with ether to remove non-acidic materials, separating the aqueous phase, making acid to Congo red while at 0°–5° C. with dilute hydrochloric acid and collecting the precipitated d- and l-3-phenoxy-13-isopropyl - 15 - carboxygona - 1,3,5(10),8-tetraen-ones by filtration.

Example 101.—d- and l-3-phenoxy-13-isopropylgona-1,3,5(10),8-tetraen-ones 400 milligrams of each of the d- and l-3-phenoxy-13-isopropyl-15-carboxygona-1,3,5(10),8-tetraen-ones is dissolved separately in five ml. of acetic acid and 0.5 ml. of concentrated hydrochloric acid and warmed under nitrogen on a steam bath for forty minutes. The mixtures are cooled, fifty ml. of water are added and the whole is extracted with ether. The extracts are washed with 5% aqueous potassium bicarbonate solution, washed with saturated aqueous sodium chloride solution, dried over magnesium sulfate, and concentrated to dryness under reduced pressure. The residues are crystallized from methanol. The crystallized materials are d- and l-3-phenoxy-13-isopropylgona-1,3,5(10),8-tetraen-ones Example 102.—d- and l-3-phenoxy-13-isopropyl-15-carboxygona-1,3,5(10)-trien-17β-ols 814 milligrams of 3-phenoxy-13-isopropyl-15-carboxygona-1,3,5(10)-trien-17β-ol and 790 mg. of l-brucine are dissolved in the minimum amount of warm ethanol required for all to be in solution. The solution is cooled and concentrated on a steam bath until crystals of the l-brucine salt of 3-phenoxy-13-isopropyl-15-carboxygona-1,3,5(10)-trien-17β-ol first appear. The solution is then allowed to stand overnight with cooling and the crystals that are formed are removed by filtration and washed with cold ethanol. The crystalline material is a mixture of the d- and l-diastereomers of the l-brucine salt of 3-phenoxy-13-isopropyl - 15 - carboxygona-1,3,5(10)-trien-17β-ol. The d- and l-diastereomers of the l-brucine salt of 3-phenoxy-13-isopropyl - 15 - carboxygona - 1,3,5(10)-trien-17β-ol are obtained in pure form by fractionally recrystallizing the mixture from a solvent composed of ethanol and ethyl acetate.

The d- and l-3-phenoxy-13-isopropyl-15-carboxygona-1,3,5(10)-trien-17β-ols are obtained by dissolving each of the d- and l-diastereomers of the l-brucine salt of 3-phenoxy-13-isopropyl-15 - carboxygona - 1,3,5(10)-trien-17β-ol in an excess amount of 1 N hydrochloric acid, extracting with chloroform, drying the chloroform solution over magnesium sulfate, filtering and removing the chloroform from the filtrate by distillation under reduced pressure. The residues are d- and l-3-phenoxy-13-isopropyl-15-carboxygona-1,3,5(10)-trien-17β-ols and are recrystallized from an ethanol-ethyl acetate solvent.

Example 103.—d- and l-3-phenoxy-13-isopropyl-15-carboxygona-1,3,5(10)-trien-17β-ols A mixture of 814 mg. of 3-phenoxy-13-isopropyl-15-carboxygona-1,3,5(10)-trien-17β-ol, 100 mg. of para-toluenesulfonic acid and 313 mg. of l-menthol in 10 ml. of benzene is refluxed in a system which contains a Dean-Stark water separator. Refluxing is continued as long as water separates from the reflux. After refluxing is complete, the reaction mixture is cooled to room temperature, washed with ice-cold aqueous sodium bicarbonate solution and then washed with water. The benzene is removed from the reaction mixture by distillation under reduced pressure and any unreacted l-menthol is removed by steam distillation. The residue is a mixture of the d- and l-diastereomers of the l-menthyl esters of 3-phenoxy-13-isopropyl-15-carboxygona-1,3,5(10)-trien-17β-ol. The d- and l-diastereomers of the l-menthyl esters of 3-phenoxy-13-isopropyl-15-carboxygona-1,3,5(10)-trien-17β-ol are obtained in pure form by fractionally recrystallizing the mixture from a chloroform-hexane solvent.

The d- and l-3-phenoxy-13-isopropyl-15-carboxygona-1,3,5(10)-trien-17β-ols are obtained by refluxing a solution of 200 mg. of each of the d- and l-diastereomers of the l-menthyl esters of 3-phenoxy-13-isopropyl-15-carboxygona-1,3,5(10)-trien-17β-ol separately in 2 ml. of ethanol containing 40 mg. of potassium hydroxide for four hours under nitrogen, removing the ethanol by distillation under reduced pressure, adding water to the residue, extracting the mixture with ether to remove non-acidic materials, separating the aqueous phase, making acid to Congo red while at 0°–5° C. with dilute hydrochloric acid and collecting the precipitated d- and l-3-phenoxy-13-isopropyl - 15 - carboxygona-1,3,5(10)-trien-17β-ols by filtration.

Example 104.—d- and l-3-phenoxy-13-isopropylgona-1,3,5(10)-trien-17β-ols 400 milligrams of each of the d- and l-3-phenoxy-13-isopropyl-15-carboxygona-1,3,5(10)-trien-17β-ols is dissolved separately in five ml. of acetic acid and 0.5 ml. of concentrated hydrochloric acid and warmed under nitrogen on a steam bath for forty minutes. The mixtures are cooled, fifty ml. of water are added and the whole is extracted with ether. The extracts are washed with 5% aqueous potassium bicarbonate solution, washed with saturated aqueous sodium chloride solution, dried over magnesium sulfate, and concentrated to dryness under reduced pressure. The residues are crystallized from methanol. The crystallized materials are d- and l-3-phenoxy-13-isopropylgona-1,3,5(10)-trien-17β-ols.

Example 105.—d- and l-3-phenoxy-13-isopropyl-15-carboxygona-1,3,5(10)-trien-17-ones 812 milligrams of 3-phenoxy-13-isopropyl-15-carboxygona-1,3,5(10)-trien-17-one and 790 mg. of l-brucine are dissolved in the minimum amount of warm ethanol required for all to be in solution. The solution is cooled and concentrated on a steam bath until crystals of the l-brucine salt of 3-phenoxy-13-isopropyl-15-carboxygona-1,3,5(10)-trien-17-one first appear. The solution is then allowed to stand overnight with cooling and the crystals that are formed are removed by filtration and washed with cold ethanol. The crystalline material is a mixture of the d- and l-diastereomers of the l-brucine salt of 3-phenoxy-13-isopropyl-15-carboxygona-1,3,5(10)-trien-17-one. The d- and l-diastereomers of the l-brucine salt of 3 - phenoxy-13-isopropyl-15-carboxygona-1,3,5(10)-trien-17-one are obtained in pure form by fractionally recrystallizing the mixture from a solvent composed of ethanol and ethyl acetate.

The d- and l-3-phenoxy-13-isopropyl-15-carboxygona-1,3,5(10)-trien-17-ones are obtained by dissolving each of the d- and l-diastereomers of the l-brucine salt of 3-phenoxy-13-isopropyl-15-carboxygona-1,3,5(10)-trien-17-one separately in an excess amount of 1 N hydrochloric acid, extracting with chloroform, drying the chloroform solution over magnesium sulfate, filtering and removing the chloroform from the filtrate by distillation under reduced pressure. The residues are d- and l-3-phenoxy-13-isopropyl-15-carboxygona-1,3,5(10)-trien-17-one and are recrystallized from an ethanolethyl acetate solvent.

Example 106.—d- and l-3-phenoxy-13-isopropyl-15-carboxygona-1,3,5(10)-trien-17-ones A mixture of 812 mg. of 3-phenoxy-13-isopropyl-15-carboxygona-1,3,5(10)-trien-17-one, 100 mg. of paratoluenesulfonic acid and 313 mg. of l-menthol in 10 ml. of benzene is refluxed in a system which contains a Dean-Stark water separator. Refluxing is continued as long as water separates from the reflux. After refluxing is complete, the reaction mixture is cooled to room temperature, washed with ice-cold aqueous sodium bicarbonate solution and then washed with water. The benzene is removed from the reaction mixture by distillation under reduced pressure and any unreacted l-menthol is removed by steam distillation. The residue is a mixture of the d- and l-diastereomers of the l-methyl esters of 3-phenoxy-13-isopropyl-15-carboxygona-1,3,5(10)-trien-17-one. The d- and l-diastereomers of the l-methyl esters of 3-phenoxy-13-isopropyl - 15 - carboxygona-1,3,5(10)-trien-17-one are obtained in pure form by fractionally recrystallizing the mixture from a chloroform-hexane solvent.

The d- and l-3-phenoxy-13-isopropyl-15-carboxygona-1,3,5(10)-trien-17-ones are obtained by refluxing a solution of 200 mg. of each of the d- and l-diastereomers of the l-menthyl esters of 3-phenoxy-13-isopropyl-15-carboxygona-1,3,5(10)-trien-17-one separately in 2 ml. of ethanol containing 40 mg. of potassium hydroxide for four hours under nitrogen, removing the ethanol by distillation under reduced pressure, adding water to the residue, extracting the mixture with ether to remove non-acidic materials, separating the aqueous phase, making acid to Congo red while at 0°–5° C. with dilute hydrochloric acid and collecting the precipitated d- and l-3-phenoxy-13 - isopropyl-15-carboxygona-1,3,5(10)-trien-17-ones by filtration.

Example 107.—d- and l-3-phenoxy-13-isopropyl-gona-1,3,5(10)-trien-17-ones 400 milligrams of each of the d- and l-3-phenoxy-13-isopropyl-15-carboxygona-1,3,5(10)-trien-17-ones is dissolved separately in five ml. of acetic acid and 0.5 ml. of concentrated hydrochloric acid and warmed under nitrogen on a steam bath for forty minutes. The mixtures are cooled, fifty ml. of water are added and the whole is extracted with ether. The extracts was washed with 5% aqueous potassium bicarbonate solution, washed with saturated aqueous sodium chloride solution, dried over magnesium sulfate, and concentrated to dryness under reduced pressure. The residues are crystallized from methanol. The crystallized materials are d- and l-3-phenoxy-13-isopropylgona-1,3,5(10)-trien-17-ones.

Example 108.—d- and l-3-phenoxy-13-isopropyl-15-carboxygona-1,3,5(10),9(11)-tetraen-17-ones 808 milligrams of 3-phenoxy-13-isopropyl-15-carboxygona-1,3,5(10),9(11)-tetraen-17-one and 790 mg. of l-brucine are dissolved in the minimum amount of warm ethanol required for all to be in solution. The solution is cooled and concentrated on a steam bath until crystals of the l-brucine salt of 3-phenoxy-13-isopropyl-15-carboxygona-1,3,5(10),9(11)-tetraen-17-one first appear. The solution is then allowed to stand overnight with cooling and the crystals that are formed are removed by filtration and washed with cold ethanol. The crystalline material is a mixture of the d- and l-diastereomers of the l-brucine salt of 3-phenoxy-13-isopropyl-15-carboxygona-1,3,5(10),9(11)-tetraen-17-one. The d- and l-diastereomers of the l-brucine salt of 3-phenoxy-13-isopropyl-15-carboxygona-1,3,5(10),9(11)-tetraen-17-one are obtained in pure form by fractionally recrystallizing the mixture from a solvent composed of ethanol and ethyl acetate.

The d- and l-3-phenoxy-13-isopropyl-15-carboxygona-1,3,5(10),9(11)-tetraen-17-ones are obtained by dissolving each of the d- and l-diastereomers of the l-brucine salt of 3-phenoxy-13-isopropyl-15-carboxygona-1,3,5(10), 9(11)-tetraen-17-one separately in an excess amount of 1 N hydrochloric acid, extracting with chloroform, drying the chloroform solution over magnesium sulfate, filtering and removing the chloroform from the filtrate by distillation under reduced pressure. The residues are d- and l-3-phenoxy-13-isopropyl-15-carboxygona - 1,3,5(10), 9(11)-tetraen-17-ones and are recrystallized from an ethanolethyl acetate solvent.

Example 109.—d- and l-3-phenoxy-13-isopropyl-15-carboxygona-1,3,5(10), 9(11)-tetraen-17-ones A mixture of 808 mg. of 3-phenoxy-13-isopropyl-15-carboxygona-1,3,5(10),9(11)-tetraen-17-one, 100 mg. of paratoluenesulfonic acid and 313 mg. of l-menthol in 10 ml. of benzene is refluxed in a system which contains a Dean-Stark water separator. Refluxing is continued as long as water separates from the reflux. After refluxing is complete, the reaction mixture is cooled to room temperature, washed with ice-cold aqueous sodium bicarbonate solution and then washed with water. The benzene is removed from the reaction mixture by distillation under reduced pressure and any unreacted l-menthol is removed by steam distillation. The residue is a mixture of the d- and l-diastereomers of the l-methyl esters of 3-phenoxy - 13 - isopropyl-15-carboxygona-1,3,5(10),9(11)-tetraen-17-one. The d- and l-diastereomers of the l-menthyl esters of 3-phenoxy-13-isopropyl-15-carboxygona-1,3,5(10),9(11)-tetraen-17-one are obtained in pure form by fractionally recrystallizing the mixture from a chloroform-hexane solvent.

The d- and l-3-phenoxy-13-isopropyl-15-carboxygona-1,3,5(10),9(11)-tetraen-17-ones are obtained by refluxing a solution of 200 mg. of each of the d- and l-diastereomers of the l-menthyl esters of 3-phenoxy-13-isopropyl - 15 - carboxygona-1,3,5(10),9(11)-tetraen-17-one separately in 2 ml. of ethanol containing 40 mg. of potassium hydroxide for four hours under nitrogen, removing the ethanol by distillation under reduced pressure, adding water to the residue, extracting the mixture with ether to remove non-acidic materials, separating the aqueous phase, making acid to Congo red while at 0°–50° C. with dilute hydrochloric acid and collecting the precipitated d- and l - 3 - phenoxy-13-isopropyl-15-carboxygona-1,3,5(10),9(11)-tetraen-17-ones by filtration.

Example 110.—d- and l-3-phenoxy-13-isopropylgona-1,3,5(10),9(11)-tetraen-17-ones 400 milligrams of each of the d- and l-3-phenoxy-13-isopropyl - 15 - carboxygona-1,3,5(10),9(11)-tetraen-17-ones is dissolved separately in five ml. of acetic acid and 0.5 ml. of concentrated hydrochloric acid and warmed under nitrogen on a steam bath for forty minutes. The mixtures are cooled, fifty ml. of water are added and the whole is extracted with ether. The extracts are washed with 5% aqueous potassium bicarbonate solution, washed with saturated aqueous sodium chloride solution, dried over magnesium sulfate, and concentrated to dryness under reduced pressure. The residues are crystallized from methanol. The crystallized materials are d- and l-3-phenoxy - 13 - isopropylgona-1,3,5(10),9(11)-tetraen-17-ones.

Example 111.—d- and l-3-hydroxy-13-(2-butenyl)-15-carboxygona-1,3,5(10),8,14-pentaen-17-ones 846 milligrams of 3-tetrahydropyranyloxy-13-(2-butenyl) - 15 - carboxygona-1,3,5(10),8,14-pentaen-17-one and 790 mg. of l-brucine are dissolved in the minimum amount of warm ethanol required for all to be in solution. The solution is cooled and concentrated on a steam bath until crystals of the l-brucine salt of 3-tetrahydropyranyloxy - 13 - (2-butenyl)-15-carboxygona-1,3,5(10),8,14-pentaen-17-one first appear. The solution is then allowed to stand overnight with cooling and the crystals that are formed are removed by filtration and washed with cold ethanol. The crystalline material is a mixture of the d- and l-diastereomers of the l-brucine salt of 3-tetrahydropyranyloxy - 13 - (2-butenyl)-15-carboxygona-1,3,5(10),8,14-pentaen-17-one. The d- and l-diastereomers of the l-brucine salt of 3-tetrahydropyranyloxy-13-(2-butenyl) - 15 - carboxygona-1,3,5(10),8,14-pentaen - 17 - one are obtained in pure form by fractionally recrystallizing the mixture from a solvent composed of ethanol and ethyl acetate.

The d- and l-3-hydroxy - 13 - (2-butenyl)-15-carboxygona-1,3,5(10),8,14-pentaen-17-ones are obtained by dissolving each of the d- and l-diastereomers of the l-brucine salt of 3-tetrahydropyranyloxy-13-(2-butenyl)-15-carboxygona-1,3,5(10),8,14-pentaen-17-one separately in an excess amount of 1 N hydrochloric acid, extracting with chloroform, drying the chloroform solution over magnesium sulfate, filtering and removing the chloroform from the filtrate by distillation under reduced pressure. The residues are d- and l-3-hydroxy-13-(2-butenyl)-15-carboxygona-1,3,5(10),8,14-pentaen-17-ones and are recrystallized from an ethanol-ethyl acetate solvent.

Example 112.—d- and l-3-tetrahydropyranyloxy-13-(2-butenyl) - 15 - carboxygona-1,3,5(10),8,14-pentaen-17-ones A mixture of 846 mg. of 3-tetrahydropyranyloxy-13-(2 - butenyl)-15-carboxygona-1,3,5(10),8,14-pentaen-17-one, 100 mg. of para-toluenesulfonic acid and 313 mg. of l-menthol in 10 ml. of benzene is refluxed in a system which contains a Dean-Stark water separator. Refluxing is continued as long as water separates from the reflux. After refluxing is complete, the reaction mixture is cooled to room temperature, washed with ice-cold aqueous sodium bicarbonate solution and then washed with water. The benzene is removed from the reaction mixture by distillation under reduced pressure and any unreacted l-menthol is removed by steam distillation. The residue is a mixture of the d- and l-diastereomers of the l-menthyl esters of 3 - tetrahydropyranyloxy-13-(2-butenyl-15-carboxygona-1,3,5,(10),8,14-pentaen-17-one. The d- and l-diastereomers of the l-menthyl esters of 3-tetrahydropyranyloxy - 13 - (2-butenyl-15-carboxygona-1,3,5(10), 8,14-pentaen-17-one are obtained in pure form by fractionally recrystallizing the mixture from a chloroform-hexane solvent.

The d- and l-3-tetrahydropyranyloxy-13-(2-butenyl)-15-carboxygona-1,3,5(10),8,14-pentaen-17-ones are obtained by refluxing a solution of 200 mg. of each of the d- and l-diastereomers of the l-menthyl esters of 3-tetrahydropyranyloxy - 13 - (2-butenyl)-15-carboxygona-1,3,5(10),8,14-pentaen-17-one in 2 ml. of ethanol containing 40 mg. of potassium hydroxide for four hours under nitrogen, removing the ethanol by distillation under reduced pressure, adding water to the residue, extracting the mixture with ether to remove non-acidic materials, separating the aqueous phase, making acid to Congo red while at 0°–5° C. with dilute hydrochloric acid and collecting the precipitated d- and l-3-tetrahydropyranyloxy-13-(2-butenyl) - 15 - carboxygona-1,3,5(10),8,14-pentaen-17-ones by filtration.

Example 113.—d- and l-3-tetrahydropyranyloxy-13-(2-butenyl)-gona-1,3,5(10),8,14-pentaen-17-ones 400 milligrams of each of the d -and l-3-tetrahydropyranyloxy - 13-(2-butenyl)-15-carboxygona-1,3,5(10),8,14-pentaen-17-ones is dissolved separately in five ml. of acetic acid and 0.5 ml. of concentrated hydrochloric acid and warmed under nitrogen on a steam bath for forty minutes. The mixtures are cooled, fifty ml. of water are added and the whole is extracted with ether. The extracts are washed with 5% aqueous potassium bicarbonate solution, washed with saturated aqueous sodium chloride solution, dried over magnesium sulfate, and concentrated to dryness under reduced pressure. The residues are crystallized from methanol. The crystallized materials are d- and 1-3-tetrahydropyranoyloxy-13-(2-butenyl)-gona-1,3,5(10),8,14-pentaen-17-ones.

Example 114.—d- and l-3-tetrahydropyranyloxy-13-(2-butenyl)-15-carboxygona-1,3,5(10),8-tetraen-ones 850 milligrams of 3-tetrahydropyranyloxy-13-(2-butenyl)-15-carboxygona-1,3,5(10),8-tetraen-one and 790 mg. of l-brucine are dissolved in the minimum amount of warm ethanol required for all to be in solution. The solution is cooled and concentrated on a steam bath until crystals of the l-brucine salt of 3-tetrahydropyranyloxy-13 - (2-butenyl)-15-carboxygona-1,3,5(10),8-tetraen-one first appear. The solution is then allowed to stand overnight with cooling and the crystals that are formed are removed by filtration and washed with cold ethanol. The crystalline material is a mixture of d- and l-diastereomers of the l-brucine salt of 3-tetrahydropyranyloxy-13-(n-butyl)-15-carboxygona-1,3,5(10),8-tetraen-one. The d- and l-diastereomers of the l-brucine salt of 3-tetrahydropyranyloxy-13-(2-butenyl)-15-carboxygona-1,3,5(10),8-tetraen-one are obtained in pure form by fractionally recrystallizing the mixture from a solvent composed of ethanol and ethyl acetate.

The d- and l-3-hydroxy-13-(n-butyl)-15-carboxygona-1,3,5(10),8-tetraen-ones are obtained by dissolving each of the d- and l-diastereomers of the l-brucine salt of 3-tetrahydropyranyloxy-13-(n-butyl)-15-carboxygona-1,3,5(10),8-tetraen-one separately in an excess amount of 1 N hydrochloric acid, extracting with chloroform, drying the chloroform solution over magnesium sulfate, filtering and removing the chloroform from the filtrate by distillation under reduced pressure. The residues are d- and l-3-hydroxy - 13-(n - butyl) - 15 - carboxygona - 1,3,5(10),8-tetraen-ones and are recrystallized from an ethanol-ethyl acetate solvent.

Example 115.—d- and l-3-tetrahydropyranyloxy-13-(n-butyl)-15-carboxygona-1,3,5(10),8-tetraen-ones A mixture of 850 mg. of 3-tetrahydropyranyloxy-13-(n-butyl)-15-carboxygona-1,3,5(10),8-tetraen-one, 100 mg. of para-toluenesulfonic acid and 313 mg. of l-menthol in 10 ml. of benzene is refluxed in a system which contains a Dean-Stark water separator. Refluxing is continued as long as water separates from the reflux. After refluxing is complete, the reaction mixture is cooled to room temperature, washed with ice-cold aqueous sodium bicarbonate solution and then washed with water. The benzene is removed from the reaction mixture by distillation under reduced pressure and any unreacted l-menthol is removed by steam distillation. The residue is a mixture of the d- and l-diastereomers of the l-menthyl esters of 3-tetrahydropyranyloxy - 13 - (n-butyl)-15-carboxygona-1,3,5(10),8-tetraen-one. The d- and l-diastereomers of the l-menthyl esters of 3-tetrahydropyranyloxy-13-(n-butyl)-15-carboxygona-1,3,5(10),8-tetraen-one are obtained in pure form by fractionally recrystallizing the mixture from a chloroform-hexane solvent.

The d- and l-3-tetrahydropyranyloxy-13-(n-butyl)-15-carboxygona-1,3,5(10),8-tetraen-ones are obtained by refluxing a solution of 200 mg. of each of the d- and l-diastereomers of the l-menthyl esters of 3-tetrahydropyranyloxy - 13-(n-butyl)-15-carboxygona-1,3,5(10),8-tetraen-one separately in 2 ml. of ethanol containing 40 mg. of potassium hydroxide for four hours under nitrogen, removing the ethanol by distillation under reduced pressure, adding water to the residue, extracting the mixture with ether to remove non-acidic materials, separating the aqueous phase, making acid to Congo red while at 0°–5° C. with dilute hydrochloric acid and collecting the precipitated d- and l-3-tetrahydropyranyloxy-13-(n-butyl)-15-carboxygona-1,3,5(10),8-tetraen-ones by filtration.

Example 116.—d- and l-3-tetrahydropyranyloxy-13-(n-butyl)-gona-1,3,5(10),8-tetraen-ones 400 milligrams of each of the d- and l-3-tetrahydropyranyloxy - 13-(n-butyl)-15-carboxygona-1,3,5(10),8-tetraen-ones is dissolved separately in five ml. of acetic acid and 0.5 ml. of concentrated hydrochloric acid and warmed under nitrogen on a steam bath for forty minutes. The mixtures are cooled, fifty ml. of water are added and the whole is extracted with ether. The extracts are washed with 5% aqueous potassium bicarbonate solution, washed with saturated aqueous sodium chloride solution, dried over magnesium sulfate and concentrated to dryness under reduced pressure. The residues are crystallized from methanol. The crystallized materials are d- and l-3-tetrahydropyranyloxy - 13-(n-butyl)-gona-1,3,5(10),8-tetraen-ones.

Example 117.—d- and l-3-hydroxy-13-(n-butyl)-15-carboxygona-1,3,5(10)-trien-17β-ols 856 milligrams of 3-tetrahydropyranyloxy-13-(n-butyl)-15-carboxygona-1,3,5(10)-trien-17β-ol and 790 mg. of l-brucine are dissolved in the minimum amount of warm ethanol required for all to be in solution. The solution is cooled and concentrated on a steam bath until crystals of the l-brucine salt of 3-tetrahydropyranyloxy-13-(n-butyl)-15-carboxygona-1,3,5(10)-trien-17β-ol first appear. The solution is then allowed to stand overnight with cooling and the crystals that are formed are removed by filtration and washed with cold ethanol. The crystalline material is a mixture of the d- and l-diastereomers of the l-brucine salt of 3-tetrahydropyranyloxy-13-(n-butyl)-15-carboxygona-1,3,5(10)-trien-17β-ol. The d- and l-diastereomers of the l-brucine salt of 3-tetrahydropyranyloxy-13-(n-butyl)-15-carboxygona-1,3,5(10)-trien-17β-ol are obtained in pure form by fractionally recrystallizing the mixture from a solvent composed of ethanol and ethyl acetate.

The d- and l - 3 - hydroxy - 13 - (n-butyl)-15-carboxygona - 1,3,5(10) - trien - 17β - ols are obtained by dissolving each of the d- and l - diastereomers of the l-brucine salt of 3 - tetrahydropyranyloxy - 13 - (n-butyl)-15 - carboxygona - 1,3,5(10) - trien - 17β - ol in an excess amount of 1 N hydrochloric acid, extracting with chloroform, drying the chloroform solution over magnesium sulfate, filtering and removing the chloroform from the filtrate by distillation under reduced pressure. The residues are d- and l - 3 - hydroxy - 13 - (n-butyl)-15 - carboxygona - 1,3,5(10) - trien - 17β - ols and are recrystallized from an ethanol-ethyl acetate solvent.

Example 118.—d- and l-3-tetrahydropyranyloxy-13-(n-butyl)-15-carboxygona-1,3,5(10)-trien-17β-ols A mixture of 856 mg. of 3 - tetrahydropyranyloxy-13 - (n - butyl) - 15 - carboxygona - 1,3,5(10) - trien-17β-ol, 100 mg. of para - toluenesulfonic acid and 313 mg. of l - menthol in 10 ml. of benzene is refluxed in a system which contains a Dean-Stark water separator. Refluxing is continued as long as water separates from the reflux. After refluxing is complete, the reaction mixture is cooled to room temperature, washed with ice-cold aqueous sodium bicarbonate solution and then washed with water. The benzene is removed from the reaction mixture by distillation under reduced pressure and any unreacted l-menthol is removed by steam distillation. The residue is a mixture of the d- and l-diastereomers of the l - menthyl esters of 3 - tetrahydropyranyloxy - 13-(n-butyl) - 15 - carboxygona - 1,3,5(10) - trien - 17β-ol. The d- and l-diastereomers of the l - menthyl esters of 3 - tetrahydropyranyloxy - 13 - (n - butyl) - 15 - carboxygona - 1,3,5(10) - trien - 17β - ol are obtained in pure form by fractionally recrystallizing the mixture from a chloroform-hexane solvent.

The d- and l - 3 - tetrahydropyranyloxy - 13 - (n-butyl) - 15 - carboxygona - 1,3,5(10) - trien - 17β - ols are obtained by refluxing a solution of 200 mg. of each of the d- and l - diastereomers of the l-menthyl esters of 3 - tetrahydropyranyloxy - 13 - (n - butyl) - 15-carboxygona - 1,3,5(10) - trien - 17β - ol separately in 2 ml. of ethanol containing 40 mg. of potassium hydroxide for four hours under nitrogen, removing the ethanol by distillation under reduced pressure, adding water to the residue, extracting the mixture with ether to remove non-acidic materials, separating the aqueous phase, making acid to Congo red while at 0° —5° C. with dilute hydrochloric acid and collecting the precipitated d- and l-3-tetrahydropyranyloxy - 13 - (n - butyl) - 15 - carboxygona - 1,3,5(10)-trien-17β-ols by filtration.

Example 119.—d- and l-3-tetrahydropyranyloxy-13-(n-butyl)-gona-1,3,5(10)-trien-17β-ols 400 milligrams of each of the d- and l - 3 - tetrahydropyranyloxy - 13 - (n - butyl) - 15 - carboxygona-1,3,5(10) - trien - 17β - ols is dissolved separately in five ml. of acetic acid and 0.5 ml. of concentrated hydrochloric acid and warmed under nitrogen on a steam bath for forty minutes. The mixtures are cooled, fifty ml. of water are added and the whole is extracted with ether. The extracts are washed with 5% aqueous potassium bicarbonate solution, washed with saturated aqueous sodium chloride solution, dried over magnesium sulfate, and concentrated to dryness under reduced pressure. The residues are crystallized from methanol. The crystallized materials are d- and l - 3 - tetrahydropyranyloxy - 13 - (n-butyl)-gona-1,3,5(10)-trien-17β-ols.

Example 120.—d- and l-3-hydroxy-13-(n-butyl)-15-carboxygona-1,3,5(10)-trien-17-ones 854 milligrams of 3 - tetrahydropyranyloxy - 13 - (n-butyl) - 15 - carboxygona - 1,3,5(10) - trien - 17 - one and 790 mg. of 1 - brucine are dissolved in the minimum amount of warm ethanol required for all to be in solution. The solution is cooled and concentrated on a steam bath until crystals of the 1 - brucine salt of 3 - tetrahydropyranyloxy - 13 - (n - butyl) - 15 - carboxygona-1,3,5(10) - trien - 17 - one first appear. The solution is then allowed to stand overnight with cooling and the crystals that are formed are removed by filtration and washed with cold ethanol. The crystalline material is a mixture of the d- and l-diastereomers of the 1 - brucine salt of 3 - tetrahydropyranyloxy - 13 - (n - butyl)-15-carboxygona - 1,3,5(10) - trien - 17 - one. The d- and l-diastereomers of the 1 - brucine salt of 3 - tetrahydropyranyloxy - 13 - (n - butyl)  15 - carboxygona - 1,3,5(10) - trien - 17 - one are obtained in pure form by fractionally recrystallizing the mixture from a solvent composed of ethanol and ethyl acetate.

The d- and l - 3 - hydroxy - 13 - (n - butyl) - 15-carboxygona - 1,3,5(10) - trien - 17 - ones are obtained by dissolving each of the d- and l - diastereomers of the 1-brucine salt of 3 - tetrahydropyranyloxy - 13 - (n-butyl) - 15 - carboxygona - 1,3,5(10) - trien - 17 - one separately in an excess amount of 1 N hydrochloric acid, extracting with chloroform, drying the chloroform solution over magnesium sulfate, filtering and removing the chloroform from the filtrate by distillation under reduced pressure. The residues are d- and l - 3 - hydroxy - 13- (n - butyl) - 15 - carboxygona - 1,3,5(10) - trien - 17-ones and are recrystallized from an ethanol - ethyl acetate solvent.

Example 121.—d- and l-3-tetrahydropyranyloxy-13-(n-butyl)-15-carboxygona-1,3,5(10)-trien-17-ones A mixture of 854 mg. of 3 - tetrahydropyranyloxy-13 - (n - butyl) - 15 - carboxygona - 1,3,5(10) - trien-17 - one, 100 mg. of para - toluenesulfonic acid and 313 mg. of 1 - menthol in 10 ml. of benzene is refluxed in a system which contains a Dean-Stark water separator. Refluxing is continued as long as water separates from the reflux. After refluxing is complete, the reaction mixture is cooled to room temperature, washed with ice-cold aqueous sodium bicarbonate solution and then washed with water. The benzene is removed from the reaction mixture by distillation under reduced pressure and any unreacted 1 - menthol is removed by steam distillation. The residue is a mixture of the d- and l - diastereomers of the 1-menthyl esters or 3 - tetrahydropyranyloxy-13-(n - butyl) - 15 - carboxygona - 1,3,5(10) - trien - 17-one. The d- and l - diastereomers of the 1-menthyl esters of 3 - tetrahydropyranyloxy - 13 - (n - butyl) - 15 - carboxygona - 1,3,5(10) - trien - 17 - one are obtained in pure form by fractionally recrystallizing the mixture from a chloroform-hexane solvent.

The d- and l - 3 - tetrahydropyranyloxy - 13 - (n-butyl) - 15 - carboxygona - 1,3,5(10) - trien - 17 - ones are obtained by refluxing a solution of 200 mg. of each of the d- and l - diastereomers of the 1-menthyl esters of 3 - tetrahydropyranyloxy - 13 - (n - butyl) - 15 - carboxygona - 1,3,5(10) - trien - 17 - one separately in 2 ml. of ethanol containing 40 mg. of potassium hydroxide for four hours under nitrogen, removing the ethanol by distillation under reduced pressure, adding water to the residue, extracting the mixture with ether to remove nonacidic materials, separating the aqueous phase, making acid to Congo red while at 0°–5° C. with dilute hydrochloric acid and collecting the precipitated d- and l-3-tetrahydropyranyloxy - 13 - (n-butyl) - 15 - carboxygona-1,3,5(10)-trien-17-ones by filtration.

Example 122.—d- and l-3-tetrahydropyranyloxy-13-(n-butyl)-gona-1,3,5(10)-trien-17-ones 400 milligrams of each of the d- and l-3-tetrahydropyranyloxy - 13 - (n - butyl) - 15 - carboxygona - 1,3, 5(10) - trien - 17 - ones is dissolved separately in five ml. of acetic acid and 0.5 ml. of concentrated hydrochloric acid and warmed under nitrogen on a steam bath for forty minutes. The mixtures are cooled, fifty ml. of water are added and the whole is extracted with ether. The extracts are washed with 5% aqueous potassium bicarbonate solution, washed with saturated aqueous sodium chloride solution, dried over magnesium sulfate, and concentrated to dryness under reduced pressure. The residues are crystallized from methanol. The crystallized materials are d- and l - 3 - tetrahydropyranyloxy-13-(n-butyl)-gona-1,3,5(10)-trien-17-ones.

Example 123.—d- and l-3-hydroxy-13-(n-butyl)-15-carboxygona-1,3,5(10),9(11)-tetraen-17-ones 850 milligrams of 3 - hydroxy - 13 - (n - butyl) - 15-carboxygona - 1,3,5(10),9(11) - tetraen - 17 - one and 790 mg. of 1-brucine are dissolved in the minimum amount of warm ethanol required for all to be in solution. The solution is cooled and concentrated on a steam bath until crystals of the 1-brucine salt of 3 - hydroxy-13 - (n - butyl - 15 - carboxygona - 1,3,5(10),9(11)-tetraen - 17 - one first appear. The solution is then allowed to stand overnight with cooling and the crystals that are formed are removed by filtration and washed with cold ethanol. The crystalline material is a mixture of the d- and l - diastereomers of the 1-brucine salt of 3 - hydroxy - 13 - (n - butyl) - 15 - carboxygona - 1, 3,5(10),9(11) - tetraen - 17 - one. The d- and l - diastereomers of the 1-brucine salt of 3 - hydroxy - 13-(n-butyl) - 15 - carboxygona - 1,3,5(10),9(11)-tetraen-17-one are obtained in pure form by fractionally recrystallizing the mixture from a solvent composed of ethanol and ethyl acetate.

The d- and l - 3 - hydroxy - 13 - (n - butyl) - 15-carboxygona - 1,3,5(10),9(11) - tetraen - 17 - ones are obtained by dissolving each of the d- and l-diastereomers of the 1-brucine salt of 3 - hydroxy - 13 - (n - butyl)-15 - carboxygona - 1,3,5(10),9(11)-tetraen - 17 - one separately in an excess amount of 1 N hydrochloric acid, extracting with chloroform, drying the chloroform solution over magnesium sulfate, filtering and removing the chloroform from the filtrate by distillation under reduced pressure. The residues are d- and l - 3 - hydroxy - 13- (n - butyl) - 15 - carboxygona - 1,3,5(10),9(11)-tetraen-17-ones and are recrystallized from an ethanol-ethyl acetate solvent.

Example 124.—d- and l-3-hydroxy-13-(n-butyl)-15-carboxy-gona-1,3,5(10),9(11)-tetraen-17-ones A mixture of 850 mg. of 3 - hydroxy - 13 - (n - butyl)-15 - carboxygona - 1,3,5(10),9(11) - tetraen - 17 - ones, 100 mg. of paratoluenesulfonic acid and 313 ml. of 1-menthol in 10 ml. of benzene is refluxed in a system which contains a Dean-Stark water separator. Refluxing is continued as long as water separates from the reflux. After refluxing is complete, the reaction mixture is cooled to room temperature, washed with ice-cold aqueous sodium bicarbonate solution and then washed with water. The benzene is removed from the reaction mixture by distillation under reduced pressure and any unreacted 1-menthol is removed by steam distillation. The residue is a mixture of the d- and l-diastereomers of the 1-menthyl esters of 3 - hydroxy - 13 - (n - butyl)-15-carboxygona - 1,3,5(10),9(11) - tetraen - 17 - one. The d- and l - diastereomers of the 1-menthyl esters of 3-hydroxy - 13 - (n - butyl) - 15 - carboxygona - 1,3,5(10), 9(11) - tetraen - 17 - one are obtained in pure form by fractionally recrystallizing the mixture from a chloroform-hexane solvent.

The d- and l - 3 - hydroxy - 13 - (n - butyl)-15-carboxygona - 1,3,5(10),9(11) - tetraen - 17 - ones are obtained by refluxing a solution of 200 mg. of each of the d- and l - diastereomers of the l - menthyl esters of 3- hydroxy - 13 - (n - butyl) - 15 - carboxygona - 1,3,5(10), 9(11) - tetraen - 17 - one separately in 2 ml. of ethanol containing 40 mg. of potassium hydroxide for four hours under nitrogen, removing the ethanol by distillation under reduced pressure, adding water to the residue, extracting the mixture with ether to remove non-acidic materials, separating the aqueous phase, making acid to Congo red while at 0°–5° C. with dilute hydrochloric acid and collecting the precipitated d- and l-3-hydroxy-13 - (n - butyl) - 15 - carboxygona - 1,3,5(10),9(11)-tetraen - 17 - ones by filtration.

Example 125.—d- and l-3-hydroxy-13-(n-butyl)-gona-1,3,5(10),9(11)-tetraen-17-ones 400 milligrams of each of the d- and l - 3 - hydroxy-13 - (n - butyl) - 15 - carboxygona - 1,3,5(10),9(11)-tetraen - 17 - ones is dissolved separately in five ml. of acetic acid and 0.5 ml. of concentrated hydrochloric acid and warmed under nitrogen on a steam bath for forty minutes. The mixtures are cooled, fifty ml. of water are added and the whole is extracted with ether. The extracts are washed with 5% aqueous potassium bicarbonate solution, washed with saturated aqueous sodium chloride solution, dried over magnesium sulfate, and concentrated to dryness under reduced pressure. The residues are crystallized from methanol. The crystallized materials are d- and l - 3 - hydroxy - 13 - (n - butyl) - gona - 1,3,5(10), 9(11)-tetraen-17-ones.

Various changes and modifications may be made in carrying out the present invention without departing from the spirit and scope thereof. Insofar as these changes and modifications are within the purview of the annexed claims, they are to be considered as part of our invention.

We claim:
1. A method for the preparation of a compound of the formula:

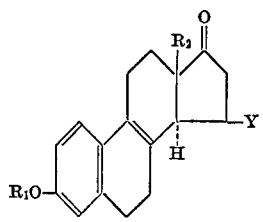

wherein $R_1$ is hydrogen, a lower alkyl or cycloaliphatic substituent, an aryl or alkaryl or aralkyl substituent, or a heterocyclic substituent; $R_2$ is a lower alkyl substituent; and Y is a carboxy or carboxamido substituent, or a carbalkoxy or carbaralkoxy substituent of the formula:

in which $R_3$ is a lower alkoxy substituent or an aralkoxy substituent, which comprises catalytically hydrogenating a compound of the formula:

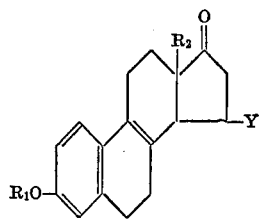

wherein $R_1$ and Y have the same significance as above, and $R_2$ is a lower alkyl substituent or a lower alkenyl substituent having at least three carbon atoms and in which the ethylenic linkage is not between the first and second carbon atoms of the carbon chain.

2. A method for the preparation of a compound of the formula:

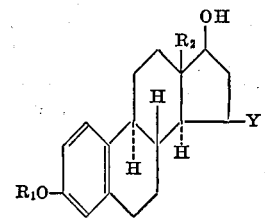

wherein $R_1$ is hydrogen, a lower alkyl or cycloaliphatic substituent, an aryl or alkaryl or aralkyl substituent, or a heterocyclic substituent; $R_2$ is a lower alkyl substituent; and Y is a carboxy or carboxamido substituent, or a carbalkoxy or carbaralkoxy substituent of the formula:

in which $R_3$ is a lower alkoxy substituent or an aralkoxy substituent, which comprises treating a solution in an inert organic solvent of a compound of the formula:

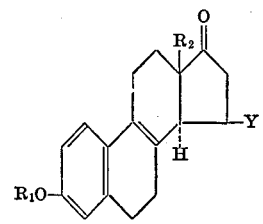

wherein $R_1$, $R_2$, and Y have the same significance as above, with sodium or potassium in liquid ammonia.

3. A method for the preparation of a compound of the formula:

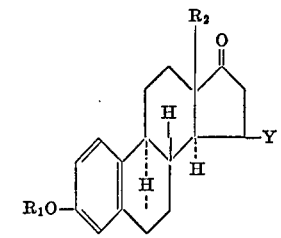

wherein $R_1$ is hydrogen, a lower alkyl or cycloaliphatic substituent, an aryl or alkaryl or aralkyl substituent, or a heterocyclic substituent; $R_2$ is a lower alkyl substituent; and Y is a carboxy or carboxamido substituent, or a carbalkoxy or carbaralkoxy substituent of the formula:

in which $R_3$ is a lower alkoxy substituent or an aralkoxy substituent, which comprises oxidizing a compound of the formula:

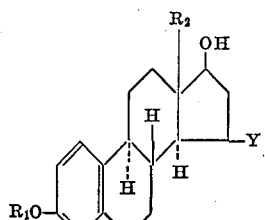

wherein $R_1$, $R_2$, and Y have the same significance as above, in solution in an inert organic solvent with chromic acid.

4. A method for the preparation of a compound of the formula:

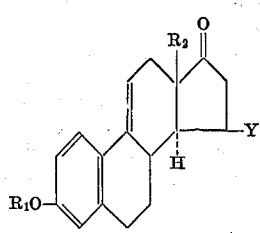

wherein $R_1$ is hydrogen, a lower alkyl or cycloaliphatic substituent, an aryl or alkaryl or aralkyl substituent, or a heterocyclic substituent; $R_2$ is a lower alkyl substituent; and Y is a carboxy or carboxamido substituent, or a carbalkoxy or carbaralkoxy substituent of the formula:

in which $R_3$ is a lower alkoxy substituent or an aralkoxy substituent, which comprises treating a compound of the formula:

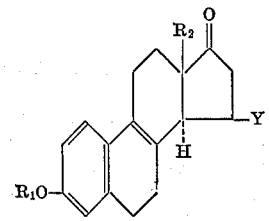

wherein $R_1$, $R_2$, and Y have the same significance as above, with methanolic hydrochloric acid.

5. A method for the preparation of a compound of the formula:

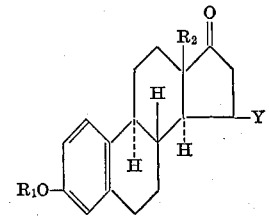

wherein $R_1$ is hydrogen, a lower alkyl or cycloaliphatic substituent, an aryl or alkaryl or aralkyl substituent, or a heterocylic substituent; $R_2$· is a lower alkyl substituent; and Y is carboxy or carboxamido substituent, or a carbalkoxy or carbaralkoxy substituent of the formula:

in which $R_3$ is a lower alkoxy substituent or an aralkoxy substituent, which comprises catalytically hydrogenating a compound of the formula:

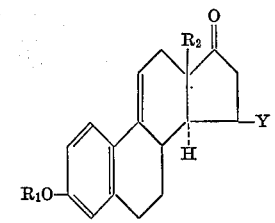

wherein $R_1$, $R_2$, and Y have the same significance as above.

6. A method for the preparation of a compound of the formula:

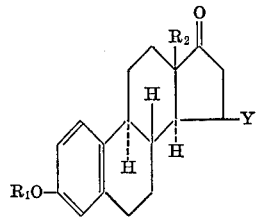

wherein $R_1$ is hydrogen, a lower alkyl or cycloaliphatic substituent, an aryl or alkaryl or aralkyl substituent, or a heterocyclic substituent; $R_2$ is a lower alkyl substituent; and Y is a carboxy or carboxamido substituent, or a carbalkoxy or carbaralkoxy substituent of the formula:

in which $R_3$ is a lower alkoxy substituent or an aralkoxy substituent, which comprises the steps of: hydrogenating a compound of the formula:

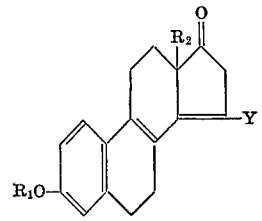

wherein $R_1$, $R_2$, and Y have the same significance as above, to provide a compound of the formula:

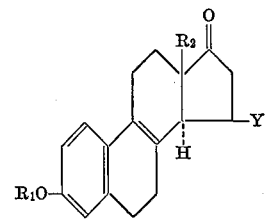

wherein $R_1$, $R_2$ and Y have the same significance as above, treating the latter compound in an organic solvent with sodium or potassium in liquid ammonia, to provide a compound of the formula:

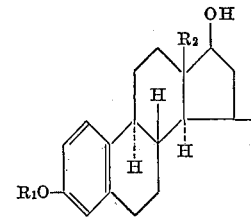

wherein $R_1$, $R_2$ and Y have the same significance as above, and oxidizing the latter compound in solution in an inert organic solvent with chromic acid.

7. A method for prepration of a compound of the formula:

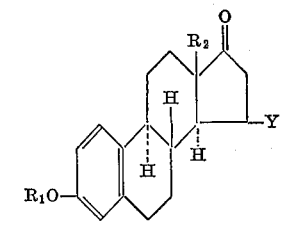

wherein $R_1$ is hydrogen, a lower alkyl or cycloaliphatic substituent, an aryl or alkaryl or aralkyl substituent, or a heterocylic substituent; $R_2$ is a lower alkyl substituent;

and Y is a carboxy or carboxamido substituent, or a carbalkoxy or carbaralkoxy substituent of the formula:

in which $R_3$ is a lower alkoxy substituent or an aralkoxy substituent, which comprises the steps of hydrogenating a compound of the formula:

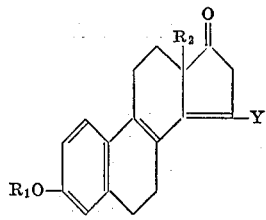

wherein $R_1$, $R_2$, and Y have the same significance as above, to provide a compound of the formula:

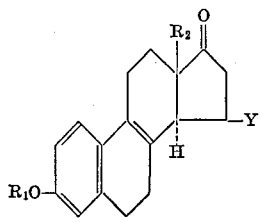

wherein $R_1$, $R_2$ and Y have the same significance as above, treating the latter compound with methanolic hydrochloric acid to provide a compound of the formula:

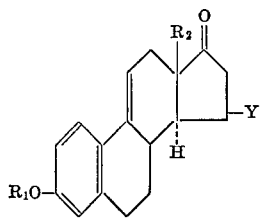

wherein $R_1$, $R_2$ and Y have the same significance as above, and catalytically hydrogenating the latter compound.

8. A method for the preparation of 8,14-secogona-1,3,5(10),9(11)-tetraen-14,17-diones, gona-1,3,5(10),8,14-pentaen-17-ones, gona-1,3,5(10),8-tetraen-17-ones, gona-1,3,5(10)-trien-17α-ols, gona-1,3,5(10)-trien-17-ones, and gona-1,3,5(10),9(11)-tetraen-17-ones having a hydroxy or substituted oxy group at the 3-position, a lower alkyl group at the 13-position and a carboxy substituent at the 15-position, which comprises heating a solution in a lower aliphatic alcohol containing a weak base of a corresponding compound having a carboxamido substituent or a carbalkoxy or carbaralkoxy substituent of the formula:

in which $R_3$ is a lower alkoxy or aralkoxy substituent at the 15-position.

9. A method for the preparation of 8,14-secogona-1,3,5(10),9(11)-tetraen-14,17-diones having a hydroxy or substituted oxy group at the 3-position, a lower alkyl group or a lower alkenyl group having at least three carbon atoms and in which the ethylenic linkage is not between the first and second carbon atoms at the 13-position and a carboxy substituent at the 15-position, which comprises heating a solution in a lower aliphatic alcohol containing a weak base of a corresponding compound having a carboxamido substituent or a carbalkoxy or carbaralkoxy substituent of the formula:

in which $R_3$ is a lower alkoxy or aralkoxy substituent at the 15-position.

10. A method for the preparation of gona-1,3,5(10),8,14-pentaen-17-ones having a hydroxy or substituted oxy group at the 3-position, a lower alkyl group or a lower alkenyl group having at least three carbon atoms and in which the ethylenic linkage is not between the first and second carbon atoms at the 13-position and a carboxy substituent at the 15-position, which comprises heating a solution in a lower aliphatic alcohol containing a weak base of a corresponding compound having a carboxamido substituent or a carbalkoxy or carbaralkoxy substituent of the formula:

in which $R_3$ is a lower alkoxy or aralkoxy substituent at the 15-position.

11. A method for the preparation of gona-1,3,5(10),8-tetraen-17-ones having a hydroxy or substituted oxy group at the 3-position, a lower alkyl group at the 13-position and a carboxy substituent at the 15-position, which comprises heating a solution in a lower aliphatic alcohol containing a weak base of a corresponding compound having a carboxamido substituent or a carbalkoxy or carbaralkoxy substituent of the formula:

in which $R_3$ is a lower alkoxy or aralkoxy substituent at the 15-position.

12. A method for the preparation of gona-1,3,5(10)-trien-17α-ols having a hydroxy or substituted oxy group at the 3-position, a lower alkyl group at the 13-position and a carboxy substituent at the 15-position, which comprises heating a solution in a lower aliphatic alcohol containing a weak base of a corresponding compound having a carboxamido substituent or a carbalkoxy or carbaralkoxy substituent of the formula:

in which $R_3$ is a lower alkoxy or aralkoxy substituent at the 15-position.

13. A method for the preparation of gona-1,3,5(10)-trien-17-ones having a hydroxy or substituted oxy group at the 3-position, a lower alkyl group at the 13-position and a carboxy substituent at the 15-position, which comprises heating a solution in a lower aliphatic alcohol containing a weak base of a corresponding compound having a carboxamido substituent or a carbalkoxy or carbaralkoxy substituent of the formula:

in which $R_3$ is a lower alkoxy or aralkoxy substituent on the 15-position.

14. A method for the preparation of gona-1,3,5(10),9(11)-tetraen-17-ones having a hydroxy or substituted oxy group at the 3-position, a lower alkyl group at the 13-position and a carboxy substituent at the 15-position, which comprises heating a solution in a lower aliphatic alcohol containing a weak base of a corresponding compound having a carboxamido substituent or a carbalkoxy or carbaralkoxy substituent of the formula:

in which $R_3$ is a lower alkoxy or aralkoxy substituent on the 15-position.

15. A method for the preparation of the d- and l-stereoisomers of gona-1,3,5(10),8,14-pentaen - 17 - ones.

gona-1,3,5(10),8-tetraen - 17 - ones, gona-1,3,5(10)-trien-17α-ols, gona-1,3,5(10)-trien-17-ones, and gona-1,3,5(10),9(11)-tetraen-17-ones having a hydroxy or substituted oxy group at the 3-position, a lower alkyl group at the 13-position and a carboxy substituent at the 15-position, which comprises forming a salt of the corresponding racemic compound with an optically active alkaloid base, separating the d- and l-diastereomeric salts, converting the optically active diastereomeric salts to d- and l-steroid isomers and optically active alkaloid base, and separating the d- and l-steroid isomers from the optically active alkaloid base.

16. A method for the preparation of the d- and l-stereoisomers of gona-1,3,5(10),8,14 - pentaen - 3 - ones, gona-1,3,5(10),8-tetraen - 17 - ones, gona-1,3,5(10)-trien-17α-ols, gona-1,3,5(10)-trien-17-ones and gona-1,3,5(10),9(11)-tetraen-17-ones having a hydroxy or substituted oxy group at the 3-position, a lower alkyl group at the 13-position and a carboxy substituent at the 15-position, which comprises forming an ester of the corresponding racemic compound with an optically active alcohol, separating the d- and l-diastereomeric esters, saponifying the separate d- and l-diastereomeric esters to provide d- and l-steroid isomers and optically active alcohol, and separating the d- and l-steroid isomers from the optically active alcohol.

17. A method for the preparation of d- and l-8, 14-secogona-1,3,5(10),9(11)-tetraen-14,17-diones, d- and l-gona-1,3,5(10),8,14-pentaen-17-ones, d- and l-gona-1,3,5(10),8-tetraen - 17 - ones, d- and l-gona-1,3,5(10)-trien-17α-ols, d- and l-gona-1,3,5(10)-trien-17-ones, and d- and l-gona-1,3,5(10),9(11)-tetraen-17-ones having a hydroxy or substituted oxy group at the 3-position, a lower alkyl group at the 13-position, which comprises treating a corresponding compound which has a carboxy substituent at the 15-position with a lower aliphatic acid containing a strong acid.

18. 8,14-secogona - 1,3,5(10),9(11) - tetraen-14,17-diones, gona - 1,3,5(10),8,14 - pentaen - 17 - ones, gona-1,3,5(10),8-tetraen - 17 - ones, gona - 1,3,5(10)-trien-17α-ols, gona-1,3,5(10)-trien-17-ones, and gona-1,3,5(10),9(11)-tetraen-17-ones having a hydroxy or substituted oxy group at the 3-position, a lower alkyl group at the 13-position and a carboxy or carboxamido substituent or a carbalkoxy or carbaralkoxy substituent of the formula:

in which $R_3$ is a lower alkoxy or aralkoxy substituent at the 15-position.

19. 8,14 - secogona - 1,3,5(10),9(11) - tetraen - 14,17-diones having a hydroxy or substituted oxy group at the 3-position, a lower alkyl group at the 13-position and a carboxy or carboxamido substituent or a carbalkoxy or carbaralkoxy substituent of the formula:

in which $R_3$ is a lower alkoxy or aralkoxy substituent at the 15-position.

20. Gona-1,3,5(10),8,14-pentaen-17-ones having a hydroxy of substituted oxy group at the 3-position, a lower alkyl group or a lower alkenyl group having at least three carbon atoms and in which the ethylenic linkage is not between the first and second carbon atoms at the 13-position and a carboxy or carboxamido substituent or a carbalkoxy or carbaralkoxy substituent of the formula:

in which $R_3$ is a lower alkoxy or aralkoxy substituent at the 15-position.

21. Gona-1,3,5,(10),8-tetraen-17-ones having a hydroxy or substituted oxy group at the 3-position, a lower alkyl group at the 13-position and a carboxy or carboxamido substituent or a carbalkoxy or carbaralkoxy substituent of the formula:

in which $R_3$ is a lower alkoxy or aralkoxy substituent at the 15-position.

22. Gona-1,3,5(10)-trien-17β-ols having a hydroxy or substituted oxy group at the 3-position, a lower alkyl group at the 13-position and a carboxy or carboxamido substituent or a carbalkoxy or carbaralkoxy substituent of the formula:

in which $R_3$ is a lower alkoxy or aralkoxy substituent at the 15-position.

23. Gona-1,3,5(10)-trien-17-ones having a hydroxy or substituted oxy group at the 3-position, a lower alkyl group at the 13-position and a carboxy or carboxamido substituent or a carbalkoxy or carbaralkoxy substituent of the formula:

in which $R_3$ is a lower alkoxy or aralkoxy substituent at the 15-position.

24. Gona-1,3,5(10),9(11)-tetraen-17-ones having a hydroxy or substituted oxy group at the 3-position, a lower alkyl group at the 13-position and a carboxy or carboxamido substituent or a carbalkoxy or carbaralkoxy substituent of the formula:

in which $R_3$ is a lower alkoxy or aralkoxy substituent at the 15-position.

25. The d- and l-isomers of gona-1,3,5(10),8,14-pentaen-17-ones, gona-1,3,5(10),8-tetraen-17-ones, gona-1,3,5(10)-trien-17α-ols, gona-1,3,5,(10) - trien-17-ones, and gona-1,3,5(10),9(11)-tetraen-17-ones having a hydroxy or substituted oxy group at the 3-position, a lower alkyl group at the 13-position and a carboxy substituent at the 15-position.

26. The d- and l-isomers of gona-1,3,5(10),8,14-pentaen-17-ones having a hydroxy or substituted oxy group at the 3-position, a lower alkyl group or a lower alkenyl group having at least three carbon atoms and in which the ethylenic linkage is not between the first and second carbon atoms at the 13-position and a carboxy substituent at the 15-position.

27. The d- and l-isomers of gona-1,3,5(10),8-tetraen-17-ones having a hydroxy or substituted oxy group at the 3-position, a lower alkyl group at the 13-position and a carboxy substituent at the 15-position.

28. The d- and l-isomers of gona-1,3,5(10)-triene-17α-ols having a hydroxy or substituted oxy group at the 3-position, a lower alkyl group at the 13-position and a carboxy substituent at the 15-position.

29. The d- and l-isomers of gona-1,3,5(10)-trien-17-ones having a hydroxy or substituted oxy group at the 3-position, a lower alkyl group at the 13-position and a carboxy substituent at the 15-position.

30. The d- and l-isomers of gona-1,3,5(10),9(11)-tetraen-17-ones having a hydroxy or substituted oxy group at the 3-position, a lower alkyl group at the 13-position and a carboxy substituent at the 15-position.

31. The d- and l-isomers of gona-1,3,5(10)-trien-17α-ols, having a hydroxy or substituted oxy group at the 3-position, a lower alkyl group at the 13-position.

32. The d- and l-isomers of gona-1,3,5(10),8,14-pentaen-17-ones having a hydroxy or substituted oxy group at the 3-position, a lower alkenyl group having at least three carbon atoms and in which the ethylenic linkage is not between the first and second carbon atoms at the 13-position.

References Cited

UNITED STATES PATENTS 3,202,686    8/1965   Hughes et al.

OTHER REFERENCES

Smith et al.: "Journal Chem Soc.," November 1964, pp. 4472–4475.

Smith et al.: "Experientia," 1963, pp. 394–396.

ELBERT L. ROBERTS, Primary Examiner

U.S. Cl. X.R.

260—239.55, 397.4, 397.5, 397.45, 473, 520, 586, 999